(12) United States Patent
Kim et al.

(10) Patent No.: US 12,530,079 B2
(45) Date of Patent: Jan. 20, 2026

(54) AUGMENTED REALITY DEVICE CONTROLLED BY EXTERNAL DEVICE, AND METHOD OF OPERATING SAME

(71) Applicant: Samsung Electronics Co., Ltd., Suwon-si (KR)

(72) Inventors: Kihyun Kim, Suwon-si (KR); Donghee Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/028,652

(22) Filed: Jan. 17, 2025

(65) Prior Publication Data

US 2025/0165068 A1  May 22, 2025

Related U.S. Application Data

(63) Continuation of application No. PCT/KR2023/008095, filed on Jun. 13, 2023.

(30) Foreign Application Priority Data

Aug. 25, 2022  (KR) ........................ 10-2022-0107179

(51) Int. Cl.
  *G06F 3/01*  (2006.01)
  *G06V 20/20*  (2022.01)
(52) U.S. Cl.
  CPC .............. *G06F 3/013* (2013.01); *G06F 3/017* (2013.01); *G06V 20/20* (2022.01)
(58) Field of Classification Search
  None
  See application file for complete search history.

(56) References Cited

U.S. PATENT DOCUMENTS 9,448,624 B2   9/2016   Kim
9,521,245 B2   12/2016  Yang
(Continued)

FOREIGN PATENT DOCUMENTS

JP        5826408 B2    12/2015
JP     2017-211884 A    11/2017
(Continued)

OTHER PUBLICATIONS

International Search Report dated Sep. 11, 2023, issued in International Patent Application No. PCT/KR2023/008095.
(Continued)

*Primary Examiner* — Parul H Gupta
(74) *Attorney, Agent, or Firm* — Jefferson IP Law, LLP

(57) ABSTRACT

An augmented reality (AR) device controlled by an external device is provided. The AR device includes a waveguide, an optical engine configured to project a virtual object onto the waveguide, a communication interface configured to establish pairing with a wearable device and transceive data to and from the wearable device, memory storing one or more computer programs, and one or more processors communicatively coupled to the waveguide, the optical engine, the communication interface, and the memory, wherein the one or more computer programs include computer-executable instructions that, when executed by the one or more processors individually or collectively, cause the AR device to recognize the wearable device overlaid on the virtual object, determine to provide the wearable device with control authority for performing or controlling a function related to the virtual object, control the communication interface to transmit, to the wearable device, the control authority and at least one of characteristic information of the virtual object or a data value related to the function, receive, from the wearable device, a changed data value changed by the (Continued)

wearable device based on the transmitted control authority, and update the data value of the function related to the virtual object based on the changed data value.

18 Claims, 29 Drawing Sheets

(56) References Cited

U.S. PATENT DOCUMENTS

| | | | |
|---|---|---|---|
| 10,334,076 | B2 | 6/2019 | Mckenzie et al. |
| 10,754,161 | B2 | 8/2020 | Endo et al. |
| 11,013,045 | B2 | 5/2021 | Ko et al. |
| 11,199,709 | B2 | 12/2021 | Son et al. |
| 11,666,825 | B2* | 6/2023 | Delamont ............ G06T 19/006 |
| | | | 463/32 |
| 12,056,416 | B2 | 8/2024 | Kim et al. |
| 2006/0241792 | A1* | 10/2006 | Pretlove ................ G06F 3/011 |
| | | | 700/83 |
| 2013/0211843 | A1 | 8/2013 | Clarkson |
| 2014/0320274 | A1 | 10/2014 | De Schepper et al. |
| 2016/0292922 | A1 | 10/2016 | Kasahara |
| 2018/0181274 | A1 | 6/2018 | Jung et al. |
| 2019/0251750 | A1* | 8/2019 | Brewer ................. G06F 3/0304 |
| 2019/0278089 | A1 | 9/2019 | Son et al. |
| 2020/0275089 | A1 | 8/2020 | Lee et al. |
| 2021/0158624 | A1 | 5/2021 | Moon et al. |
| 2021/0398095 | A1 | 12/2021 | Mallett et al. |
| 2022/0011861 | A1 | 1/2022 | Horii et al. |
| 2022/0182836 | A1 | 6/2022 | Faaborg et al. |
| 2022/0197394 | A1 | 6/2022 | Ha et al. |
| 2023/0152963 | A1 | 5/2023 | Kim et al. |
| 2023/0221832 | A1* | 7/2023 | Ahn ........................ G06F 3/013 |
| | | | 715/757 |
| 2024/0005616 | A1 | 1/2024 | Rahat et al. |
| 2024/0153399 | A1* | 5/2024 | Hau ........................ G06V 10/82 |
| 2025/0172928 | A1* | 5/2025 | Hartmann .......... G05B 23/0216 |

FOREIGN PATENT DOCUMENTS

| | | |
|---|---|---|
| KR | 10-2015-0054825 A | 5/2015 |
| KR | 10-2018-0059191 A | 6/2018 |
| KR | 10-2020-0102228 A | 8/2020 |
| KR | 10-2169952 B1 | 10/2020 |
| KR | 10-2022-0012073 A | 2/2022 |
| KR | 10-2398071 B1 | 5/2022 |
| KR | 10-2022-0086939 A | 6/2022 |
| KR | 10-2022-0121990 A | 9/2022 |
| KR | 10-2022-0166794 A | 12/2022 |
| KR | 10-2022-0169330 A | 12/2022 |
| KR | 10-2023-0078114 A | 6/2023 |
| KR | 10-2660859 B1 | 4/2024 |

OTHER PUBLICATIONS

European Search Report dated Sep. 8, 2025, issued in European Application No. 23857504.7.

* cited by examiner

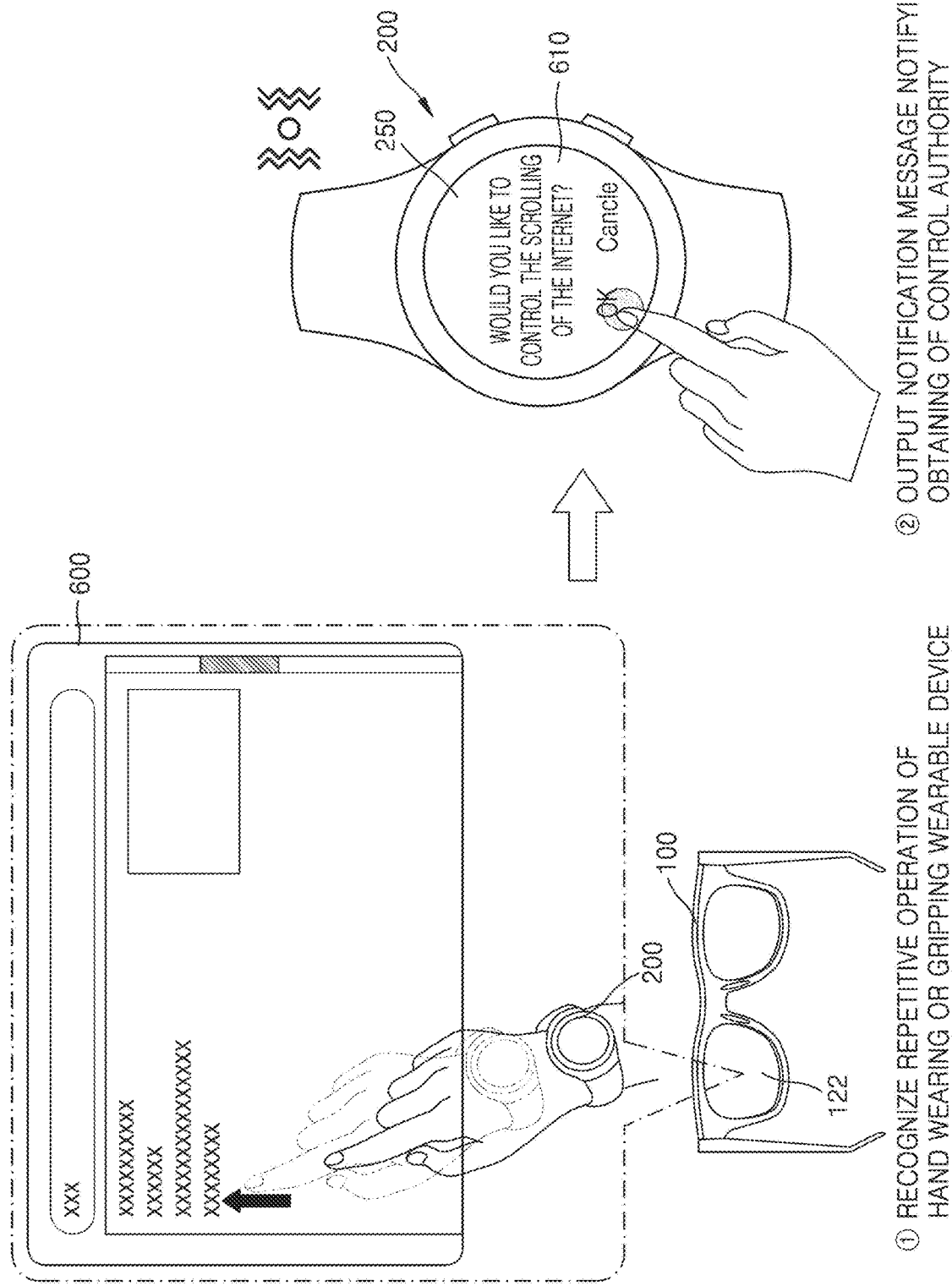

AUGMENTED REALITY DEVICE CONTROLLED BY EXTERNAL DEVICE, AND METHOD OF OPERATING SAME

CROSS-REFERENCE TO RELATED APPLICATION(S)

This application is a continuation application, claiming priority under § 365 (c), of an International application No. PCT/KR2023/008095, filed on Jun. 13, 2023, which is based on and claims the benefit of a Korean patent application number 10-2022-0107179, filed on Aug. 25, 2022, in the Korean Intellectual Property Office, the disclosure of which is incorporated by reference herein in its entirety.

BACKGROUND

1. Field

The disclosure relates to an augmented reality (AR) device controlled by an external device, and a method of operating the AR device. More particularly, the disclosure relates to an AR device controlled by a user input received through a wearable device worn or gripped by a user, and a method of operating the AR device.

2. Description of Related Art

Augmented reality (AR) is a technology whereby virtual objects are overlaid on a physical environment space of the real world or on real-world objects and shown together. AR devices (e.g., smart glasses) that utilize AR technology are useful in everyday life, such as for information searching, direction finding, and camera photography. In particular, smart glasses are worn as a fashion item and mainly used for outdoor activities.

Because AR devices are impossible to manipulate by touch due to their characteristics, in order to provide AR services, a hand interaction using a three-dimensional (3D) posture and hand gesture of a user's hand as input means is used as an input interface. General AR devices use vision-based hand tracking technology that recognizes the user's hand from images captured by using a camera.

In order to use AR services through AR devices, a user needs to control displayed virtual objects by using a body part such as a hand. However, when controlling a virtual object having a small size or requiring precise manipulation, the accuracy of control may decrease, and the user may feel tired. In the case of a user interface (UI) that requires large movements to manipulate a virtual object due to a long distance between the virtual object and the user's hand, or requires precise manipulation, such as a slide bar, a spinner, or a scroll bar, accurate manipulation that matches the user's intention may be difficult.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an augmented reality (AR) device controlled by an external device, and a method of operating the AR device.

Additional aspects will be set forth in part in the description which follows and, in part, will be apparent from the description, or may be learned by practice of the presented embodiments.

In accordance with an aspect of the disclosure, an augmented reality (AR) device controlled by an external device is provided. The AR device includes a waveguide, an optical engine configured to project a virtual object onto the waveguide, a communication interface configured to communicate with a wearable device, memory storing one or more computer programs, and one or more processors communicatively coupled to the optical engine, the communication interface, and the memory, wherein the one or more computer programs include computer-executable instructions that, when executed by the one or more processors individually or collectively, cause the AR device to recognize the wearable device overlaid on the virtual object through the waveguide, based on the recognition of the wearable device being overlaid on the virtual object, determine to provide the wearable device with control authority for performing or controlling a function related to the virtual object, based on determining to provide the wearable device with the control authority, transmit, via the communication interface to the wearable device, the control authority and a first data value related to the function, receive, via the communication interface from the wearable device, a second data value which is a data value changed by the wearable device based on the transmitted control authority, and update, based on the received second data value, the first data value of the function related to the virtual object.

In accordance with another aspect of the disclosure, a method performed by an augmented reality (AR) device for being controlled by an external device is provided. The method includes recognizing, by the AR device, a wearable device overlaid on a virtual object through a waveguide of the AR device, based on the recognition of the wearable device being overlaid on the virtual object, determining, by the AR device, to provide the wearable device with control authority for performing or controlling a function related to the virtual object, based on determining to provide the wearable device with the control authority, transmitting, by the AR device to the wearable device, the control authority and a first data value related to the function, receiving, by the AR device from the wearable device, a second data value which is a data value changed by the wearable device based on the transmitted control authority, and updating, by the AR device, based on the received second data value, the first data value of the function related to the virtual object.

In accordance with another aspect of the disclosure, a wearable device interacting with an augmented reality (AR) device is provided. The wearable device includes a communication interface connected to the AR device through a short-range communication method and performing data communication with the AR device, a user input unit configured to receive a user input, memory storing one or more computer programs, and one or more processor communicatively coupled to the communication interface, the user input unit, and the memory, wherein the one or more computer programs include computer-executable instructions that, when executed by the one or more processors individually or collectively, cause the wearable device to obtain, from the AR device, control authority for performing or controlling a function related to a virtual object displayed through an application executed by the AR device, determine a manipulation method of controlling the function based on the control authority based on at least one of a type of a virtual object, characteristics of the function, or a data value related to the function, change the data value related to the function to a changed data value based on a user input received through the user input unit according to the determined manipulation method, and transmit, to the AR device, the changed data value by controlling the communication interface.

In accordance with another aspect of the disclosure, one or more non-transitory computer-readable storage media storing one or more computer programs including computer-executable instructions that, when executed by one or more processors of an augmented reality (AR) device individually or collectively, cause the AR device to perform operations are provided. The operations include recognizing, by the AR device, a wearable device overlaid on a virtual object through a waveguide of the AR device, based on the recognition of the wearable device being overlaid on the virtual object, determining, by the AR device, to provide the wearable device with control authority for performing or controlling a function related to the virtual object, based on determining to provide the wearable device with the control authority, transmitting, by the AR device to the wearable device, the control authority and a first data value related to the function, receiving, by the AR device from the wearable device, a second data value which is a data value changed by the wearable device based on the transmitted control authority, and updating, by the AR device, based on the received second data value, the first data value of the function related to the virtual object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating an operation in which an AR device determines to provide control authority to a wearable device based on a repetitive operation of a user, according to an embodiment of the disclosure;

The same reference numerals are used to represent the same elements throughout the drawings.

DETAILED DESCRIPTION

Figure 1A:
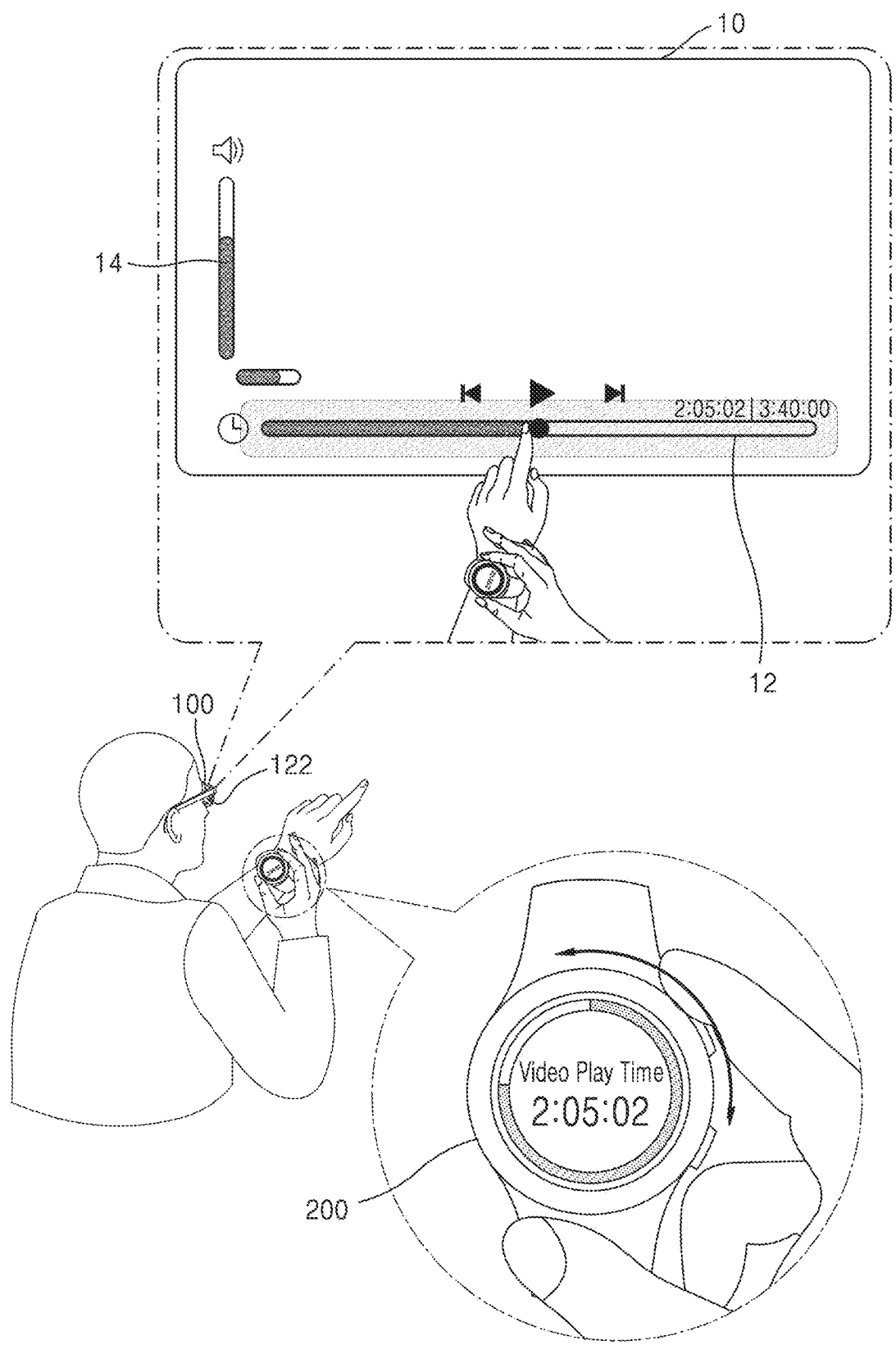
FIG. 1A is a conceptual diagram illustrating an operation in which an augmented reality (AR) device is controlled by an external device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, when something is referred to as "including" an element, one or more other elements may be further included unless specified otherwise. Also, as used herein, terms such as "units" and "modules" may refer to units that perform at least one function or operation, and the units may be implemented as hardware or software or a combination of hardware and software.

The expression "configured to (or set to)" used herein may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "system configured to" may indicate that the system is "capable of" along with other devices or components. For example, "a processor configured to (or set to) perform A, B, and C" may refer to a dedicated processor (e.g., an embedded processor) for performing a corresponding operation, or a general-purpose processor (e.g., a central processing unit (CPU) or an application processor) capable of performing a corresponding operation by executing one or more software programs stored in memory.

When an element (e.g., a first element) is "coupled to" or "connected to" another element (e.g., a second element), the first element may be directly coupled to or connected to the second element, or, unless otherwise described, a third element may exist therebetween.

As used herein, 'augmented reality (AR)' refers to a technology for displaying a virtual image on a physical environment space of the real world or displaying a real world object and a virtual image together.

As used herein, an 'AR device' is a device capable of implementing AR, and may be, for example, not only AR glasses which are worn on the face of a user but also a head mounted display (HMD) apparatus or AR helmet which is worn on the head of a user. However, the disclosure is not limited thereto.

As used herein, a 'real scene' refers to the scene of a real world that a user sees through an AR device, and may include a real world object.

As used herein, a 'virtual object' is an image generated through an optical engine and may include both a static image and a dynamic image. The virtual object is observed together with the real scene and may be an image representing information about a real world object in the real scene or information about an operation of an AR device, a control menu, etc. In an embodiment of the disclosure, the 'virtual object' may include a function user interface (UI) for performing or controlling a function provided through an application or program executed by an AR device.

A general AR device includes an optical engine for generating a virtual object configured as light generated from a light source and a waveguide including a transparent material to guide the virtual object generated by the optical engine to user's eyes and allow scenes of the real world together to be viewed. As described above, because the AR device needs to be able to observe not only the virtual object but also the scene of the real world, an optical element is basically required to change a path of light with straightness in order to guide the light generated by the optical engine to the user's eyes through the waveguide. At this time, the light path may be changed through reflection by a mirror, or through diffraction by a diffraction element such as a diffractive optical element (DOE) and a holographic optical element (HOE), but is not limited thereto.

As used herein, a 'gaze direction' refers to a direction in which the user gazes, and a 'gaze' refers to a virtual line from the user's pupils toward the gaze direction. Mainly, the gaze direction is calculated and the gaze is estimated from information obtained from an eye tracking sensor.

As used herein, a 'gaze point' refers to a point at which the user gazes, and may be calculated as a point at which gazes of the user's both eyes intersect.

As used herein, an 'external device' refers to a separate device which is not the AR device. An external device may be implemented as various electronic devices such as a mobile device, a smart phone, a laptop computer, a desktop PC, a tablet PC, an e-book terminal, a digital broadcasting terminal, a personal digital assistant (PDA), a portable multimedia player (PMP), navigation, an MP3 player, a camcorder, Internet protocol television (IPTV), digital television (DTV), a wearable device, etc.

As used herein, the 'wearable device' is a device worn on a part of a user's body and carried in a worn state. For example, the wearable device may be at least one of a smart watch, ring, bracelet, anklet, necklace, contact lens, clothing integrated device (e.g., electronic clothing), a body-attached device (e.g., a skin pad), or a bio-implantable device (e.g., an implantable circuit), but is not limited thereto.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the examples set forth herein.

Embodiments of the disclosure now will be described more fully hereinafter with reference to the accompanying drawings.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1A is a conceptual diagram illustrating an operation in which an AR device is controlled by an external device according to an embodiment of the disclosure.

Referring to FIG. 1A, a user may wear an AR device 100 on a face part and see virtual objects 10, 12, and 14 through a lens of the AR device 100. In an embodiment shown in FIG. 1A, the AR device 100 is a device capable of expressing AR, and may be an AR glasses device or smart glasses in the shape of glasses. However, the disclosure is not limited thereto, and the AR device 100 may be implemented as a head mounted display apparatus (HMD) or an AR helmet worn on the user's head.

The AR device 100 may project the virtual objects 10, 12, and 14 on a waveguide 122 (see FIG. 3) by using an optical engine 124 (see FIG. 3), and the user may see the virtual objects 10, 12, and 14 through the waveguide 122. In the disclosure, the 'virtual objects 10, 12, and 14' are images generated through the optical engine 124 and may include both a static image and a dynamic image. The virtual objects 10, 12, and 14 may be observed together with a real scene, and may be images representing information about a real-world object in the real scene or information about an operation of the AR device 100, a control menu, etc. In an embodiment of the disclosure, the 'virtual objects 10, 12, and 14' may include one or more function user interfaces (UIs) virtual objects 12 and 14 for performing or controlling a function provided through an application or a program executed by the AR device 100. The virtual objects 10, 12, and 14 may include an execution screen virtual object 10 of the application or the program.

The user may wear a wearable device 200, and the AR device 100 may recognize the wearable device 200 that is overlaid on the virtual objects 10, 12, and 14. In an embodiment of the disclosure, the 'wearable device 200' is a device worn on a part of the user's body and carried in a worn state. In an embodiment shown in FIG. 1A, the wearable device 200 may be a smart watch worn on the user's wrist. However, the disclosure is not limited thereto, and the wearable device 200 may be at least one of, for example, a ring, bracelet, anklet, necklace, contact lens, clothing integrated device (e.g., electronic clothing), a body-attached device (e.g., skin pad), or a bio-implantable device (e.g., implantable circuit). The wearable device 200 may be connected to the AR device 100 through a short-range communication method, and may transmit and receive data. For example, the wearable device 200 may be paired with the AR device 100 through Bluetooth communication.

Figure 1B:
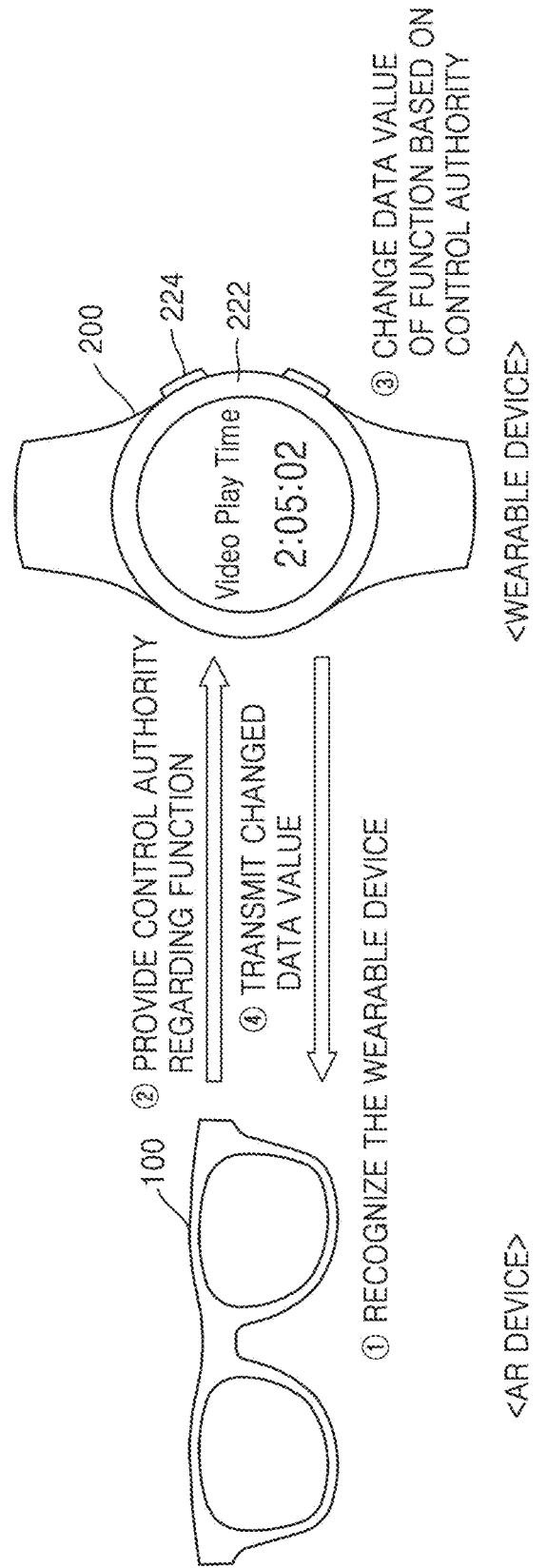
FIG. 1B is a conceptual diagram illustrating an operation between an AR device and a wearable device according to an embodiment of the disclosure.

FIG. 1B is a conceptual diagram for explaining an operation between an AR device and a wearable device according to an embodiment of the disclosure. Hereinafter, operations of the AR device 100 and the wearable device 200 will be described with reference to FIGS. 1A and 1B together.

Referring to FIG. 1B, an AR device 100 may recognize a wearable device 200 (operation ①). In an embodiment of the disclosure, the AR device 100 may include a camera 110 (see FIG. 3) and obtain an image frame by capturing the wearable device 200 and the user's hand wearing or gripping the wearable device 200 through the camera 110. The AR device 100 may recognize the wearable device 200 and the user's hand from the image frame by using an object recognition model based on deep learning or image processing technology.

The AR device 100 may provide the recognized wearable device 200 with control authority over a function provided by the application (operation ②). Referring to FIG. 1A together, the AR device 100 may identify a first function UI virtual object 12 overlaid by the user's hand from among the function UIs virtual objects 12 and 14 for performing or controlling functions provided by the application, and determine to provide the wearable device 200 with the control authority of a first function corresponding to the identified first function UI virtual object 12. In the embodiment shown in FIG. 1A, the application executed by the AR device 100 is an application that plays or streams a video, and the execution screen virtual object (e.g., a video play screen) 10 of the application, the first function UI virtual object 12 for controlling the video play time, and a second function UI virtual object 14 for controlling the volume up/down of the video may be displayed through the waveguide 122. The AR device 100 may identify a play time control function performed or controlled through the displayed first function UI virtual object 12 overlaid by the user's hand, and transmit control authority over the identified play time control function to the wearable device 200.

In an embodiment of the disclosure, when the AR device 100 transmits the control authority to the wearable device 200, the AR device 100 may transmit characteristic information of a function UI of the transmitted control authority and a data value of the function together. In the embodiment shown in FIG. 1A, the AR device 100 may transmit not only the control authority of the play time control function, but also the characteristic information of the first function UI virtual object 12 and the play time (2 hours 5 minutes 2 seconds in the case of FIG. 1A), which is the data value of the play time control function, to the wearable device 200.

Referring back to FIG. 1B, the wearable device 200 may change the data value of the function based on the control authority obtained from the AR device 100 (operation ③). In an embodiment of the disclosure, the wearable device 200 may determine a manipulation method corresponding to the function based on at least one of the characteristics of the function related to the obtained control authority, the type of the function UI, or the data value. In the embodiments shown in FIGS. 1A and 1B, the wearable device 200 includes a rotary bezel ring 222 and a button 224, and may determine the rotary bezel ring 222 as the manipulation method based on at least one of the characteristics of the video play time control function related to the obtained control authority, a slider type of the first function UI virtual object 12, or the data value of the play time (e.g., 2 hours 5 minutes 2 seconds). The wearable device 200 may receive a user input for rotating the rotary bezel ring 222 in a clockwise or counterclockwise direction, and may change the data value of the function based on the received user input. In an embodiment shown in FIG. 1A, the wearable device 200 may change the video play time.

Referring back to FIG. 1B, the wearable device 200 may transmit the changed data value to the AR device 100 (operation ④). The AR device 100 may update the data value related to the function UI by using the data value received from the wearable device 200. Referring to FIG. 1A together, the AR device 100 may receive data of the video play time changed by the user input that rotates the rotary bezel ring 222 of the wearable device 200 in the clockwise or counterclockwise direction from the wearable device 200, and update the video play time of the first function UI virtual object 12 by using the received play time data.

Referring to FIGS. 1A and 1B, the AR device 100 is shown and described to be controlled by the wearable device 200, but the disclosure is not limited thereto. In an embodiment of the disclosure, the AR device 100 may provide control authority over functions to the external device, for example, a mobile device, a smart phone, a laptop computer, a desktop, a tablet PC, an e-book terminal, a digital broadcasting terminal, a PDA, a PMP, navigation, an MP3 player, or a camcorder, and may be controlled by the external device. A specific embodiment in which the AR device 100 recognizes the external device and is controlled by the external device will be described in detail with reference to FIGS. 17A and 17B.

Because the AR device 100 is impossible to manipulate a touch due to its characteristics, in order to provide an AR service, a hand interaction using a three-dimensional (3D) posture and hand gesture of the user's hand as input means is used as an input interface. In order to use the AR service through the AR device 100, the user needs to control a displayed virtual object by using a body such as a hand. However, when controlling the virtual objects 10, 12, and 14 having small sizes or virtual objects (e.g., the function UIs virtual objects 12 and 14) requiring precise manipulation, the user may feel tired, and the accuracy of control may decrease. In the case of a UI that requires a large operation to manipulate the virtual objects 10, 12, and 14 due to a long distance between the virtual objects 10, 12, and 14 and the user's hand, or requires a precise manipulation such as a slide bar, a spinner, or a scroll bar, an accurate manipulation that matches the user's intention may be difficult. When it is difficult to precisely manipulate the UI, functions or services provided by the AR device 100 may not be properly provided, which may decrease the user convenience.

An object of the disclosure is to provide the AR device 100 controlled by the external device in conjunction with the external device and a method of operating the AR device 100, in order to perform or control a virtual object that is difficult to manipulate by using the user's hand or a part of the body.

The AR device 100 according to an embodiment shown in FIGS. 1A and 1B may identify a virtual object (the first UI virtual object 12 in the embodiment of FIG. 1A) overlaid by the hand wearing the wearable device 200 among the virtual objects 10, 12, and 14 provided by a running application, provide control authority over a function related to the identified virtual object to the wearable device 200, receive a data value changed by the wearable device 200 based on the provided control authority, and reflect the received data value to update the data value of the function. The AR device 100 according to an embodiment of the disclosure performs or controls a function related to a virtual object having a small size or requiring precise manipulation among the virtual objects 10, 12, and 14 through the wearable device 200, thereby providing technical effects of improving the accuracy of function control and the user's convenience of operation.

Figure 2:
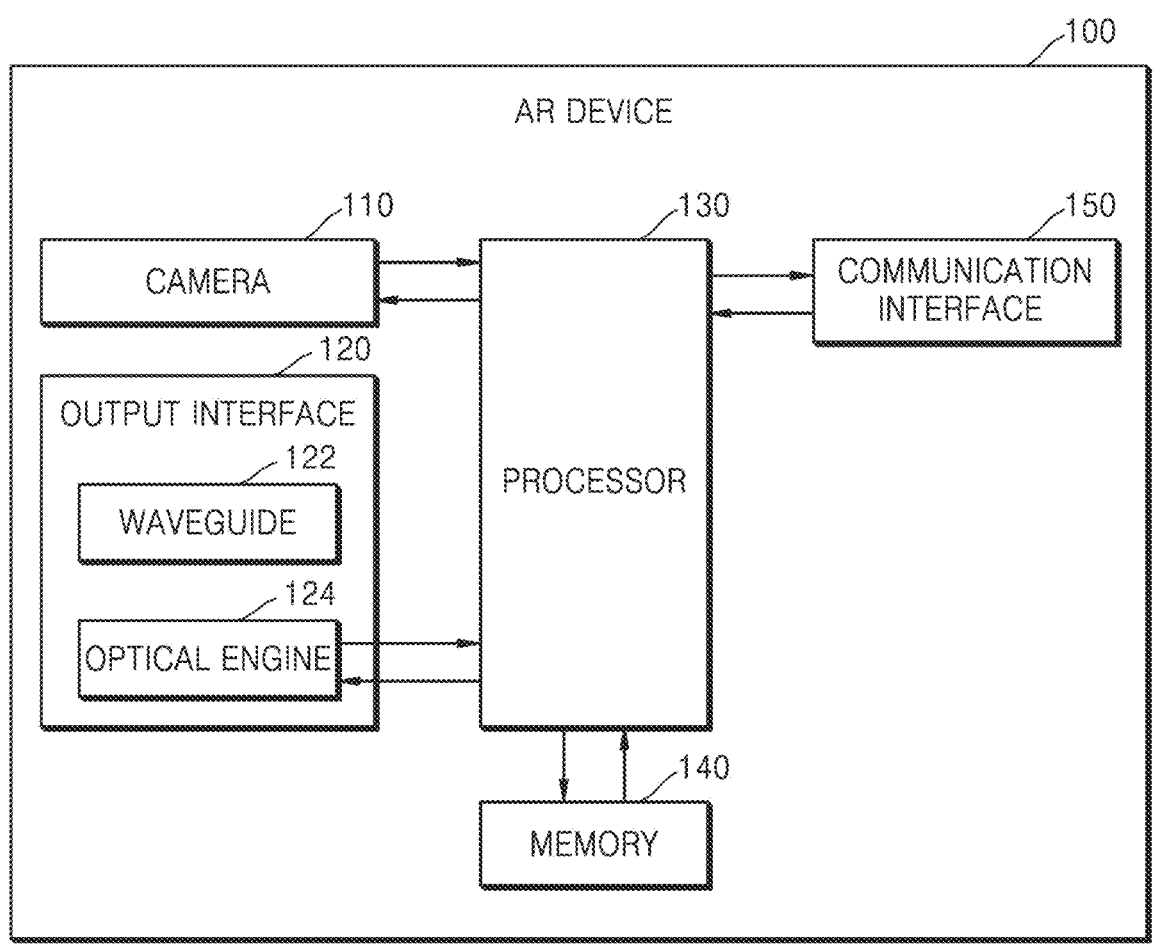
FIG. 2 is a block diagram illustrating components of an AR device according to an embodiment of the disclosure.

FIG. 2 is a block diagram illustrating components of an AR device according to an embodiment of the disclosure.

Referring to FIG. 2, an AR device 100 may be AR glasses in the form of glasses worn on the user's face. The AR device 100 may provide not only a real-world object in a field of view (FOV) but also a virtual object displayed on a waveguide by executing an application. The AR device 100 may provide a virtual object displayed on each application to a user by executing, for example, a movie application, a music application, a photo application, a gallery application, a web browser application, an e-book reader application, a game application, an AR application, a social network service (SNS) application, a messenger application, an object recognition application, etc. In an embodiment of the disclosure, the virtual object may include a UI for performing or controlling a function provided by an application.

Referring to FIG. 2, an AR device 100 may include a camera 110, an output interface 120, a processor 130, memory 140, and a communication interface 150. The camera 110, an optical engine 124 of the output interface 120, the processor 130, the memory 140, and the communication interface 150 may be electrically and/or physically connected to each other. FIG. 2 illustrates only essential components for explaining an operation of the AR device 100, and the components included in the AR device 100 are not limited to those shown in FIG. 2. In an embodiment of the disclosure, the AR device 100 may further include an eye tracking sensor configured to obtain information on a user's gaze direction. In an embodiment of the disclosure, the AR device 100 may further include a battery that supplies power to the camera 110, the optical engine 124, the processor 130, and the communication interface 150.

The camera 110 is configured to obtain an image of an object by capturing the object in real space. In an embodiment of the disclosure, the camera 110 may include a lens module, an image sensor, and an image processing module. The camera 110 may obtain a still image or a video obtained by an image sensor (e.g., a complementary metal-oxide semiconductor (CMOS) or a charge-coupled device (CCD)). The image processing module may process the still image or the video obtained through the image sensor, extract necessary information, and transmit the extracted information to the processor 130. In an embodiment of the disclosure, the camera 110 may obtain an image frame by capturing the wearable device 200 (see FIGS. 1A and 1B) and the user's hand wearing or gripping the wearable device 200. The camera 110 may obtain an image including a single image frame or video data including a plurality of image frames, and provide the obtained image frame to the processor 130.

The output interface 120 is configured to display a real-world object of real space and a virtual object generated by the optical engine 124. The output interface 120 may include the waveguide 122 and the optical engine 124. Although not shown in FIG. 2, the output interface 120 may further include a lens. The lens includes a transparent material and is configured to penetrate external light. In an embodiment of the disclosure, the lens may be integrated with the waveguide 122 to constitute a single element.

The waveguide 122 is an optical element including a transparent material. The waveguide 122 may include a transparent material in which a partial area of a rear surface is visible when the user wears the AR device 100. The waveguide 122 may be configured as a single-layer or multi-layer flat plate including a transparent material through which light may be reflected from inside and propagated. The waveguide 122 may face an exit surface of the optical engine 124 and receive light from the virtual object projected from the optical engine 124. The light of the virtual object projected onto the waveguide 122 may be propagated within the waveguide 122 by the principle of total reflection. The waveguide 122 may include a plurality of areas that change a path of light to finally output the path of light to the user's eyes. A diffraction grating may be formed in the plurality of areas. The waveguide 122 may perform the same function as a light guide panel. The waveguide 122 may include a left-eye waveguide disposed adjacent to the user's left eye and a right-eye waveguide disposed adjacent to the user's right eye.

The optical engine 124 is configured to project the virtual object onto waveguide 122. The optical engine 124 may perform the same function as a projector. The optical engine 124 may further include an illumination optical system, an optical path converter, an image panel, a beam splitter, and a projection optical system.

The illumination optical system is an optical component that illuminates light and may include a light source and lenses. The light source is a component that generates light by adjusting colors of RGB, and may be configured as, for example, a light emitting diode (LED).

The image panel may be a reflective image panel that reflects light illuminated by the light source while modulating the light into light including a two-dimensional (2D) image. The reflective image panel may be, for example, a digital micromirror device (DMD) panel, a liquid crystal on silicon (LCoS) panel, or another known reflective image panel. The DMD panel may operate using a digital light processing (DLP) method of mixing RGB of light output from the light source and projecting the image of the virtual object by illuminating the RGB of light with a plurality of mirrors each having a pixel size, and switching each of the plurality of mirrors to on/off. The LCOS panel may operate using a liquid crystal display (LCD) method of projecting the image of the virtual object generated by separating the light output from the light source into RGB through a mirror that only allows light of a specific wavelength to pass through, inputting the light to the image panel, and mixing RGB.

The beam splitter may be disposed between the image panel and the projection optical system. The beam splitter may be configured to reflect the light output from the light source and penetrate the light reflected by the image panel.

The projection optical system is a component that projects light including an image reflected by the image panel onto the waveguide 122, and may include one or a plurality of projection lenses.

The optical engine 124 may obtain image data constituting the virtual object from the processor 130, generate the virtual object based on the obtained image data, and project the virtual object onto the waveguide 122 through the exit surface together with the light output from the light source. In an embodiment of the disclosure, the processor 130 may provide image data including RGB colors and luminance values of a plurality of pixels constituting the virtual object to the optical engine 124. The optical engine 124 may project the virtual object onto the waveguide 122 by performing image processing using the RGB color value and the luminance value of each of the plurality of pixels, and controlling the light source.

The optical engine 124 may project the same virtual object onto the left-eye waveguide and the right-eye waveguide, or project different virtual objects onto the left-eye waveguide and the right-eye waveguide.

The processor 130 may execute one or more instructions of a program stored in the memory 140. The processor 130 may include hardware components that perform arithmetic, logic, and input/output operations and signal processing. The processor 130 may include, for example, but not limited to, at least one of a central processing unit (CPU), a microprocessor, a graphics processing unit (GPU), application specific integrated circuits (ASICs), DSPs, digital signal processing devices (DSPDs), programmable logic devices (PLDs), or field programmable gate arrays (FPGAs).

FIG. 2 shows that the processor 130 includes one element or processor, but the disclosure is not limited thereto. In an embodiment of the disclosure, the processor 130 may include one or more elements or processors.

The memory 140 may include at least one type of storage medium, for example, flash memory type, a hard disk type, a multimedia card micro type, card type memory (e.g., secure digital (SD) or extreme digital (XD) memory), Random Access Memory (RAM), Static Random Access Memory (SRAM), Read Only Memory (ROM), Electrically Erasable Programmable Read-Only Memory (EEPROM), Programmable Read-Only Memory (PROM), or an optical disk.

The memory 140 may store instructions related to operations in which the AR device 100 provides control authority over a function to an external device and is controlled by the external device based on the provided control authority. In an embodiment of the disclosure, the memory 140 may store at least one of instructions, an algorithm, a data structure, a program code, or an application program that are readable by the processor 130. The instructions, the algorithm, the data structure, the program code, or the application program stored in the memory 140 may be implemented, for example, in a programming or scripting language such as C, C++, Java, assembler, etc.

In the following embodiment, the processor 130 may be implemented by executing the instructions or program codes stored in the memory 140.

The processor 130 may obtain an image frame by capturing a wearable device from the camera 110 and recognize the wearable device from the obtained image frame. In an embodiment of the disclosure, the wearable device may be overlaid on the virtual object projected through the waveguide 122. The processor 130 may recognize the wearable device overlaid on the virtual object from the image frame.

In an embodiment of the disclosure, the processor 130 may recognize the wearable device from the image frame by using an artificial intelligent (AI) model. The 'AI model' may include a deep neural network (DNN) model trained to recognize objects from the image data obtained from the camera 110 and classify the objects according to types. The AI model may be stored in the memory 140, but is not limited thereto. In an embodiment of the disclosure, the AI model may be stored in an external server, and the AR device 100 may transmit the data of the image frame to the server and receive information about the type of an object which is an inference result, from the AI model of the server.

The AI model may include a DNN model including model parameters trained by applying tens of thousands to hundreds of millions of images as input data and applying a label value of an object included in the image as an output ground truth. The DNN model may include at least one of a convolutional neural network (CNN), a recurrent neural network (RNN), a restricted Boltzmann machine (RBM), a deep belief network (DBN), a bidirectional recurrent deep neural network (BRDNN), or a deep Q-network. However, the AI model does not include only the DNN model, but may include at least one of a support vector machine (SVM), linear regression, logistic regression, Naive Bayes, random forest, decision tree, or k-nearest neighbor algorithm.

The processor 130 may include an AI processor that performs training of the AI model and inference using the AI model. The AI processor may be configured in the form of a dedicated hardware chip for AI, or may be included in the processor 130 as part of a general-purpose processor (e.g., a CPU or an application processor) or a dedicated graphics processor (e.g., a GPU). The AI processor may recognize the wearable device from the image frame obtained through the camera 110 by using the AI model.

The processor 130 may recognize the user's hand overlaid on the virtual object from the image frame. In an embodiment of the disclosure, the processor 130 may recognize the user's hand wearing or gripping the wearable device from the image frame by using the AI model.

It has been described that the processor 130 recognizes the wearable device or the user's hand by using the AI model, but the disclosure is not limited to the above-described embodiment. In an embodiment of the disclosure, the processor 130 may recognize the wearable device or the user's hand from the image frame by using the known image processing technology.

The processor 130 may determine to provide the recognized wearable device with control authority for performing or controlling a function related to the virtual object. In an embodiment of the disclosure, the processor 130 may measure a time for which the virtual object is overlaid by the recognized hand, compare the measured time with a preset time, and determine whether to provide the control authority to the wearable device according to a comparison result. The processor 130 may determine to provide the control authority of the function to the wearable device when the time for which the virtual object is overlaid by the hand exceeds the preset time. A specific embodiment in which the processor 130 determines whether to provide the control authority to the wearable device based on the time for which the virtual object is overlaid will be described in detail with reference to FIG. 4.

In an embodiment of the disclosure, the processor 130 may recognize a gesture of the user's hand wearing or gripping the wearable device. The processor 130 may recognize the gesture of the user's hand from the image frame by using the AI model or through the known image processing. The processor 130 may determine whether to provide the control authority of the function to the wearable device based on the recognized gesture of the hand. For example, when the recognized gesture is the same as or similar to a preset gesture, the processor 130 may compare the recognized gesture with the preset gesture, identify the gesture based on a comparison result, and determine to provide the control authority of the function to the wearable device based on an identification result. In an embodiment of the disclosure, when a specific gesture is recognized while the control authority of the function has already been provided to the wearable device, the processor 130 may retrieve the control authority of the function from the wearable device. A specific embodiment in which the processor 130 provides or retrieves the control authority of the function to the wearable device based on the gesture of the hand will be described in detail with reference to FIGS. 5A and 5B.

In an embodiment of the disclosure, the processor 130 may recognize a repetitive operation repeated more than a preset number of times by the user's hand wearing or gripping the wearable device. For example, the processor 130 may recognize that a scroll operation or a swipe operation by the user's hand in real space is repeated more than the preset number of times. The preset number of times may be, for example, 5 times, but is not limited thereto. The processor 130 may determine to provide the control authority of the function to the wearable device based on the recognized repetitive operation. For example, when the scroll operation is repeated five or more times, the processor 130 may determine to provide control authority over a scroll function to the wearable device. A specific embodiment in which the processor 130 provides the control authority of the function to the wearable device based on the repetitive operation will be described in detail with reference to FIG. 6.

In an embodiment of the disclosure, the processor 130 may select a function UI related to a function to provide control authority to the wearable device from among a plurality of function UIs included in the virtual object. The virtual object may include the plurality of UIs for executing a plurality of functions provided by the application. The processor 130 may identify a function UI overlaid by the user's hand wearing or gripping the wearable device among the plurality of function UIs. The processor 130 may determine to provide the wearable device with control authority over a function performed or controlled by the identified function UI.

The processor 130 may display a control area of the selected function UI in a color distinguished from another area within the virtual object (e.g., an execution screen of the application or a control area of at least one unselected function UI). In an embodiment of the disclosure, the processor 130 may allocate a color different from the control area of the at least one unselected function UI to the control area of the selected function UI, and generate image data displaying the selected function UI in the allocated color. The processor 130 may provide the generated image data to the optical engine 124, and the optical engine 124 may project light onto the waveguide 122 based on the image data, thereby displaying the selected function UI in the color different from that of the control area of the at least one unselected function UI. A specific embodiment in which the processor 130 selectively provides control authority of functions corresponding to some function UIs among the plurality of function UIs to the wearable device will be described in detail with reference to FIG. 7, 8A, or 8C.

The processor 130 may determine whether to provide control authority of functions corresponding to some function UIs to the wearable device based on whether to individually control the plurality of function UIs provided by the application. In an embodiment of the disclosure, the processor 130 may determine whether to provide an application programmable interface (API) of the application, and determine whether to provide control authority of functions corresponding to some function UIs among the plurality of function UIs to the wearable device based on whether to provide the API. For example, when the application is able to provide the API with respect to all the plurality of function UIs, the processor 130 may selectively provide the wearable device with control authority regarding a function corresponding to a function UI selected by the user's hand.

For the opposite example, when the application is a third party application that provides no API, the processor 130 may not provide the wearable device with control authority over a function corresponding to a function UI among the plurality of function UIs. In this case, the wearable device may operate as a touch pad to control the function of the application.

In an embodiment of the disclosure, the AR device 100 may further include an eye tracking sensor. The eye tracking sensor may obtain information about a gaze direction by tracking the gaze of the user's eyes. The eye tracking sensor may detect a direction of the user's gaze by irradiating light such as near-infrared rays to the user's eyes by using a light source and receiving reflected light reflected by the cornea of the eye. In an embodiment of the disclosure, the eye tracking sensor may obtain an image of a pupil or an iris by capturing the user's eyes. The eye tracking sensor includes a left-eye eye tracking sensor and a right-eye eye tracking sensor, and may detect a gaze direction of the user's left eye and a gaze direction of the user's right eye, respectively.

In an embodiment of the disclosure, the processor 130 may project a plurality of virtual objects provided by a plurality of applications through the optical engine 124 onto the waveguide 122, by executing the plurality of applications. The processor 130 may recognize a gaze point at which the gaze direction of the user's left eye and the gaze direction of the right eye converge from the eye tracking sensor, and may select an application from among the plurality of applications based on a position of the recognized gaze point. The processor 130 may determine to provide the wearable device with control authority of a function related to a virtual object displayed by the selected application. A specific embodiment in which the processor 130 selects the application based on the position of the gaze point of the user and provides the wearable device with the control authority of the function related to the virtual object provided by the selected application will be described in detail with reference to FIGS. 9 and 10.

The processor 130 may control the communication interface 150 to transmit the control authority of the function to the wearable device. The processor 130 may not only transmit the control authority of the function to the wearable device, but also transmit characteristic information of the virtual object and the data value related to the function to the wearable device. In the disclosure, the 'characteristic information of the virtual object' may include information about a type of a function UI included in the virtual object. The type of the function UI may include, for example, a slider, a scroll bar, a spinner, a button, a wheel, or a drop down, but is not limited thereto. In the disclosure, the 'data value related to the function' may be, for example, a current data value of the function provided by the AR device 100, such as a play time, a scroll bar position, or a selected item value, but is not limited thereto.

The wearable device may change the data value related to the function by using the control authority obtained from the AR device 100. The wearable device may change the data value of the function by a user input based on the control authority. The processor 130 may receive the changed data value from the wearable device through the communication interface 150. The processor 130 may update the data value of the function related to the virtual object by using the data value received from the wearable device.

The communication interface 150 is configured to perform data communication with an external device (e.g., the wearable device), or a server. In an embodiment of the disclosure, the communication interface 150 may include a short-range wireless communication module and a mobile communication module.

The short-range wireless communication module is configured to connect with an external device and perform data transceiving through a wireless communication network. For example, the short-range wireless communication module may be configured with at least one hardware module of Wi-Fi, a Wi-Fi Direct (WFD) communication unit, a Bluetooth communication unit, a Bluetooth low energy (BLE) communication unit, a near field communication (NFC) unit, a Zigbee communication unit, an Ant+ communication unit, or a μWave communication unit, but is not limited thereto. In an embodiment of the disclosure, the communication interface 150 may be paired with the wearable device through Bluetooth communication, and perform data transceiving with the wireless device through Bluetooth communication. However, the communication interface 150 is not limited thereto, and may perform data transceiving with the wireless device through at least one short-range wireless communication network of Wi-Fi, WFD, BLE, NFC, Zigbee, Ant+, or μWave.

The mobile communication module is a communication module configured to transmit and receive a wireless signal with at least one of a base station, an external device, or a server on a mobile communication network. The mobile communication module may transceive data by using at least one of 5th-generation (5G) mmWave communication, 5G Sub6 communication, Long Term Evolution (LTE) communication, or 3rd-generation (3G) mobile communication. In an embodiment of the disclosure, the mobile communication module may transceive data to and from the server by the control of the processor 130.

Figure 3:
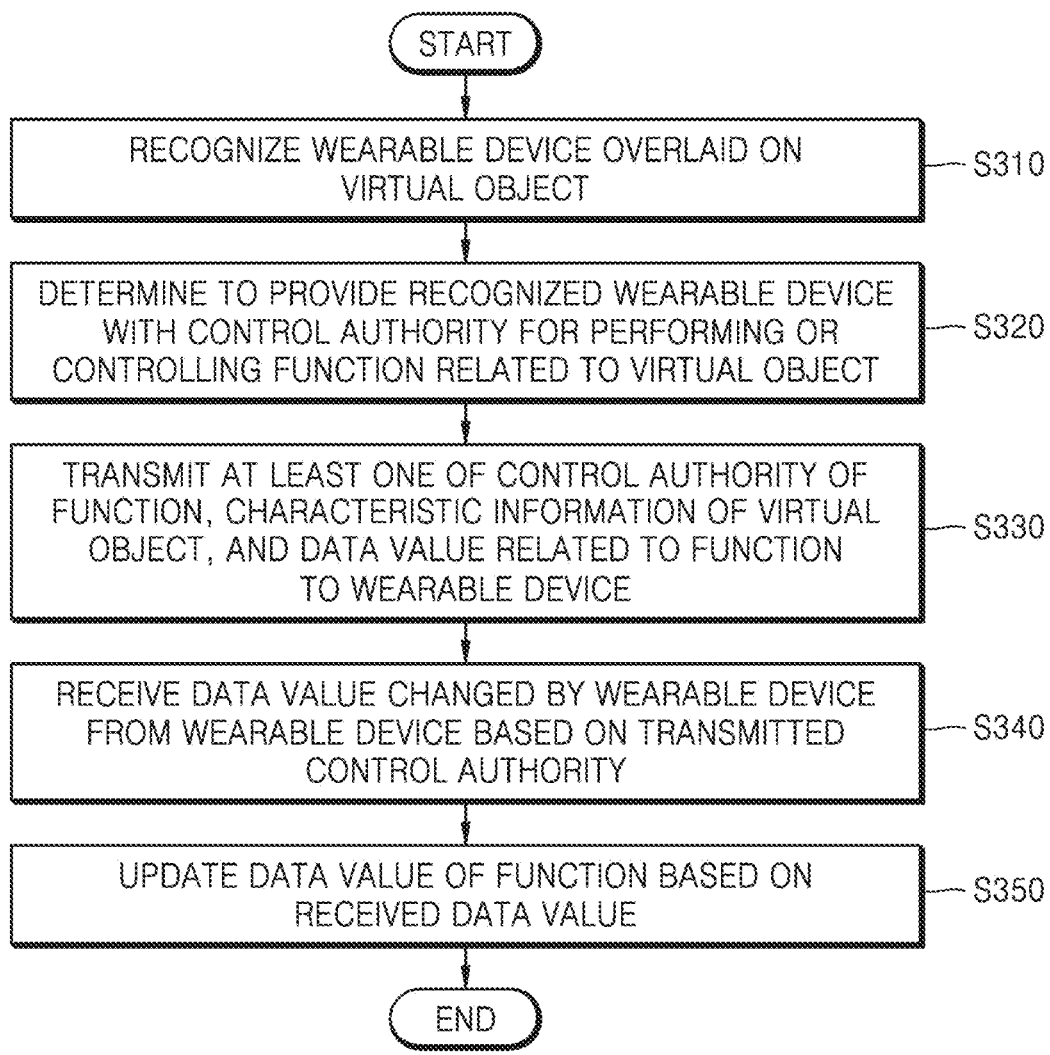
FIG. 3 is a flowchart illustrating a method of operating an AR device according to an embodiment of the disclosure.

FIG. 3 is a flowchart illustrating a method of operating an AR device according to an embodiment of the disclosure.

Referring to FIG. 3, in operation S310, an AR device 100 recognizes a wearable device overlaid on a virtual object. The AR device 100 may obtain an image frame by capturing the wearable device from a camera 110 (see FIG. 2), and recognize the wearable device from the obtained image frame. In an embodiment of the disclosure, the wearable device may be overlaid on a virtual object projected through the waveguide 122. The AR device 100 may recognize the wearable device overlaid on the virtual object from the image frame. The AR device 100 may recognize the wearable device from the image frame by using an AI model. For example, the AI model may be implemented as a DNN model including at least one of a CNN, an RNN, an RBM, a DBN, a BRDNN, or a deep Q-Network. However, the AR device 100 is not limited thereto, and may recognize the wearable device from the image frame through the known image processing method.

In an embodiment of the disclosure, the AR device 100 may recognize the user's hand wearing or gripping the wearable device. In an embodiment of the disclosure, the AR device 100 may recognize a gesture of the user's hand wearing or gripping the wearable device. In an embodiment of the disclosure, the AR device 100 may recognize a repetitive operation repeated more than a preset number of times by the user's hand wearing or gripping the wearable device.

In operation S320, the AR device 100 determines to provide the recognized wearable device with control authority for performing or controlling a function related to the virtual object. In an embodiment of the disclosure, the AR device 100 may determine whether to provide the control authority of the function to the wearable device based on a time for which the virtual object is overlaid by the recognized hand from the image frame. The AR device 100 may determine to provide the control authority of the function to the wearable device when the time for which the virtual object is overlaid by the hand exceeds a preset time.

In an embodiment of the disclosure, the AR device 100 may determine whether to provide the control authority of the function to the wearable device based on the recognized gesture of the hand. For example, when the recognized gesture is the same as or similar to the preset gesture, the AR device 100 may compare the recognized gesture with the preset gesture, identify the gesture according to a comparison result, and determine to provide the control authority of the function to the wearable device based on an identification result.

In an embodiment of the disclosure, the AR device 100 may determine to provide the control authority of the function to the wearable device based on the recognized repetitive operation. For example, when a scroll operation is repeated five or more times, the processor 130 may determine to provide control authority regarding a scroll function to the wearable device.

In an embodiment of the disclosure, the AR device 100 may select a function UI related to a function to provide control authority to the wearable device from among a plurality of function UIs included in the virtual object. The virtual object may include the plurality of UIs for performing a plurality of functions provided by an application. The AR device 100 may identify a function UI overlaid by the user's hand wearing or gripping the wearable device among the plurality of function UIs. The AR device 100 may determine to provide the wearable device with control authority over a function performed or controlled by the identified function UI.

In an embodiment of the disclosure, the AR device 100 may display a control area of the function UI determined to provide the control authority to the wearable device in a color distinguished from another area within the virtual object (e.g., an execution screen of the application or a control area of at least one unselected function UI).

In operation S330, the AR device 100 transmits at least one of the control authority of the function, characteristic information of the virtual object, or the data value related to the function to the wearable device. In an embodiment of the disclosure, the 'characteristic information of the virtual object' may include information on a type of a function UI included in the virtual object. The type of function UI may include, for example, a slider, a scroll bar, a spinner, a button, a wheel, or a drop down, but is not limited thereto.

The 'data value related to the function' may be, for example, a current data value of the function provided by the AR device 100, such as a play time, a scroll bar position, or a selected item value, but is not limited thereto.

In operation S340, the AR device 100 receives a data value changed by the wearable device from an external device based on the transmitted control authority. The wearable device may change the data value related to the function by using the control authority obtained from the AR device 100. The wearable device may change the data value of the function by a user input based on the control authority. The AR device 100 may receive the changed data value from the wearable device.

In operation S350, AR device 100 updates the data value of the function based on the received data value.

In the embodiments shown in FIGS. 2 and 3, it has been described that the AR device 100 provides the wearable device with the control authority of the function and is controlled by the wearable device, but the disclosure is not limited thereto. In an embodiment of the disclosure, the AR device 100 may provide control authority over a function of an external device, for example, a mobile device, a smart phone, a laptop computer, a desktop PC, a tablet PC, an e-book terminal, a digital broadcasting terminal, a PDA, a PMP, navigation, an MP3 player, or a camcorder, and may be controlled by the external device.

Figure 4:
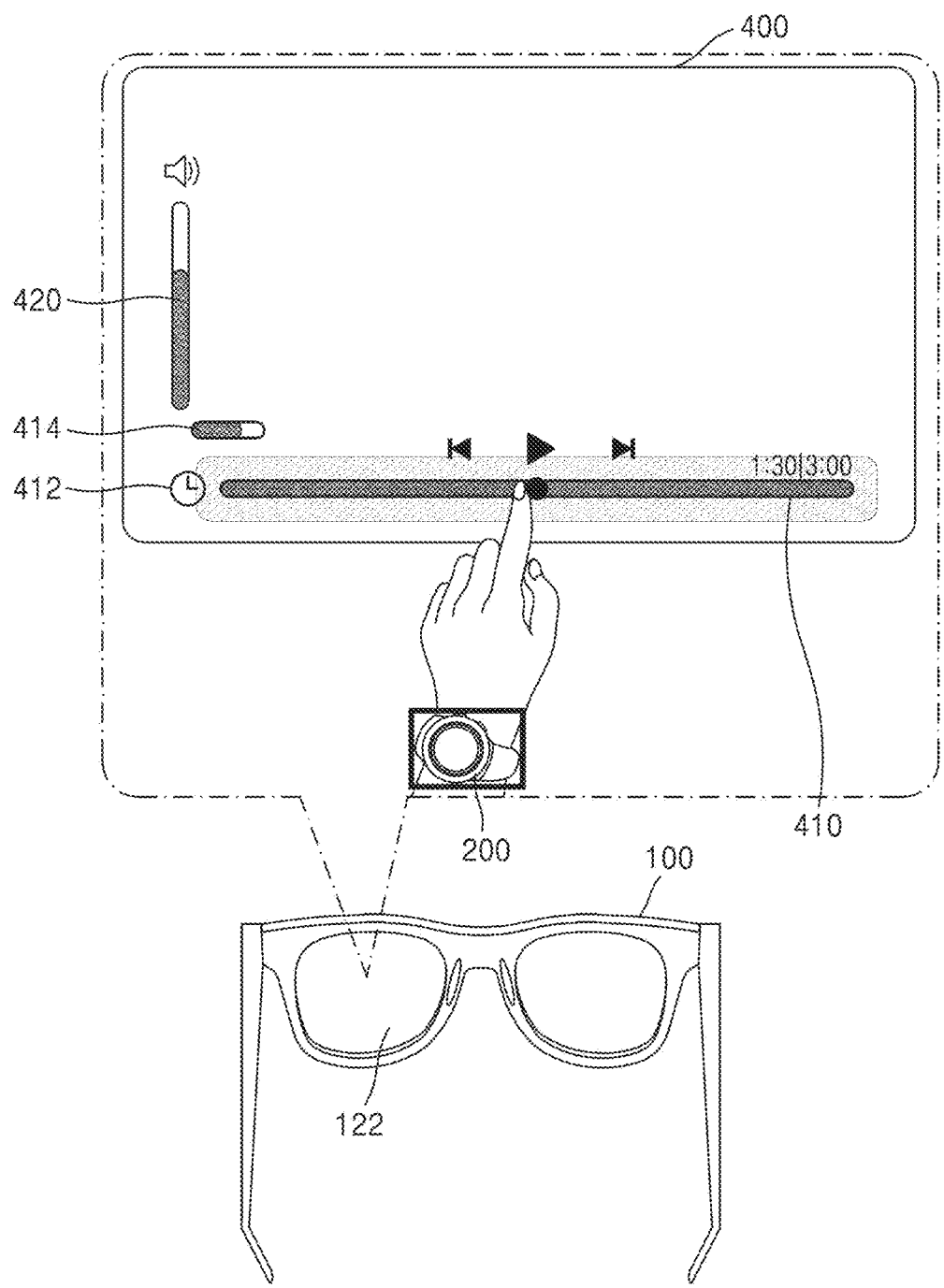
FIG. 4 is a diagram illustrating an operation in which an AR device determines to provide control authority to a wearable device, according to an embodiment of the disclosure.

FIG. 4 is a diagram illustrating an operation in which an AR device determines to provide control authority to a wearable device according to an embodiment of the disclosure.

Referring to FIG. 4, an AR device 100 may display a virtual object 400 on a waveguide 122. The virtual object 400 may be generated by an optical engine 124 (see FIG. 3) by the control of a processor 130 (see FIG. 2), projected onto the waveguide 122 by the optical engine 124, and displayed to a user. In the drawings of the disclosure including FIG. 4, the virtual object 400 is projected onto the waveguide 122 of the left eye, but this is for convenience of explanation and is not limited to those as shown in the drawings. In the disclosure, the virtual object 400 may be projected not only through the waveguide 122 of the left eye but also through the waveguide 122 of the right eye. The virtual object 400 may include one or more function UIs 410, 412, 414, and 420 provided through an application executed by the AR device 100. In an embodiment shown in FIG. 4, the application executed by the AR device 100 may be a video play application or a video streaming application. When the application executed by the AR device 100 is the video play application, the virtual object 400 may further include an execution screen (e.g., a video play screen) of the application.

The AR device 100 may recognize the wearable device 200 overlaid with the virtual object 400 through a vision recognition technology. In an embodiment of the disclosure, the processor 130 of the AR device 100 may obtain an image frame by capturing the wearable device 200 and the user's hand wearing or gripping the wearable device 200 through the camera 110 (see FIG. 2), and may recognize the wearable device 200 from the image frame by using an AI model. The 'AI model' may include a DNN model trained to recognize objects from image data and classify the objects according to types. The DNN model may include at least one of, for example, a CNN, an RNN, an RBM, a DBN, a BRDNN, or a deep Q-Network. The processor 130 may recognize the user's hand through inference of inputting the image frame to the DNN model.

However, the disclosure is not limited thereto, and the processor 130 may recognize the wearable device 200 or the user's hand from the image frame by using known image processing technology.

The processor 130 may measure a time for which the virtual object is overlaid by the recognized hand, and determine whether to provide control authority of a function to the wearable device 200 based on whether the measured time exceeds a preset time. In an embodiment shown in FIG. 4, the processor 130 may measure a time for which the first function UI 410 is overlaid by the user's hand wearing the wearable device 200 among the plurality of function UIs 410, 412, 414, and 420 included in the virtual object 400. The processor 130 may display a second function UI 412 and a third function UI 414 indicating the measured time through the waveguide 122. The second function UI 412 may be, for example, a clock icon indicating the time for which the virtual object is overlaid by the user's hand, and the third function UI 414 may be a progress bar indicating a degree of passage of a time measured for a preset time, but the disclosure is not limited thereto. When the measured time exceeds the preset time, the processor 130 may determine to provide the wearable device 200 with the control authority of the function.

The processor 130 may provide the wearable device 200 with control authority over a function performed or controlled by the virtual object 400 overlaid by the user's hand. In the embodiment shown in FIG. 4, the processor 130 may transmit control authority over a play time control function performed or controlled through the first function UI 410 to the wearable device 200.

Figure 5A:
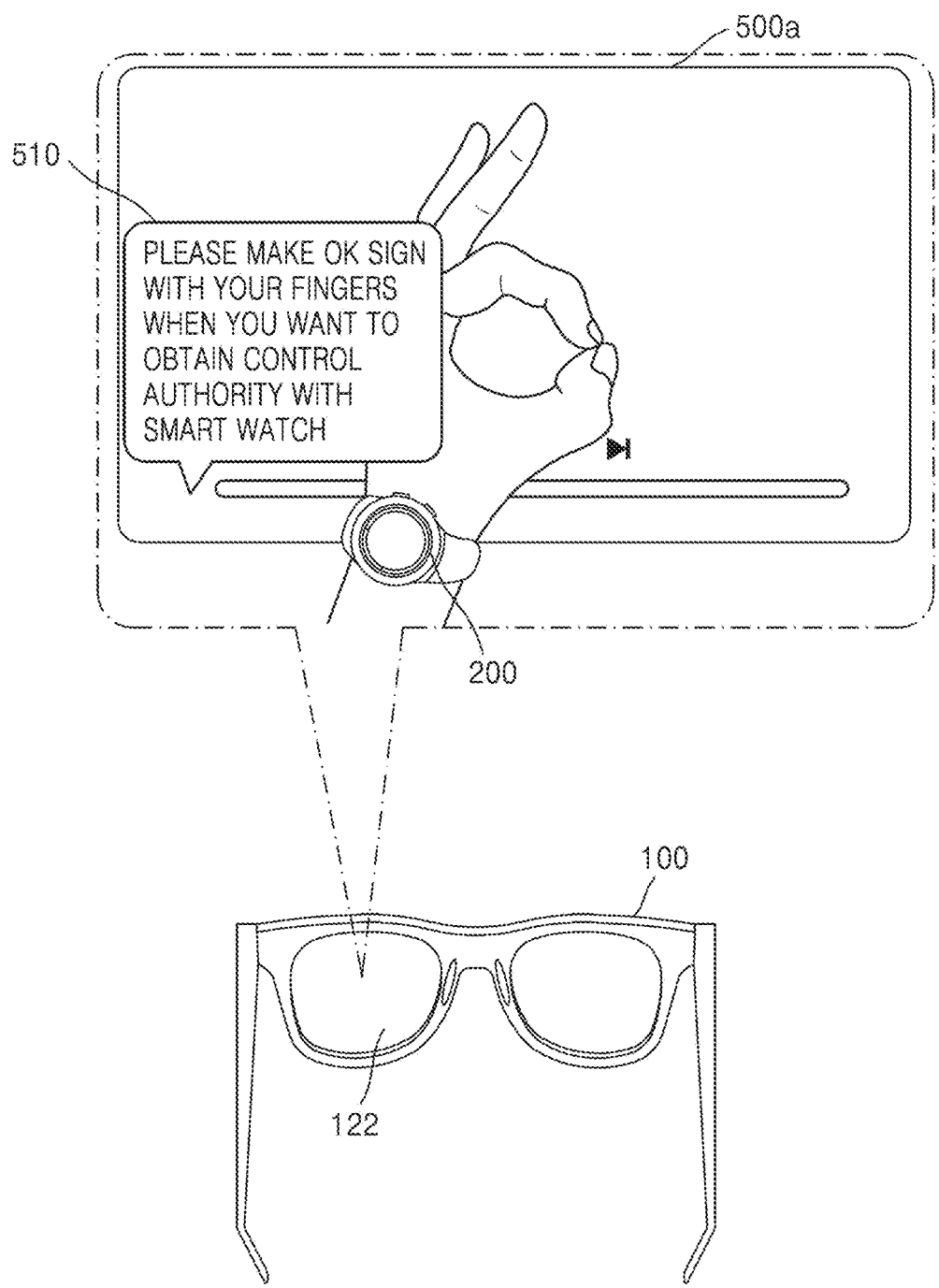
FIG. 5A is a diagram illustrating an operation in which an AR device determines to provide control authority to a wearable device based on a user's gesture, according to an embodiment of the disclosure.

FIG. 5A is a diagram illustrating an operation in which an AR device determines to provide control authority to a wearable device based on a user's gesture according to an embodiment of the disclosure.

Referring to FIG. 5A, an AR device 100 may display a virtual object 500*a* on a waveguide 122. The virtual object 500*a* may be generated by an optical engine 124 (see FIG. 3) by the control of a processor 130 (see FIG. 2), projected onto the waveguide 122 by the optical engine 124, and displayed to a user.

The AR device 100 may recognize the wearable device 200 overlaid with the virtual object 500*a* through a vision recognition technology. The AR device 100 may recognize the gesture of the user's hand wearing or gripping the wearable device 200. The processor 130 of the AR device 100 may recognize the user's gesture from a plurality of image frames obtained by capturing the user's hand through the camera 110 (see FIG. 2). In an embodiment of the disclosure, the processor 130 may recognize the gesture of the user's hand from the plurality of image frames by using an AI model. However, the disclosure is not limited thereto, and the processor 130 may recognize the gesture of the user's hand from the plurality of image frames by using the known image processing technology. In an embodiment shown in FIG. 5A, the processor 130 may recognize the gesture (OK gesture) of drawing a circle by using the index finger and the thumb of the hand wearing the wearable device 200.

The processor 130 may determine whether to provide the wearable device 200 with the control authority of the function based on the recognized gesture of the hand. For example, when the recognized gesture is the same as or similar to a preset gesture, the processor 130 may compare the recognized gesture with the preset gesture, identify the gesture according to a comparison result, and determine to provide the wearable device 200 with the control authority of the function according to an identification result.

The processor 130 may generate a pop-up message 510 that guides the user whether to provide the control authority to the wearable device 200, and control the optical engine 124 (see FIG. 2) to project the pop-up message 510 onto the waveguide 122. The pop-up message 510 may be, for example, a message that guides the user to induce a gesture such as "Please make OK sign with your fingers if you want to obtain control authority with smart watch", and provide the control authority to the wearable device 200. The processor 130 may control the optical engine 124 to make the pop-up message 510 disappear from the waveguide 122 after a preset time has elapsed. For example, when 2 seconds have elapsed since the pop-up message 510 was displayed, the processor 130 may not display the pop-up message 510.

The pop-up message 510 is shown and described to be displayed in the embodiment of FIG. 5A, the disclosure is not limited thereto. In an embodiment of the disclosure, the processor 130 may recognize the gesture of the user's hand without displaying the pop-up message 510, and determine to provide the control authority to the wearable device 200 based on the recognized gesture.

Figure 5B:
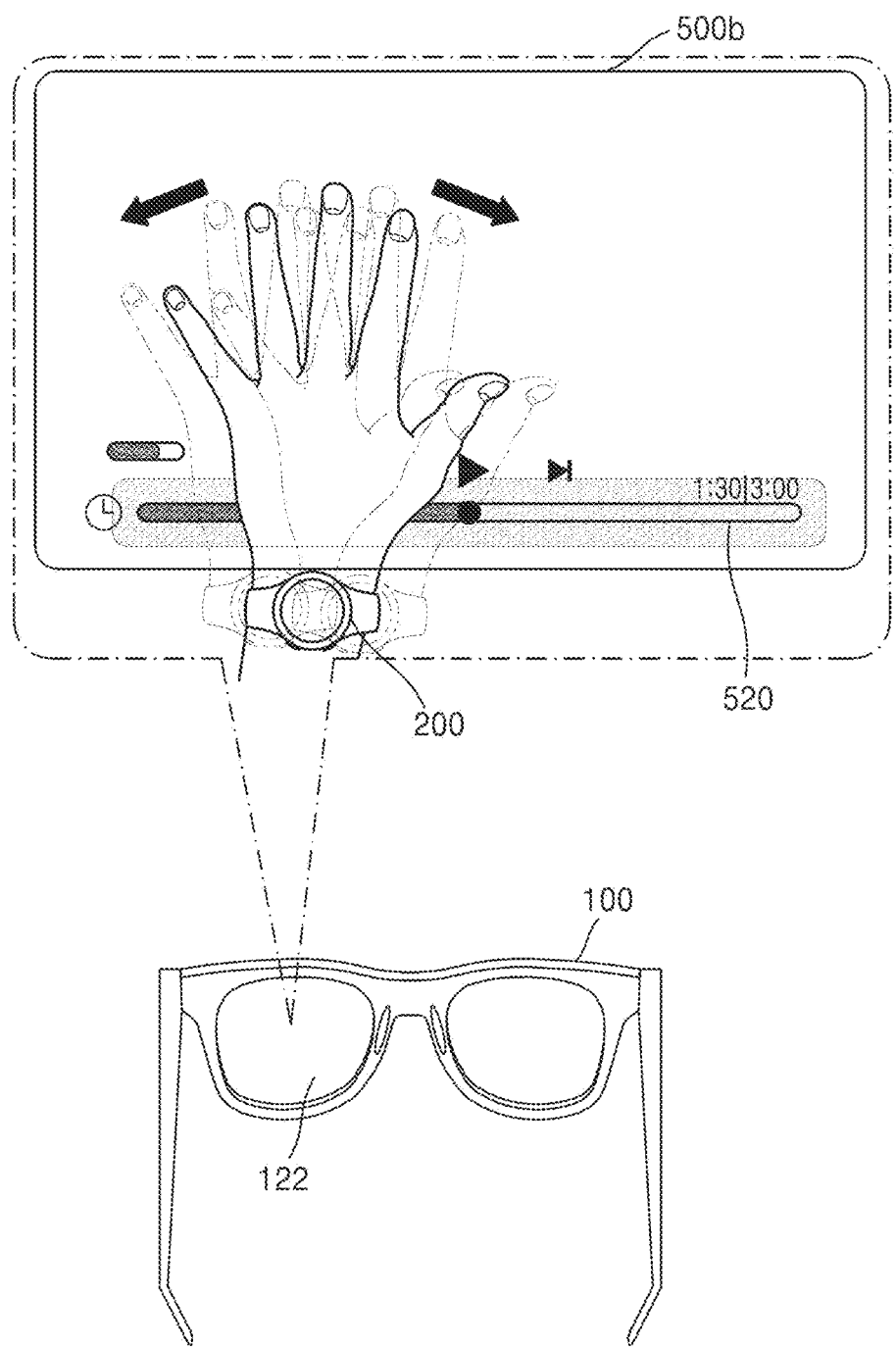
FIG. 5B is a diagram illustrating an operation in which an AR device retrieves control authority from a wearable device based on a user's gesture, according to an embodiment of the disclosure.

FIG. 5B is a diagram illustrating an operation in which an AR device retrieves control authority from a wearable device based on a user's gesture according to an embodiment of the disclosure.

The embodiment shown in FIG. 5B is the same as the embodiment of FIG. 5A except for a type of the user's gesture and the corresponding operation of the AR device 100, and thus, redundant descriptions are omitted.

Referring to FIG. 5B, an AR device 100 may display a virtual object 500*b* and a function UI 520 on a waveguide 122 and may recognize the gesture of the user's hand while already providing control authority over some functions to a wearable device 200. The processor 130 (see FIG. 2) of the AR device 100 may recognize the gesture of shaking the hand left and right with the fingers of the hand wearing the wearable device 200 spread.

The processor 130 may determine whether to retrieve the control authority provided to the wearable device 200 based on the recognized gesture of the hand. For example, the processor 130 may compare the recognized gesture with a preset gesture, identify the gesture according to a comparison result, and determine to retrieve the control authority of the function from the wearable device 200 according to an identification result. In an embodiment shown in FIG. 5B, the processor 130 may recognize the gesture of shaking the hand left and right with the fingers spread and determine to retrieve the control authority provided to the wearable device 200 based on a recognition result. When the control authority has not yet been provided to the wearable device 200, the processor 130 may end a process of providing the control authority according to the recognized gesture.

FIG. 6 is a diagram illustrating an operation in which an AR device determines to provide control authority to a wearable device based on a repetitive operation of a user according to an embodiment of the disclosure.

Referring to FIG. 6, an AR device 100 may display a virtual object 600 on a waveguide 122. The virtual object 600 may be generated by an optical engine 124 (see FIG. 3) by the control of a processor 130 (see FIG. 2), projected onto the waveguide 122 by the optical engine 124, and displayed to a user.

The AR device 100 may recognize the wearable device 200 overlaid with the virtual object 600 through a vision recognition technology. The AR device 100 may recognize the repetitive operation that is repeated more than a preset number of times by the user's hand wearing or gripping the wearable device 200 (operation ①). The processor 130 of the AR device 100 may recognize, for example, an operation of repeatedly scrolling or repeatedly swiping a partial area on the virtual object 600 by the user's hand. In the embodiment shown in FIG. 6, the virtual object 600 is a web browser execution screen that provides content such as webtoon, and the processor 130 may recognize an operation of repeatedly scrolling a webtoon display area of a web browser more than the preset number of times. The preset number of times may be, for example, 5 times, but is not limited thereto.

The processor 130 may determine to provide the wearable device 200 with the control authority of the function based on the recognized repetitive operation. For example, when the scroll operation is repeated five or more times, the processor 130 may determine to provide the wearable device 200 with control authority over a scroll function.

In an embodiment of the disclosure, when there is a history that the function being controlled by the user's hand through the virtual object 600 has been controlled by the wearable device 200 at a previous time, the processor 130 may determine to transmit the control authority of the function that is being controlled to the wearable device 200.

The wearable device 200 may obtain the control authority from the AR device 100 and output a notification message 610 notifying the user of the obtained control authority (operation ②). The wearable device 200 may display the notification message 610 on a display 250. In the embodiment shown in FIG. 6, the notification message 610 may be a message, such as "Would you like to control the scrolling of the Internet?", that notifies the user whether control authority of a specific function (e.g., the scroll function of the web browser) of the AR device 100 has been obtained through the wearable device 200, and confirms to the user whether to control the function through the wearable device 200.

In an embodiment of the disclosure, the wearable device 200 may output a vibration signal notifying whether the control authority has been obtained from the AR device 100.

Figure 7:
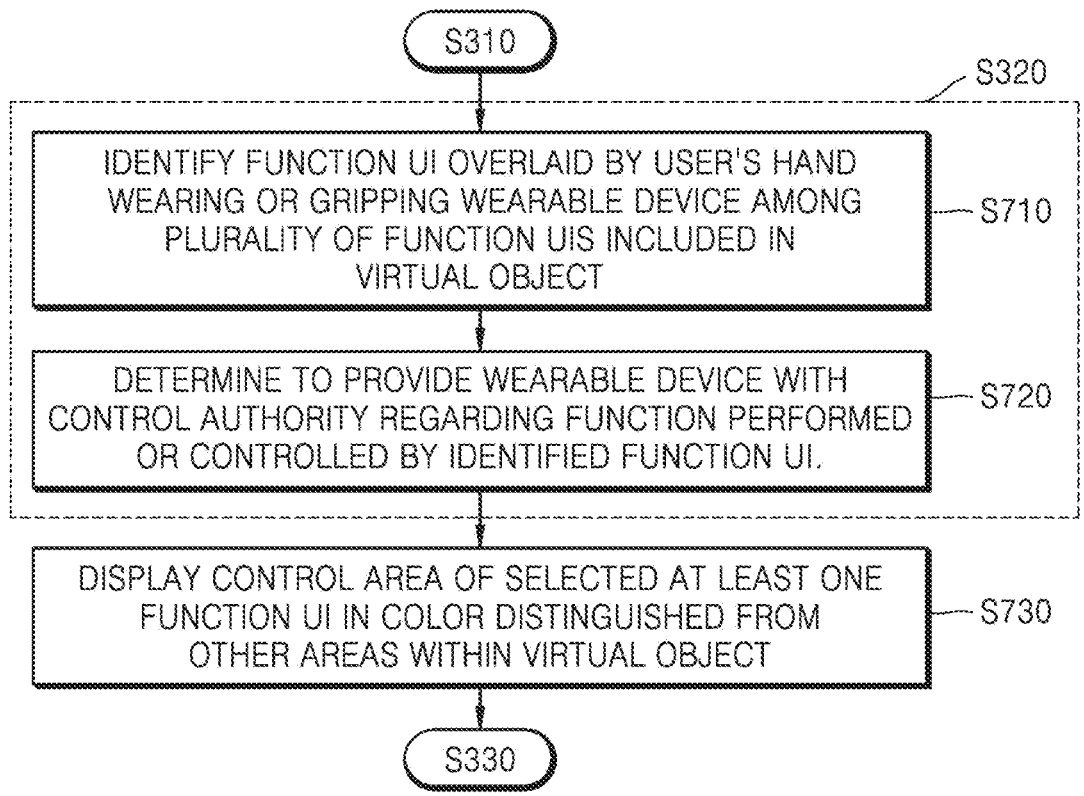
FIG. 7 is a flowchart illustrating a method in which an AR device transmits control authority regarding a function user interface (UI) to a wearable device, according to an embodiment of the disclosure.

FIG. 7 is a flowchart illustrating a method in which an AR device transmits control authority over a function UI to a wearable device according to an embodiment of the disclosure.

Operations S710 and S720 shown in FIG. 7 are operations in which operation S320 shown in FIG. 3 is embodied. Operation S710 shown in FIG. 7 may be performed after operation S310 of FIG. 3 is performed. After operation S730 shown in FIG. 7 is performed, operation S330 of FIG. 3 may be performed.

Figure 8A:
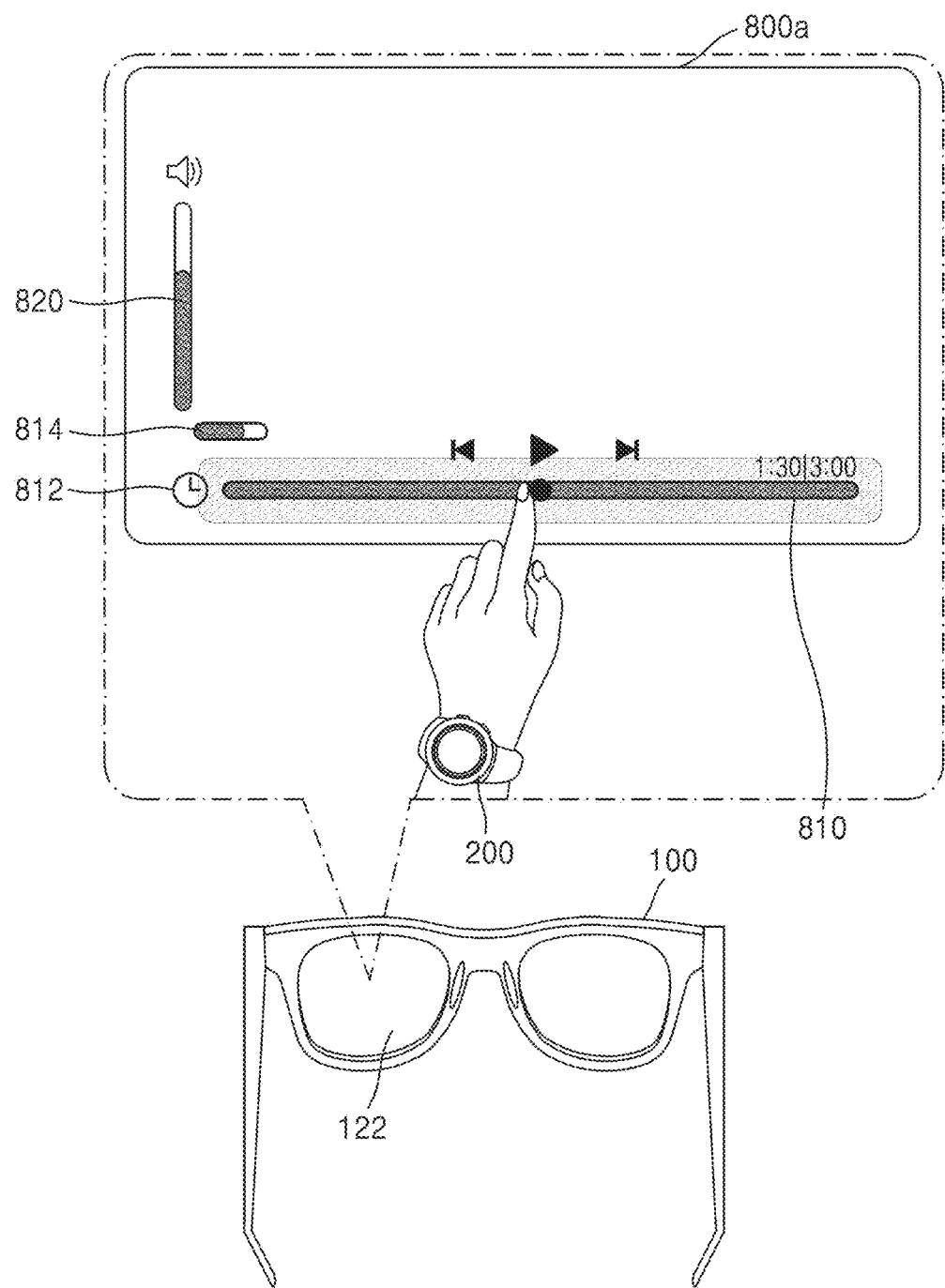
FIG. 8A is a diagram illustrating an operation in which an AR device displays a function UI related to a function to provide control authority to a wearable device, according to an embodiment of the disclosure.

FIG. 8A is a diagram illustrating an operation in which an AR device displays a function UI related to a function to provide control authority to a wearable device according to an embodiment of the disclosure. Hereinafter, a method of operating the AR device 100 will be described with reference to FIG. 7 and FIG. 8A together.

Referring to FIG. 7, in operation S710, an AR device 100 identifies the function UI overlaid by the user's hand wearing a wearable device 200 (see FIG. 8A) among a plurality of function UIs included in a virtual object. Referring to FIG. 8A together, the AR device 100 may recognize the user's hand overlaid with a part of a virtual object 800*a* displayed through the waveguide 122. The user's hand may be wearing or gripping the wearable device 200. The processor 130 (see FIG. 2) of the AR device 100 may identify the function UI overlaid by the user's hand among a plurality of function UIs 810, 812, 814, and 820 included in the virtual object 800*a*. In an embodiment shown in FIG. 8A, the processor 130 may identify a first function UI 810 overlaid by the hand.

In an embodiment of the disclosure, the processor 130 may measure a time for which the user's hand is overlaid on the function UI in a hover state, and identify the function UI in which the measured time exceeds a preset time (e.g., 2 seconds). In an embodiment shown in FIG. 8A, the processor 130 may measure the time for which the user's hand is overlaid on the first function UI 810 in the hover state, and determine whether the measured time elapses 2 seconds. In this case, the processor 130 may display a second function UI 812 and a third function UI 814 indicating the time for which the first function UI 810 is overlaid by the user's hand through the waveguide 122. The second function UI 812 may be, for example, a clock icon indicating the time for which the first function UI 810 is overlaid by the user's hand, and the third function UI 814 may be a progress bar indicating a degree of passage of a time measured for a preset time, but the disclosure is not limited thereto.

In operation S720, the AR device 100 may determine to provide the wearable device 200 with control authority over a function performed or controlled by the identified function UI. Referring to FIG. 8A together, the processor 130 may determine whether to selectively provide the wearable device 200 with the control authority over the function related to the identified function UI based on whether the running application is able to provide an API with respect to each of the plurality of function UIs 810, 812, 814, and 820. For example, when the application is able to provide the APIs with respect to all the plurality of function UIs 810, 812, 814, and 820, the processor 130 may selectively provide the wearable device 200 with only the control authority of the function corresponding to the first function UI 810 selected by the user's hand.

For the opposite example, when the application is a third party application that provides no API, the processor 130 may not provide the wearable device 200 with control authority over a function corresponding to a function UI among the plurality of function UIs 810, 812, 814, and 820.

Figure 8B:
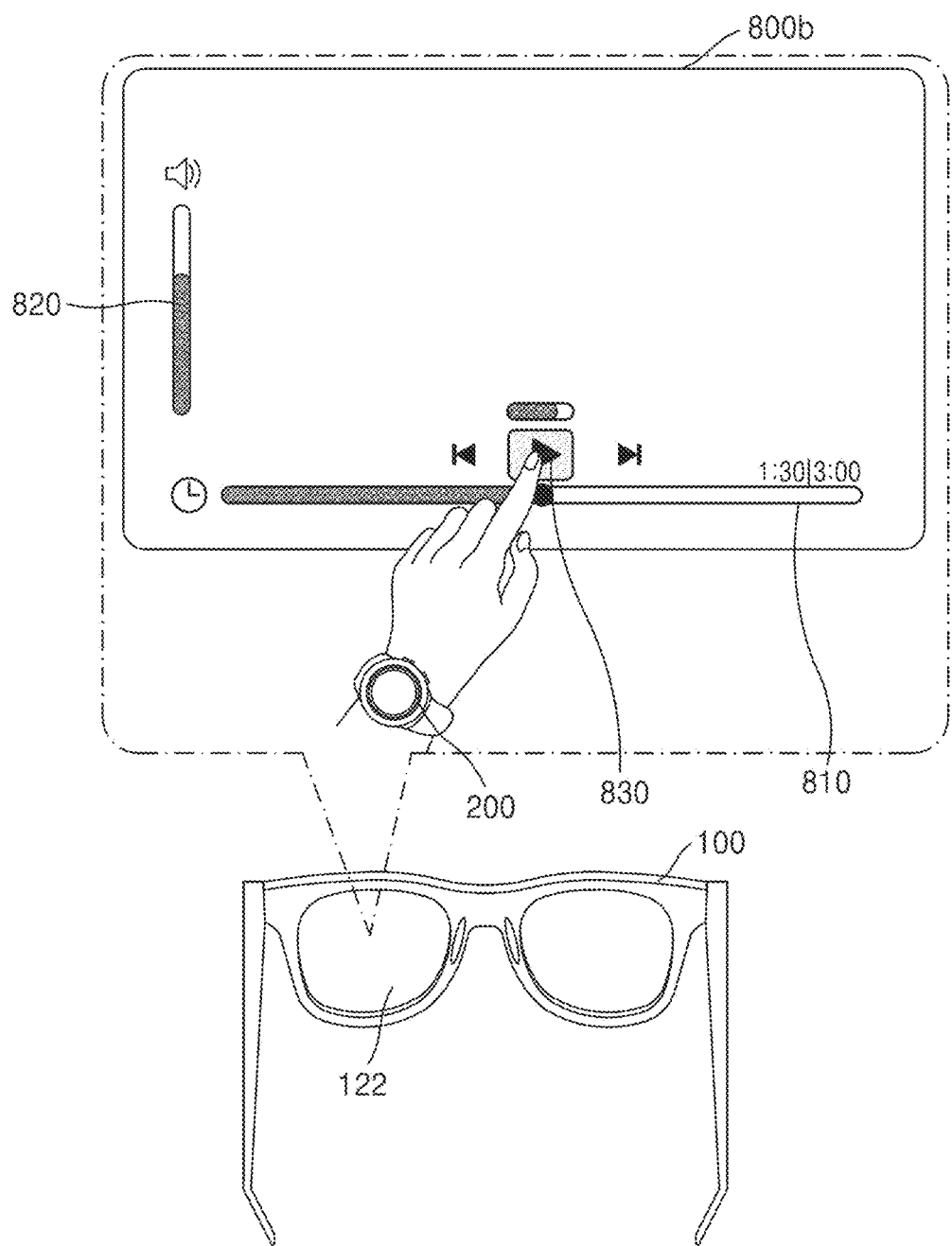
FIG. 8B is a diagram illustrating an operation in which an AR device displays a function UI related to a function to provide control authority to a wearable device, according to an embodiment of the disclosure.
Figure 8C:
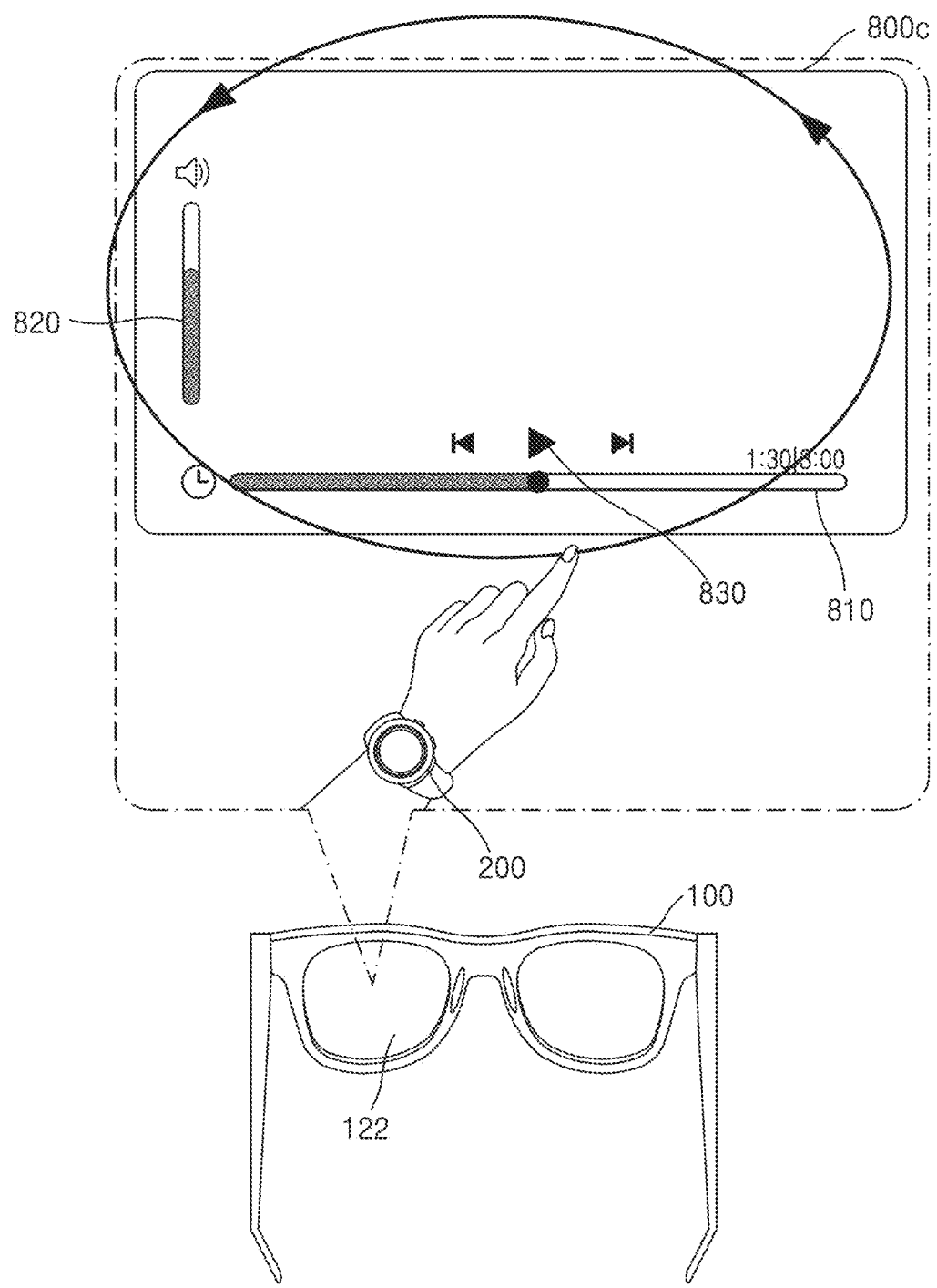
FIG. 8C is a diagram illustrating an operation in which an AR device selects a function UI related to a function to provide control authority to a wearable device, according to an embodiment of the disclosure.

FIG. 8C is a diagram illustrating an operation in which an AR device selects a function UI related to a function to provide control authority to a wearable device according to an embodiment of the disclosure.

Referring to FIG. 8C, a virtual object 800*c* projected onto a waveguide 122 by a running application may include a plurality of function UIs 810, 820, and 830. In an embodiment shown in FIG. 8C, the application may be a third party application that does not provide an API with respect to each of the plurality of function UIs 810, 820, and 830. The processor 130 may recognize a gesture of turning a finger round to include all of the plurality of function UIs 810, 820, and 830, and determine to provide the wearable device 200 with control authority of a plurality of functions respectively corresponding to the plurality of function UIs 810, 820, and 830 based on the recognized gesture. When the API with respect to each of the plurality of function UIs 810, 820, and 830 is not provided, the wearable device 200 may use the display 250 (see FIGS. 11 and 16) as a touch pad to control all functions provided by the application of the AR device 100 according to a touch input received through the touch pad. A specific embodiment in which the wearable device 200 uses the display 250 as the touch pad to control all functions of the AR device 100 will be described in detail with reference to FIGS. 16 and 21.

Referring back to FIG. 7, in operation S730, the AR device 100 displays a control area of the identified function UI in a color distinguished from other areas in the virtual object. Referring to FIG. 8A together, the processor 130 of the AR device 100 may display the first function UI 810, which is the function UI related to the control authority of the function provided to the wearable device 200, in a color different from those of the other function UIs 812, 814, and 820.

FIG. 8B is a diagram illustrating an operation in which an AR device 100 displays a third function UI related to a function to provide control authority to a wearable device according to an embodiment of the disclosure.

Referring to FIG. 8B, an AR device 100 may project a virtual object 800b including a plurality of function UIs 810, 820, and 830 onto a waveguide 122 and display the virtual object 800b to a user through the waveguide 122. Referring to FIG. 8B together with operation S730 of FIG. 7, a processor 130 of the AR device 100 may determine to provide a wearable device 200 with control authority of the function performed or controlled by a third function UI 830 overlaid by the user's hand, and display the size of the third function UI 830 larger than those of the other function UIs 810 and 820. In an embodiment of the disclosure, the processor 130 may further display a box type UI indicating a control area of the third function UI 830.

Figure 9:
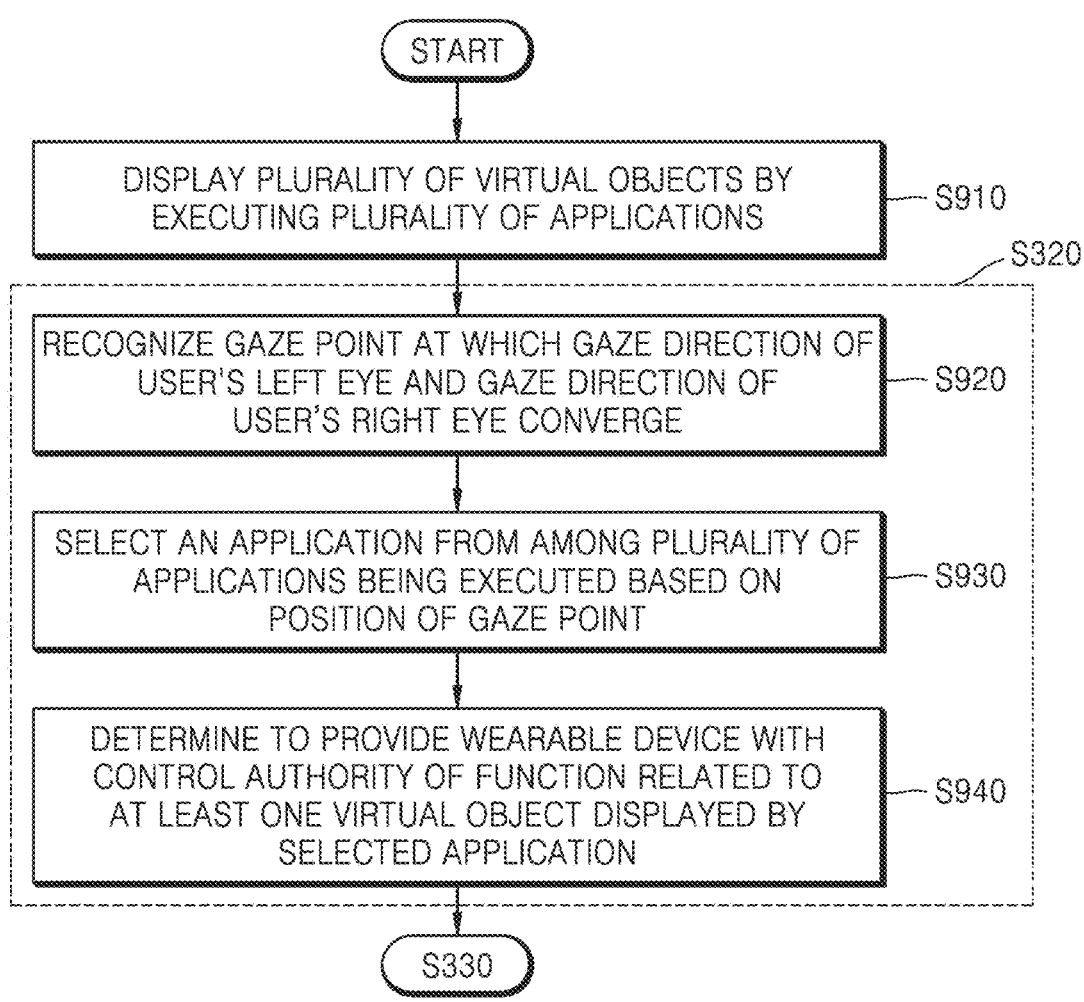
FIG. 9 is a flowchart illustrating a method in which an AR device determines a virtual object related to a function to be provided based on a gaze point of a user, according to an embodiment of the disclosure.

FIG. 9 is a flowchart illustrating a method in which an AR device determines a virtual object related to a function to be provided based on a gaze point of a user according to an embodiment of the disclosure.

Operations S920 to S940 shown in FIG. 9 are operations specifying operation S320 shown in FIG. 3. After operation S940 shown in FIG. 9 is performed, operation S330 of FIG. 3 may be performed.

Figure 10:
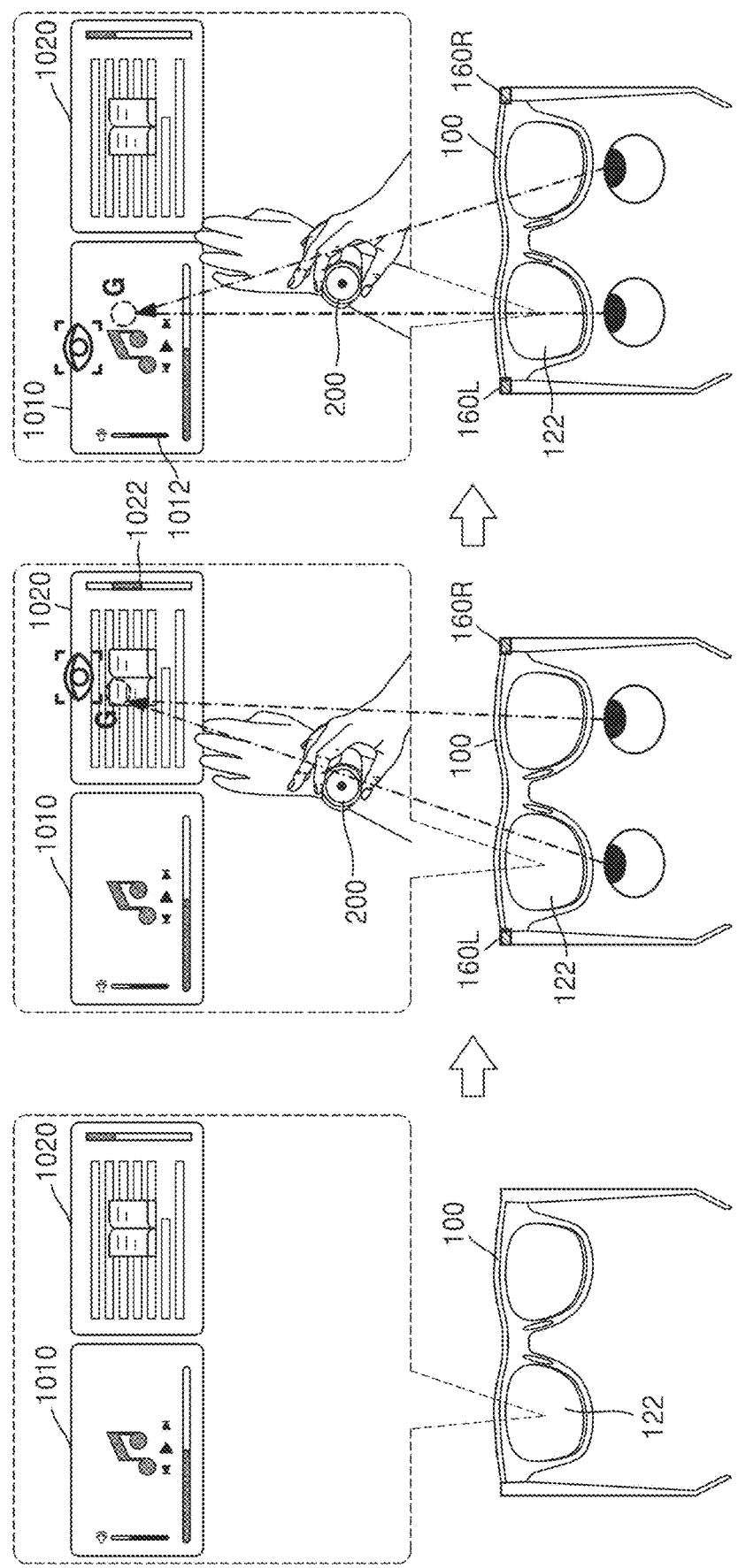
FIG. 10 is a diagram illustrating an operation in which an AR device determines a virtual object related to a function to provide control authority to a wearable device based on a gaze point of a user, according to an embodiment of the disclosure.

FIG. 10 is a diagram illustrating an operation in which an AR device determines a virtual object related to a function to provide control authority to a wearable device based on a gaze point of a user according to an embodiment of the disclosure. Hereinafter, an operation in which the AR device 100 determines the virtual object related to control authority to be provided to the wearable device 200 based on the gaze point of the user will be described with reference to FIGS. 9 and 10.

Referring to FIG. 9, in operation S910, an AR device 100 may display a plurality of virtual objects by executing a plurality of applications.

Referring to FIG. 10, a processor 130 (see FIG. 2) of an AR device 100 may execute two applications and control an optical engine 124 (see FIG. 2) to project a plurality of virtual objects 1010 and 1020 respectively provided by the two applications onto a waveguide 122. A user may see the plurality of virtual objects 1010 and 1020 projected through the waveguide 122. The plurality of virtual objects 1010 and 1020 may be execution screens of different applications. For example, a first virtual object 1010 may be a music play screen that is an execution screen of a music application, and a second virtual object 1020 may be a screen displaying text of an e-book that is an execution screen of an e-book application. Each of the first virtual object 1010 and the second virtual object 1020 may include at least one function UI. In FIG. 10, the AR device 100 is shown and described to execute the two applications, but the disclosure is not limited thereto. In an embodiment of the disclosure, the AR device 100 may display a plurality of virtual objects by simultaneously executing three or more applications.

In operation S920, the AR device 100 recognizes the gaze point at which a gaze direction of the user's left eye and a gaze direction of the user's left eye converge. Referring to FIG. 10 together, the AR device 100 may include a first eye tracking sensor 160L that obtains gaze direction information by detecting the gaze direction of the user's left eye and a second eye tracking sensor 160R that obtains gaze direction information by detecting the gaze direction of the user's left eye. The processor 130 of the AR device 100 may obtain the gaze direction information of the user's left eye from the first eye tracking sensor 160L and obtain the gaze direction information of the user's right eye from the second eye tracking sensor 160R. The processor 130 may recognize a gaze point G by using gaze information about a binocular disparity, the gaze direction of the user's left eye, and the gaze direction of the user's right eye. The processor 130 may obtain a 3D position coordinate value of the recognized gaze point G.

In operation S930, the AR device 100 selects an application from among a plurality of applications being executed based on the position of the gaze point. Referring to FIG. 10 together, the processor 130 of the AR device 100 may recognize that the position of the gaze point G is within a control area of the second virtual object 1020 displayed by the e-book application, and may select the e-book application among the music application and the e-book application based on a recognition result.

In operation S940, the AR device 100 determines to provide the wearable device 200 with control authority of the function related to at least one virtual object displayed by the selected application. Referring to FIG. 10 together, the processor 130 of the AR device 100 may determine to provide the wearable device 200 with control authority of a function performed or controlled by a second function UI 1022 displayed by the selected e-book application based on the position of the gaze point G. For example, the second function UI 1022 may be a UI that controls a function of scrolling a screen of an e-book displayed through the second virtual object 1020. When control authority of the scroll function related to the second function UI 1022 is provided to the wearable device 200, the wearable device 200 may receive a user input for rotating a rotary bezel ring in a clockwise or counterclockwise direction, and scroll the e-book screen displayed by the AR device 100 up and down based on the received user input.

When the position of the gaze point G of the user is changed to the first virtual object 1010, which is the execution screen of the music application, the processor 130 may change the function having control authority provided to the wearable device 200 to a function performed or controlled by a first function UI 1012. The first function UI 1012 may be a scroll bar UI for controlling volume of music provided through the first virtual object 1010. The processor 130 may provide the wearable device 200 with control authority over a volume control function performed or controlled by the first function UI 1012 in response to the position of the gaze point G being changed. When the control authority of the volume control function related to the first function UI 1012 is provided to the wearable device 200, the wearable device 200 may adjust the volume of music output by the AR device 100 based on the user input for rotating the rotary bezel ring in the clockwise or counterclockwise direction.

Figure 11:
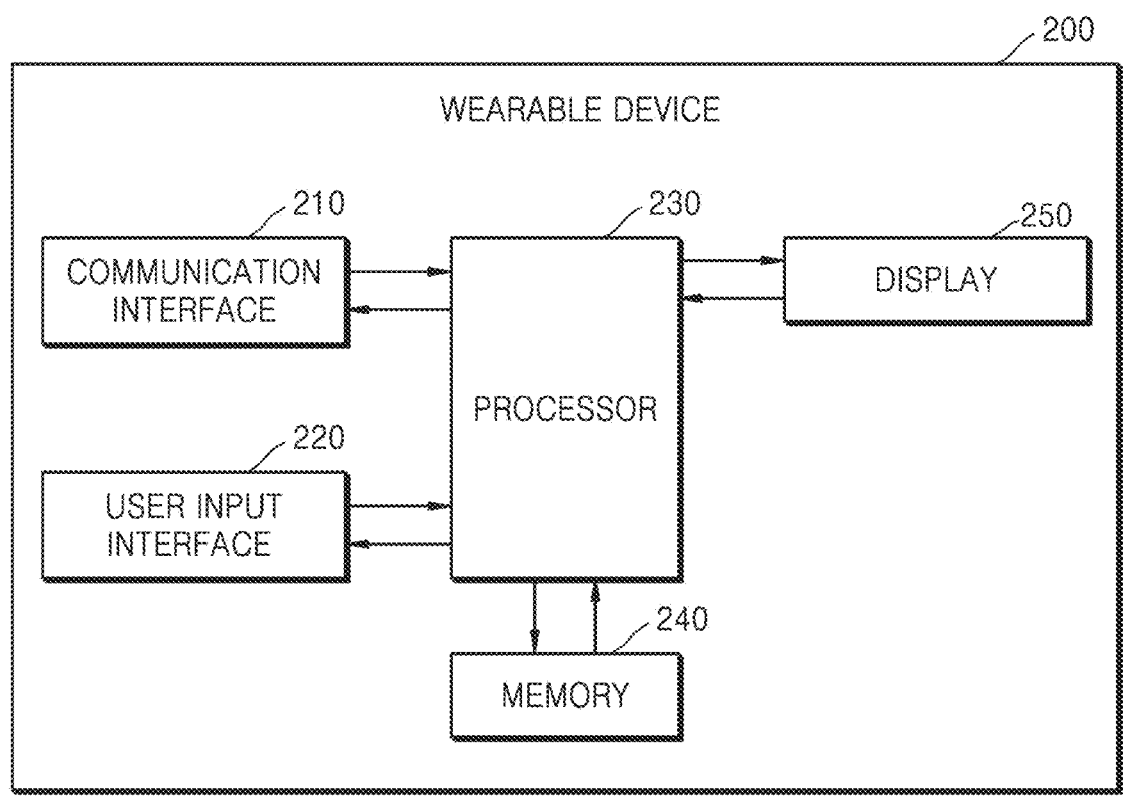
FIG. 11 is a block diagram illustrating components of a wearable device, according to an embodiment of the disclosure.

FIG. 11 is a block diagram illustrating components of a wearable device according to an embodiment of the disclosure.

Referring to FIG. 11, a wearable device 200 is a device worn on a part of the user's body and carried in a worn state. In an embodiment of the disclosure, the wearable device 200 may be a smart watch worn on the user's wrist. However, the wearable device 200 is not limited thereto and may be at least one of, for example, a ring, bracelet, anklet, necklace, contact lens, clothing integrated device (e.g., electronic clothing), a body-attached device (e.g., skin pad), or a bio-implantable device (e.g., an implantable circuit).

Referring to FIG. 11, a wearable device 200 may include a communication interface 210, a user input interface 220, a processor 230, memory 240, and a display 250. The communication interface 210, the user input interface 220, the processor 230, the memory 240, and the display 250 may be electrically and/or physically connected to each other. FIG. 11 illustrates only essential components for explaining an operation of the wearable device 200, and the components included in the wearable device 200 are not limited to those shown in FIG. 11. In an embodiment of the disclosure, the wearable device 200 may further include a battery that supplies power to the communication interface 210, the user input interface 220, the processor 230, and the display 250. For example, when the wearable device 200 is a smart watch, the wearable device 200 may further include a strap 260 (see FIG. 13) for wearing on the user's wrist.

The communication interface 210 is connected to the AR device 100 through a short-range wireless communication method, and is configured to perform data communication with the AR device 100. In an embodiment of the disclosure, the communication interface 210 may be paired with the AR device 100 through a Bluetooth communication method. The communication interface 210 may transceive data to and from the AR device 100 through the Bluetooth communication method. However, the communication interface 210 is not limited thereto, and may include at least one hardware module of Wi-Fi, a WFD communication unit, a Bluetooth communication unit, a BLE communication unit, an NFC unit, a Zigbee communication unit, an Ant+ communication unit, or a µWave communication unit, and perform data communication with the AR device 100 by using the hardware communication module.

The user input interface 220 is a hardware device configured to receive a user input. In an embodiment of the disclosure, the user input interface 220 may include at least one of a rotary bezel ring 222 (see FIG. 13), buttons 224 and 226 (see FIG. 13), or a touch screen panel.

The rotary bezel ring 222 may be formed in a circular ring shape along the perimeter (bezel) of an outer periphery of the display 250. In an embodiment of the disclosure, the display 250 may be formed in a circular shape, and the rotary bezel ring 222 may be a rotary formed along the outer periphery of the display 250. The user input interface 220 may receive a user input for rotating the rotary bezel ring 222 in a clockwise or counterclockwise direction.

The buttons 224 and 226 are configured as physical interfaces formed in a direction protruding to the outside of a housing of the wearable device 200. In an embodiment of the disclosure, the buttons 224 and 226 may include a home button 224 for receiving a user input to enter a home screen and a back button 226 for receiving a user input to move to a previous task or a previous operation. However, the disclosure is not limited thereto.

The structures of the rotary bezel ring 222 and the buttons 224 and 226 will be described in detail with reference to FIG. 13.

The touch screen panel is configured to detect a user touch input and output a touch event value corresponding to the detected touch input. The touch screen panel may be combined with the display 250 to constitute a touch screen. The touch screen may be implemented as various types of touch sensors such as a capacitive, pressure-sensitive, or piezo-electric touch sensor.

In an embodiment of the disclosure, the user input interface 220 may further include a crown. The crown may be formed on one side of an outer housing of the wearable device 200. The crown is a type of spring, and may receive a user input of rotating in a clockwise or counterclockwise direction. In addition, the crown may be rotated in the clockwise or counterclockwise direction in response to the user input being received.

The processor 230 may execute one or more instructions of a program stored in the memory 240. The processor 230 may include hardware components that perform arithmetic, logic, and input/output operations and signal processing. The processor 230 may include, but not limited to, at least one of for example, a CPU, a microprocessor, a GPU, ASICs, DSPs, DSPDs, PLDs, or FPGAs.

FIG. 11 shows that the processor 230 includes one element or processor, but the disclosure is not limited thereto. In an embodiment of the disclosure, the processor 230 may include one or more elements or processors.

The memory 240 may include at least one type of storage medium, for example, flash memory type, hard disk type, multimedia card micro type, card type memory (e.g., SD or XD memory), RAM, SRAM, ROM, EEPROM, PROM, or an optical disk.

The memory 240 may store instructions related to operations in which the wearable device 200 obtains control authority of a function from the AR device 100, and performs or controls the function according to the control authority based on a user input. In an embodiment of the disclosure, the memory 240 may store at least one of instructions, an algorithm, a data structure, a program code, or an application program that are readable by the processor 230. The instructions, the algorithm, the data structure, the program code, or the application program stored in the memory 240 may be implemented, for example, in a programming or scripting language such as C, C++, Java, assembler, etc.

In the following embodiment, the processor 230 may be implemented by executing the instructions or program codes stored in the memory 240.

The processor 230 may obtain control authority for performing or controlling a function related to a virtual object displayed through an application executed by the AR device 100. In an embodiment of the disclosure, the processor 230 may obtain the control authority of the function from the AR device 100 through the communication interface 210. The processor 230 may obtain not only the control authority of the function but also at least one of a type of the virtual object, the characteristics of the function, or a data value related to the function from the AR device 100.

The processor 230 may determine a manipulation method for controlling the function according to the obtained control authority based on at least one of the type of the virtual object, the characteristics of the function, or the data value related to the function. In an embodiment of the disclosure, the processor 230 may map the control authority obtained from the AR device 100 to a specific manipulation method according to a preset mapping relationship. The processor 230 may determine the manipulation method mapped to the type of the virtual object, the characteristics of the function, and the data value related to the function based on the preset mapping relationship. A specific embodiment in which the processor 230 determines the manipulation method mapped to the control authority of the function will be described in detail with reference to FIGS. 13, 14A to 14C, 15A, 15B, and 16.

The processor 230 may change the data value related to the function based on a user input received through the user input interface 220 according to the determined manipulation method. In an embodiment of the disclosure, the processor 230 may change the data value based on the user input received through the rotary bezel ring 222, the buttons 224 and 226, or the touch screen. For example, the processor 230 may change a video play time or adjust the scroll of a web browser up and down based on a user input of rotating the rotary bezel ring 222 in the clockwise or counterclockwise direction. For example, the processor 230 may select a specific photo or icon based on a user touch input received through the touch screen.

The processor 230 may transmit the changed data value to the AR device 100 by controlling the communication interface 210.

The display 250 is configured to display whether the control authority has been obtained and information about the function related to the control authority. In an embodiment of the disclosure, the display 250 may be formed in a circular shape, but is not limited thereto. The display 250 may include a display panel and a controller controlling the display panel. For example, the display panel may be implemented as various types of displays such as a liquid crystal display (LCD), an organic light emitting diode (OLED), an active-matrix OLED (AM-OLED), or a plasma display panel (PDP).

In an embodiment of the disclosure, the display 250 may be combined with the touch screen panel of the user input interface 220 to be provided as a touch screen. For example, the touch screen may include an integrated module in which the display panel and the touch screen panel are combined in a stack structure.

The display 250 may display execution results of a plurality of applications installed in the wearable device 200 by the control of the processor 230. In an embodiment of the disclosure, an application list including icons of the plurality of applications installed in the wearable device 200 may be displayed on the display 250.

In an embodiment of the disclosure, the display 250 may display a notification message notifying the user of whether the control authority of the function has been obtained from the AR device 100 by the control of the processor 230.

Figure 12:
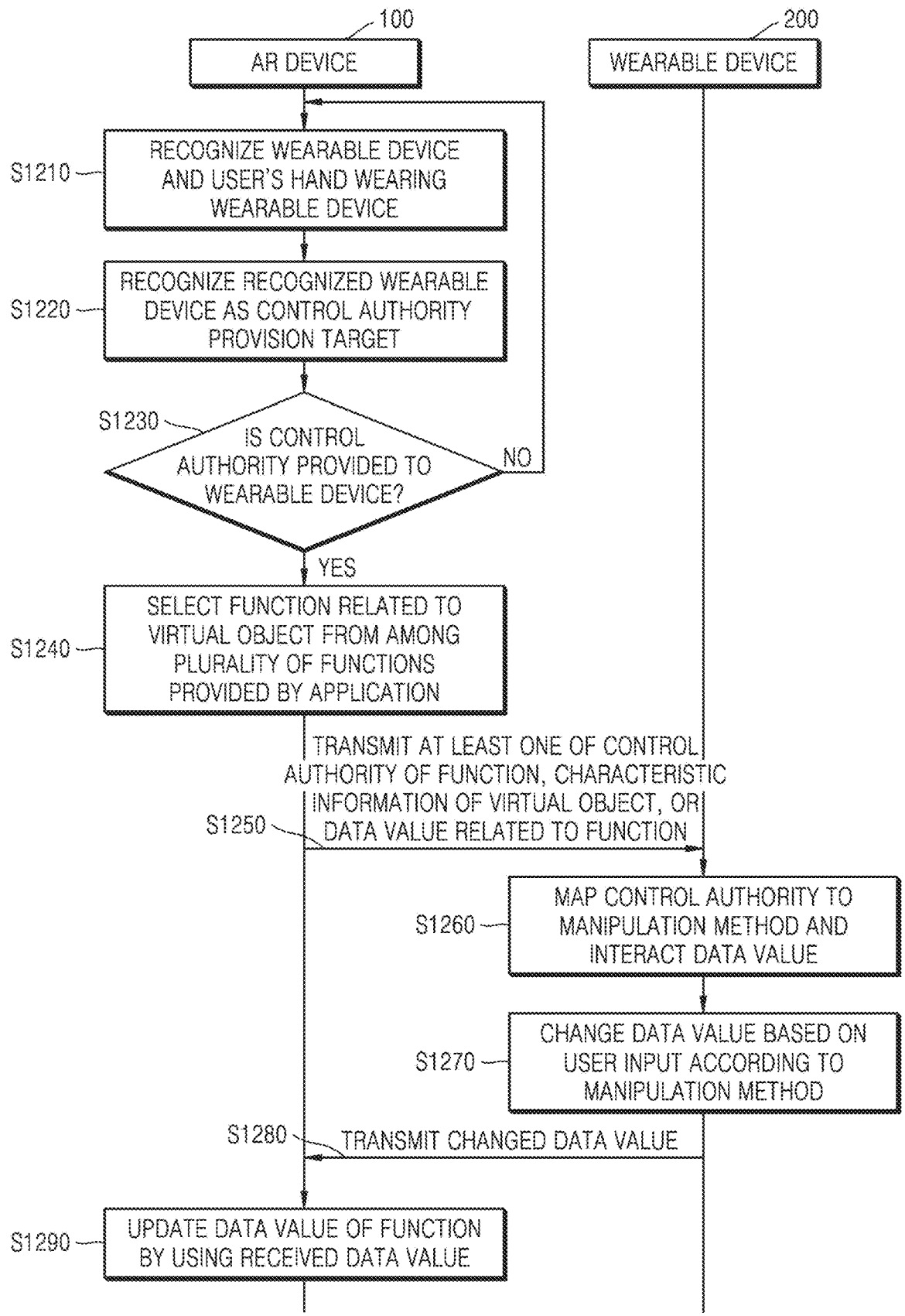
FIG. 12 is a flowchart illustrating a method of operating an AR device and a wearable device, according to an embodiment of the disclosure.

FIG. 12 is a flowchart illustrating a method of operating an AR device and a wearable device according to an embodiment of the disclosure.

Referring to FIG. 12, in operation S1210, an AR device 100 recognizes a wearable device 200 and the user's hand wearing the wearable device 200. In an embodiment of the disclosure, the AR device 100 may recognize the wearable device 200 overlaid with a virtual object and the user's hand wearing the wearable device 200. In an embodiment of the disclosure, the AR device 100 may recognize the wearable device 200 and the user's hand by using an AI model or the known image processing technology. A specific method in which the AR device 100 recognizes the wearable device 200 and the user's hand is the same as operation S310 of FIG. 3, and thus, a redundant description thereof is omitted.

In operation S1220, the AR device 100 recognizes the recognized wearable device 200 as a control authority provision target. In an embodiment of the disclosure, the AR device 100 may recognize the wearable device 200 as a target device to provide control authority over a function performed or controlled by at least one function UI included in the virtual object.

In operation S1230, the AR device 100 determines whether to provide the control authority to the wearable device 200. Operation S1230 is the same as operation S320 shown and described in FIG. 3, and thus, a redundant description thereof is omitted. When it is determined not to provide the wearable device 200 with the control authority of the function (NO), the AR device 100 may return to operation S1210 and perform an operation of recognizing the wearable device 200 again.

When it is determined to provide the wearable device 200 with the control authority of the function (YES), the AR device 100 selects a function related to the virtual object from among a plurality of functions provided by an application, in operation S1240. In an embodiment of the disclosure, the AR device 100 may identify a function UI overlaid by the user's hand wearing the wearable device 200 among the plurality of function UIs included in the virtual object, and determine to provide the wearable device 200 with control authority over a function performed or controlled by the identified function UI. Operation S1240 is the same as operations S710 and S720 shown and described in FIGS. 7, 8A and 8B, and thus, a redundant description thereof is omitted.

In operation S1250, the AR device 100 transmits at least one of the control authority of the function, characteristic information of the virtual object, or a data value related to the function. In an embodiment of the disclosure, the 'characteristic information of the virtual object' may include information about a type of a function UI included in the virtual object. The type of the function UI may include, for example, a slider, a scroll bar, a spinner, a button, a wheel, or a drop down, but is not limited thereto. The 'data value related to the function' may be, for example, a current data value of the function provided by the AR device 100, such as a play time, a scroll bar position, or a selected item value, but is not limited thereto.

In operation S1260, the wearable device 200 maps the control authority to a manipulation method and links the data value. In an embodiment of the disclosure, the wearable device 200 may map the control authority obtained from the AR device 100 to a specific manipulation method according to a preset mapping relationship. The wearable device 200 may determine the manipulation method mapped to the type of the virtual object, the characteristics of the function, and the data value related to the function based on the preset mapping relationship. The wearable device 200 may link the data value obtained from the AR device 100 with a data value changed or adjusted by the user input interface 220 (see FIG. 11) in real time. For example, the wearable device 200 may map the control authority of the function to a manipulation method of rotating the rotary bezel ring 222 (see FIG. 13) in a clockwise or counterclockwise direction, a manipulation method of pressing the buttons 224 and 226 (see FIG. 13), or a manipulation method of touching, swiping, or scrolling the touch screen.

In operation S1270, the wearable device 200 changes the data value based on the user input according to the manipulation method. In an embodiment of the disclosure, the wearable device 200 may change the data value based on an input received from the user according to the determined manipulation method among the rotary bezel ring 222, the buttons 224 and 226, or the touch screen. A specific embodiment in which the wearable device 200 changes the data value based on the user input according to the manipulation method will be described in detail with reference to FIGS. 18 to 21.

In operation S1280, the wearable device 200 transmits the changed data value to the AR device 100. In an embodiment of the disclosure, the wearable device 200 may be paired with the AR device 100 through a Bluetooth communication method, and may transmit the data value to the AR device 100 through the Bluetooth communication method. However, the wearable device 200 is not limited thereto, and may transmit the changed data value to the AR device 100 through at least one short-range wireless communication network of Wi-Fi, WFD, BLE, NFC, Zigbee, Ant+, or μWave.

In an embodiment of the disclosure, the wearable device 200 may transmit not only the changed data value but also identification information of the function whose data value has been changed to the AR device 100.

In operation S1290, the AR device 100 updates the data value of the function by using the received data value. The AR device 100 may identify the function changed by the wearable device 200 and update the data value of the identified function based on the data value received from the wearable device 200.

Figure 13:
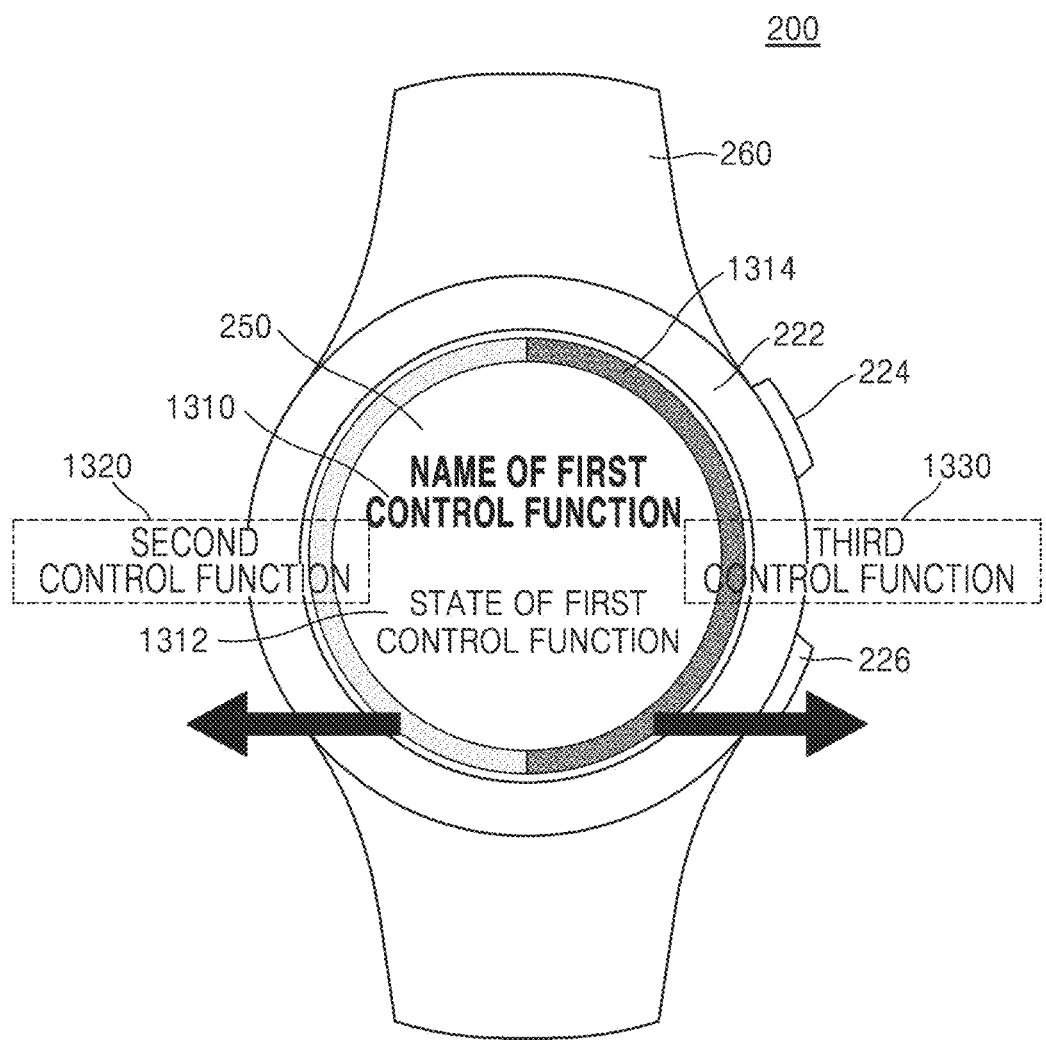
FIG. 13 is a diagram for explaining a manipulation method in which a wearable device controls a function based on control authority obtained from an AR device, according to an embodiment of the disclosure.

FIG. 13 is a diagram for explaining a manipulation method in which a wearable device controls a function based on control authority obtained from an AR device according to an embodiment of the disclosure.

Referring to FIG. 13, a wearable device 200 may include a rotary bezel ring 222, buttons 224 and 226, a display 250, and a strap 260.

The rotary bezel ring 222 may be formed on one side of a body part of the wearable device 200. In an embodiment of the disclosure, the display 250 may be formed in a circular shape, and the rotary bezel ring 222 may be formed in a circular ring shape along the perimeter of an outer periphery of the circular display 250. In an embodiment of the disclosure, the rotary bezel ring 222 may be a rotary formed along the outer periphery of the circular display 250. The rotary bezel ring 222 may be implemented as a hardware module. In an embodiment of the disclosure, the rotary bezel ring 222 may include a detent capable of stopping an operation of rotating at regular intervals. The rotary bezel ring 222 may receive a user input of rotating in a clockwise or counterclockwise direction. The rotary bezel ring 222 may be rotated in the clockwise or counterclockwise direction in response to the user input being received. When the rotary bezel ring 222 is rotated by the user input, the wearable device 200 may display a rotation scroll UI 1314 indicating a rotation direction and a rotation degree of the rotary bezel ring 222 on the display 250.

The rotary bezel ring 222 is not limited to a hardware device. In an embodiment of the disclosure, the rotary bezel ring 222 may be combined with the display 250 to be implemented as a graphic user interface (GUI). In this case, the rotary bezel ring 222 may receive a user input of touching and rotating a graphic interface displayed through the display 250.

The buttons 224 and 226 are configured as physical interfaces formed in a direction protruding to the outside of a housing of the wearable device 200. In an embodiment of the disclosure, the buttons 224 and 226 may include the home button 224 for receiving a user input to enter a home screen and the back button 226 for receiving a user input to move to a previous task or a previous operation. However, the disclosure is not limited thereto.

The display 250 may display a UI indicating a name 1310 of the control function obtained from the AR device 100 and a state 1312 of the control function. In an embodiment of the disclosure, the display 250 may be implemented as a touch screen including a touch panel. The display 250 may receive a user touch input and perform an operation corresponding to the received touch input.

In an embodiment of the disclosure, the display 250 may receive a user swipe input of swiping in left and right directions. In response to the swipe input being received, the wearable device 200 may change the control function displayed on the display 250 and display a name and a state of the changed control function. In an embodiment shown in FIG. 13, when an input of swiping in the left direction is received, the wearable device 200 may switch a function currently performed or controlled from a first control function to a second control function 1320, and display a name of the switched second control function 1320 and a state of the second control function 1320 on the display 250. Similarly, when an input of swiping in the right direction is received, the wearable device 200 may switch the function currently performed or controlled from the first control function to a third control function 1330, and display a name of the switched third control function 1330 and a state of the third control function 1330 on the display 250.

The wearable device 200 may determine the manipulation method mapped to a type of a function UI, the characteristics of the function, and a data value related to the function based on a preset mapping relationship. In an embodiment of the disclosure, the wearable device 200 may determine the manipulation method of the wearable device 200 based on the preset mapping relationship between the function UI provided for each application and the manipulation method. For an example of the preset mapping relationship, refer to Table 1 below.

TABLE 1

| | Application | | | | |
| --- | --- | --- | --- | --- | --- |
| Classification | 1 Explore | 1 Video | Still Image | Music | Provider Application |
| Rotary Bezel Ring 222 | Explore (Quick) | Adjust Play Time | Zooming In Move Screen Up/Down/ Left/Right | Adjust Play Time | — |

TABLE 1-continued

| Classification | Application | | | | |
| --- | --- | --- | --- | --- | --- |
| | 1 Explore | 1 Video | Still Image | Music | Provider Application |
| Display 250 | Touch-Select Swipe-Content Navigation (Slow) | Stop/Run | Touch-Swipe Zoom In/Out | Pause/Run | Obtain control authority in the form of touch pad/cursor |
| First Button 224 | Initial Screen | Initial Screen | Initial Screen | Initial Screen | — |
| Second Button 226 | Previous | Previous | Previous | Previous | — |

Figure 14A:
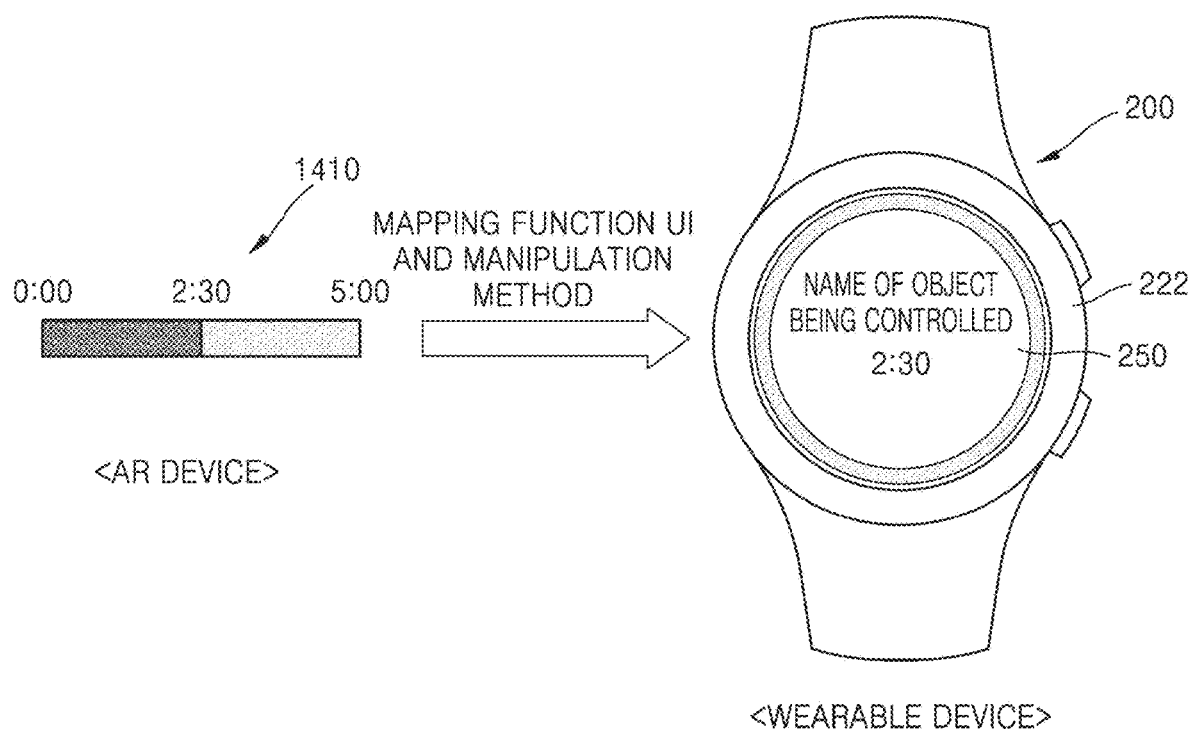
FIG. 14A is a diagram illustrating an operation in which a wearable device maps a function UI to a manipulation method to control authority obtained from an AR device, according to an embodiment of the disclosure.

FIG. 14A is a diagram illustrating an operation in which a wearable device maps a function UI to a manipulation method according to control authority obtained from an AR device according to an embodiment of the disclosure.

Referring to FIG. 14A, a wearable device 200 may map the function UI related to the control authority obtained from an AR device 100 to the manipulation method. In an embodiment of the disclosure, the wearable device 200 may determine the manipulation method mapped to the function UI based on at least one of a type of the function UI, characteristics of the function, or a data value related to the function. In the embodiment shown in FIG. 14A, because a first function UI 1410 displayed on the AR device 100 is a slider type, and the data value related to the function is a play time (e.g., 2:30), the wearable device 200 may determine the rotary bezel ring 222 in the manipulation method. The wearable device 200 may display a name of the function under control and a current data value (e.g., 2:30) on the display 250 based on the characteristics of the function and the data value related to the function obtained from the AR device 100.

Figure 14B:
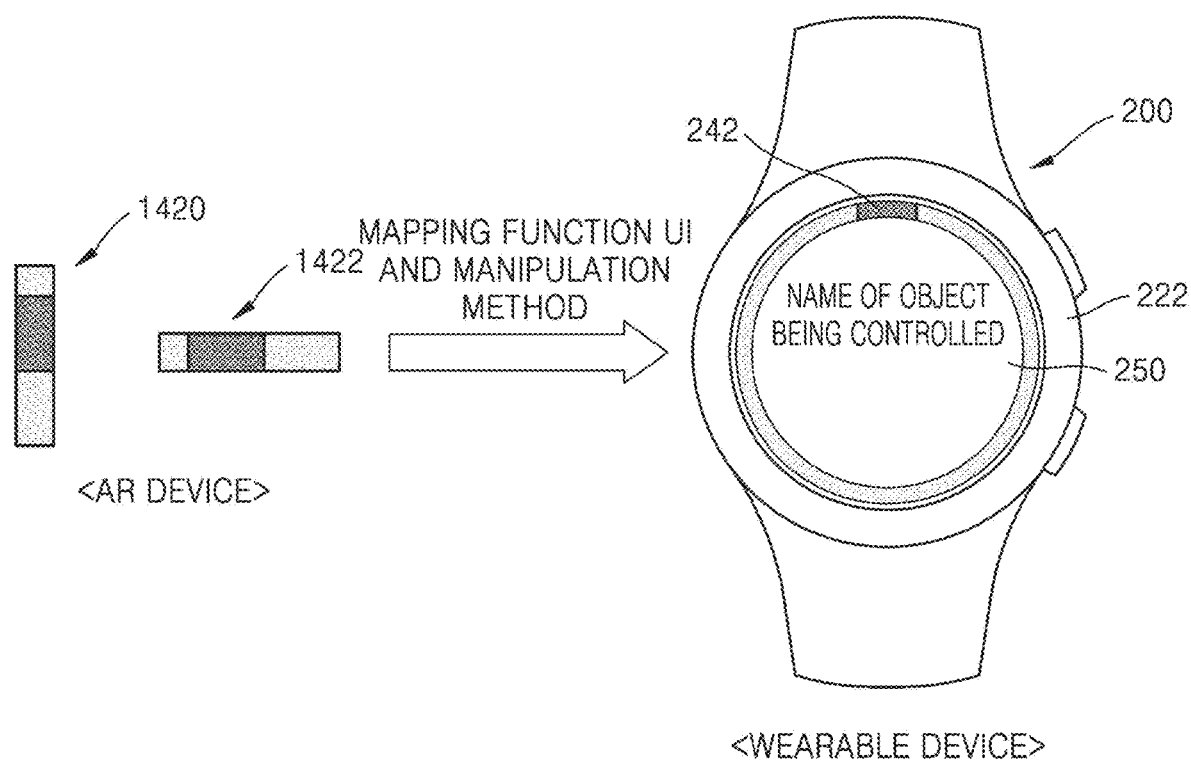
FIG. 14B is a diagram illustrating an operation in which a wearable device maps a function UI to a manipulation method to control authority obtained from an AR device, according to an embodiment of the disclosure.

FIG. 14B is a diagram illustrating an operation in which a wearable device maps a function UI to a manipulation method according to control authority obtained from an AR device according to an embodiment of the disclosure.

The embodiment shown in FIG. 14B is the same as the embodiment shown in FIG. 14A except for a type of the second function UIs 1420, 1422, and thus, a redundant description thereof is omitted.

Referring to FIG. 14B, the second function UIs 1420, 1422 displayed on an AR device 100 is a scroll bar type, and a data value related to a function is a current scroll bar position. A wearable device 200 may determine the manipulation method mapped to the second function UIs 1420, 1422 as the rotary bezel ring 222 based on at least one of the type of the second function UIs 1420, 1422, characteristics of the function, or a data value related to the function. The wearable device 200 may display a rotary scroll UI 242 indicating a name of the function under control and a current scroll position on the display 250 based on the characteristics of the function and the data value related to the function obtained from the AR device 100.

Figure 14C:
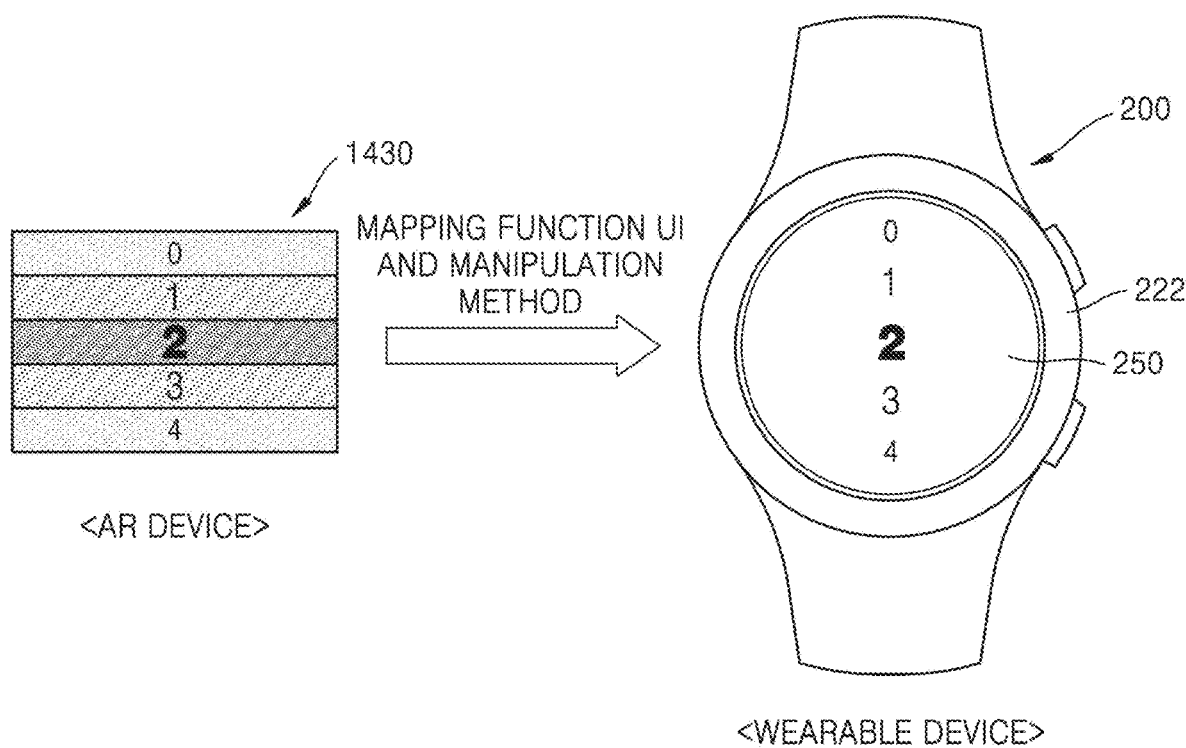
FIG. 14C is a diagram illustrating an operation in which a wearable device maps a function UI to a manipulation method to control authority obtained from an AR device, according to an embodiment of the disclosure.

FIG. 14C is a diagram illustrating an operation in which a wearable device maps a function UI to a manipulation method according to control authority obtained from an AR device according to an embodiment of the disclosure.

The embodiment shown in FIG. 14C is the same as the embodiment shown in FIG. 14A except for a type of a third function UI 1430, and thus, a redundant description thereof is omitted.

Referring to FIG. 14C, a third function UI 1430 displayed on an AR device 100 is a spinner type and a data value related to a function is, for example, 2. A wearable device 200 may determine the manipulation method mapped to the third function UI 1430 as the rotary bezel ring 222 based on at least one of the type of the third function UI 1430, characteristics of the function, or a data value related to the function. The wearable device 200 may display a current data value (e.g., 2) on the display 250.

FIGS. 14A to 14C respectively show the first to third function UIs 1410 to 1430 mapped to the rotary bezel ring 222 of the wearable device 200. The first to third function UIs 1410 to 1430 mapped by the rotary bezel ring 222 may be, for example, a play time UI of a video application (video play or video streaming), a scroll bar UI of a web browser application, or a year spinner UI of a calendar application. However, the disclosure is not limited thereto.

Figure 15A:
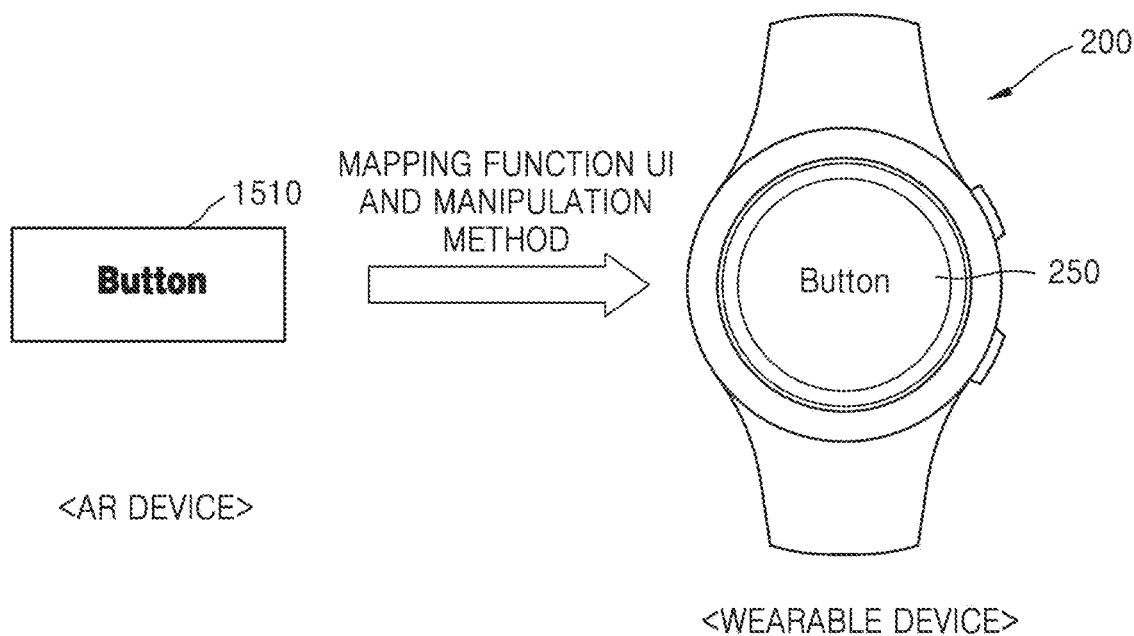
FIG. 15A is a diagram illustrating an operation in which a wearable device maps a function UI to a manipulation method to control authority obtained from an AR device, according to an embodiment of the disclosure.

FIG. 15A is a diagram illustrating an operation in which a wearable device maps a function UI to a manipulation method according to control authority obtained from an AR device according to an embodiment of the disclosure.

Referring to FIG. 15A, a wearable device 200 may map the function UI related to the control authority obtained from an AR device 100 to the manipulation method. In an embodiment of the disclosure, the wearable device 200 may determine the manipulation method mapped to the function UI based on at least one of a type of a function UI, characteristics of the function, or a data value related to the function. In the embodiment shown in FIG. 15A, a first function UI 1510 displayed on the AR device 100 may be a button UI, and the wearable device 200 may display the button UI on the display 250. The display 250 is implemented as a touch screen, and the wearable device 200 may receive a user touch input of touching the button UI through the touch screen.

Figure 15B:
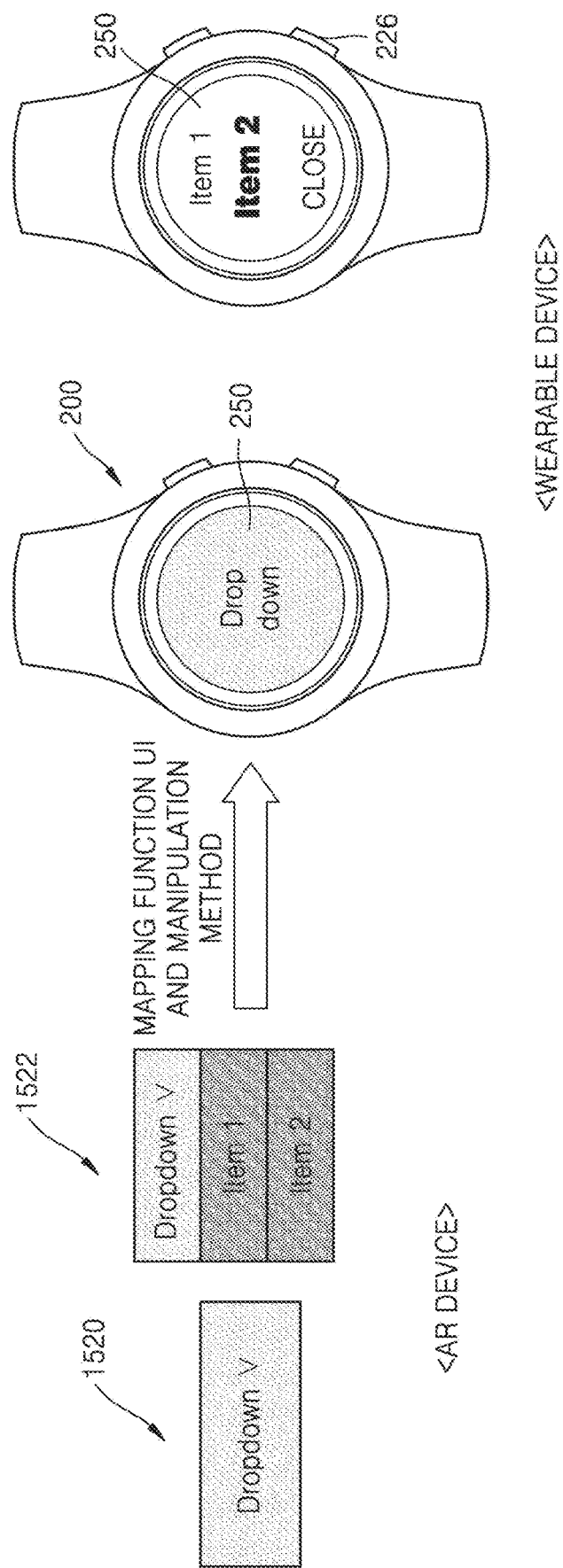
FIG. 15B is a diagram illustrating an operation in which a wearable device maps function UIs to a manipulation method to control authority obtained from an AR device, according to an embodiment of the disclosure.

FIG. 15B is a diagram illustrating an operation in which a wearable device maps function UIs to a manipulation method according to control authority obtained from an AR device according to an embodiment of the disclosure.

The embodiment shown in FIG. 15B is the same as the embodiment shown in FIG. 15A except for types of second function UIs 1520 and 1522, and thus, a redundant description thereof is omitted.

Referring to FIG. 15B, second function UIs 1520 and 1522 displayed on an AR device 100 may include a drop down function UI 1520 and a combo box function UI 1522. A wearable device 200 may determine the manipulation method mapped to the second function UIs 1520 and 1522 as a touch input through a touch screen based on at least one of the types of second function UIs 1520 and 1522, characteristics of functions, or data values related to the functions. The display 250 of the wearable device 200 may be implemented as a touch screen, and may display the combo box function UI 1522 for selecting an item in response to a user touch input of touching the drop-down function UI 1520 being received through the touch screen. The wearable device 200 may receive a user touch input of selecting a specific item through the touch screen.

FIGS. 15A and 15B show the first and second function UIs 1510, 1520, and 1522 mapped to the touch inputs received through the touch screen of the wearable device 200. The first and second function UIs 1510, 1520, and 1522 mapped to the touch inputs through the touch screen may be, for example, a play/pause of a video application (video play or video streaming), a next page of a web browser application, and an add new schedule of a calendar application. However, the disclosure is not limited thereto.

Function UIs controlled by combining the manipulation of the rotary bezel ring 222 shown in FIGS. 14A to 14C and the manipulation of the touch screen shown in FIGS. 15A and 15B may include, for example, a subtitle UI of a video application (video play or video streaming), a play speed setting UI, or a favorite UI of a web browser application. However, the disclosure is not limited thereto.

Figure 16:
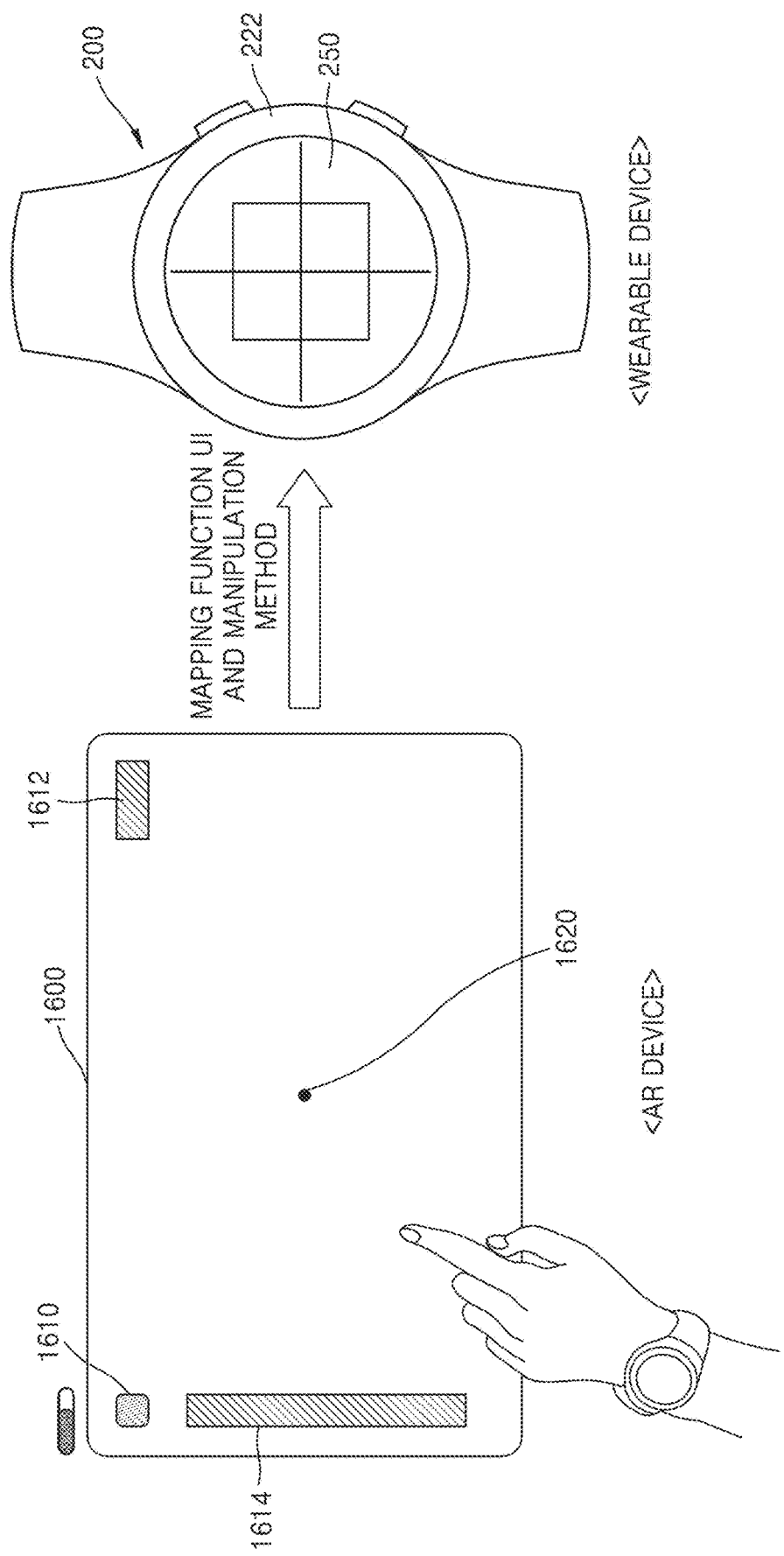
FIG. 16 is a diagram illustrating an operation in which a wearable device maps a function UI to a manipulation method to control authority obtained from an AR device, according to an embodiment of the disclosure.

FIG. 16 is a diagram illustrating an operation in which a wearable device maps a function UI to a manipulation method according to control authority obtained from an AR device according to an embodiment of the disclosure.

Referring to FIG. 16, an AR device 100 may execute an application that does not provide an API. The AR device 100 may display a virtual object 1600, for example, by executing a third party application. The virtual object 1600 may include the plurality of function UIs 1610, 1612, and 1614 and an execution screen 1620 of the application. Because the application does not provide the API, the AR device 100 may not individually provide the wearable device 200 with control authority over each of the plurality of function UIs 1610, 1612, and 1614. In this case, the AR device 100 may provide the wearable device 200 with control authority over all of the plurality of function UIs 1610, 1612, and 1614.

The wearable device 200 may map the control authority obtained from the AR device 100 to a specific manipulation method. In an embodiment of the disclosure, the wearable device 200 may receive a user touch input of touching a specific area on a touch pad by utilizing the display 250 configured as a touch screen as the touch pad. The wearable device 200 may map a position coordinate value of the received touch input to a cursor on the specific area of the virtual object 1600 displayed through the AR device 100. The wearable device 200 may control the plurality of function UIs 1610, 1612, and 1614 by using the cursor mapped on a specific position on the virtual object 1600 according to the user touch input.

Figure 17A:
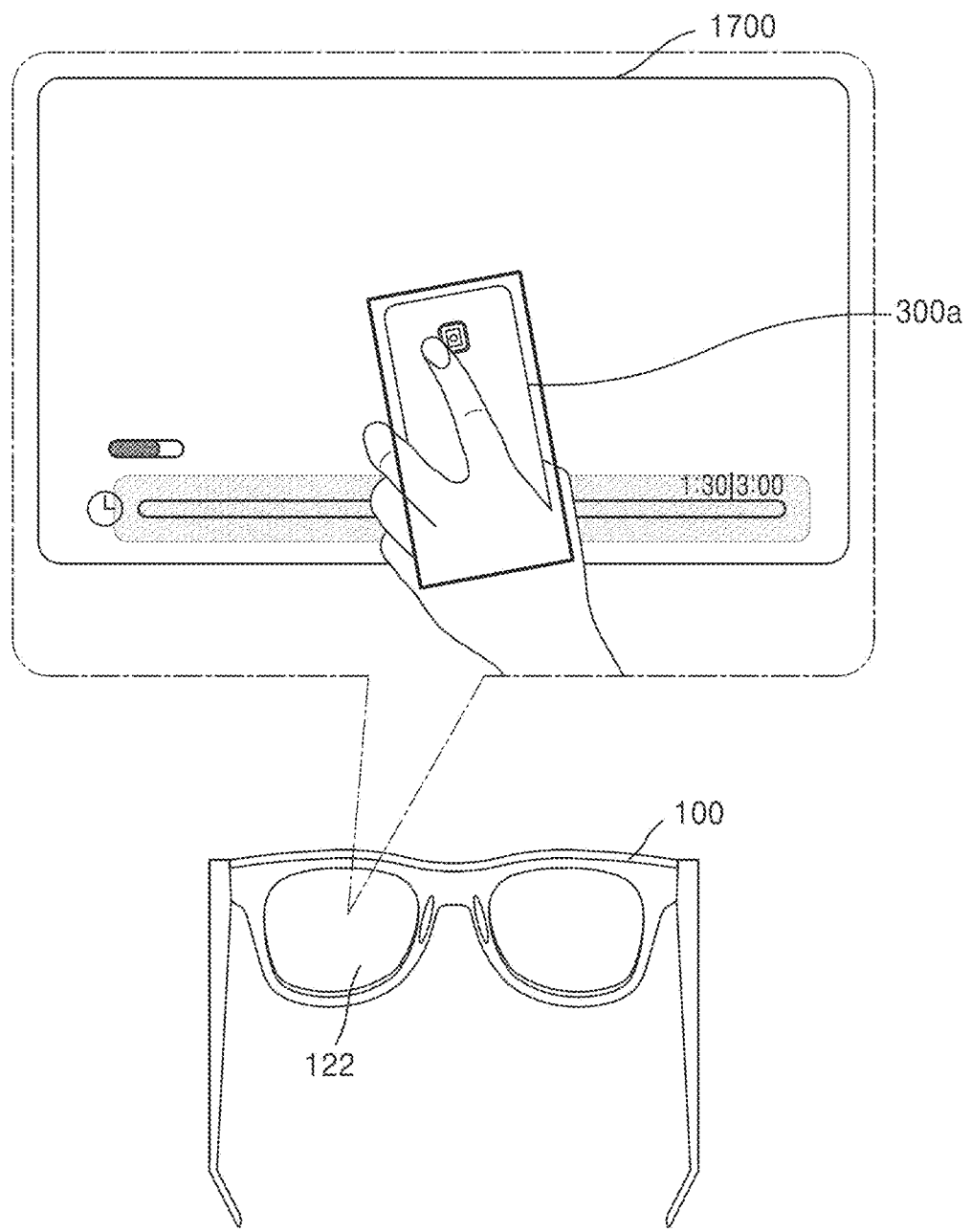
FIG. 17A is a diagram illustrating an operation in which an AR device recognizes an external device and determines to provide control authority to the recognized external device, according to an embodiment of the disclosure.

FIG. 17A is a diagram illustrating an operation in which an AR device recognizes an external device and determines to provide control authority to the recognized external device according to an embodiment of the disclosure.

Referring to FIG. 17A, an AR device 100 may recognize the external device overlaid with a virtual object 1700 displayed through a waveguide 122. The external device may be, for example, any one of a mobile device, a smart phone, a laptop computer, a desktop, a tablet PC, an e-book terminal, a digital broadcasting terminal, a PDA, a PMP, navigation, an MP3 player, or a camcorder, but is not limited thereto. In an embodiment shown in FIG. 17A, the external device may be a mobile device 300a.

The AR device 100 may provide the recognized mobile device 300a with control authority over the function, and may be controlled by the mobile device 300a. In an embodiment of the disclosure, the AR device 100 may receive a data value changed by the mobile device 300a based on the control authority, and update the data value related to the function by using the received data value.

Figure 17B:
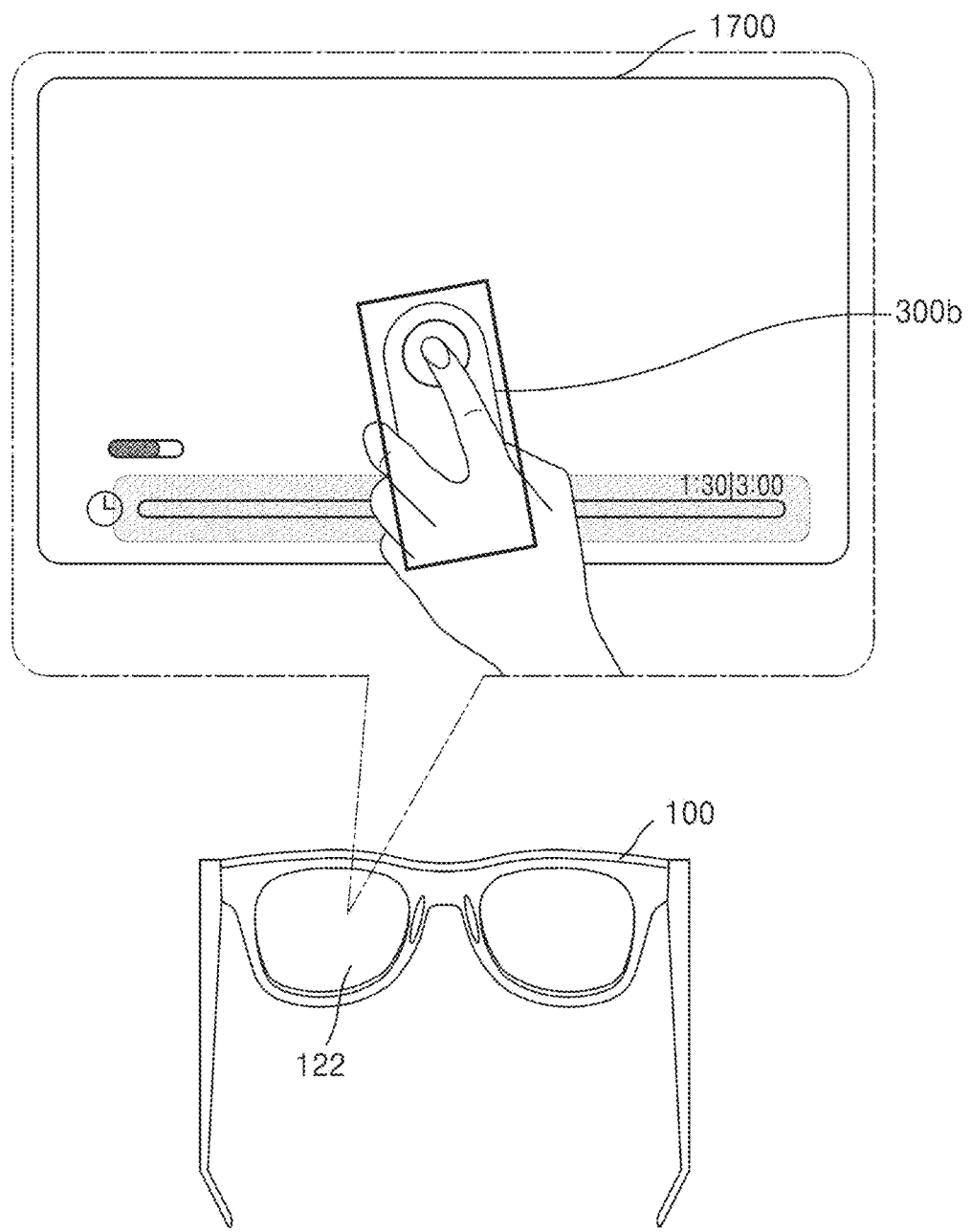
FIG. 17B is a diagram illustrating an operation in which an AR device recognizes an external device and determines to provide control authority to the recognized external device, according to an embodiment of the disclosure.

FIG. 17B is a diagram illustrating an operation in which an AR device recognizes an external device and determines to provide control authority to the recognized external device according to an embodiment of the disclosure.

The embodiment shown in FIG. 17B is the same as the embodiment shown in FIG. 17A except for a type of the external device, and thus, a redundant description thereof is omitted.

Referring to FIG. 17B, an AR device 100 may recognize a controller 300b overlaid with a virtual object 1700 displayed through a waveguide 122. The controller 300b may be gripped by the user's hand and move according to the manipulation of the hand, thereby obtaining 3D position coordinate value information. In an embodiment of the disclosure, the controller 300b may include a GPS sensor, an inertial measurement unit (IMU) sensor, etc. obtaining a 3D position coordinate value.

The AR device 100 may provide the recognized controller 300b with control authority over the function, and may be controlled by the controller 300b. In an embodiment of the disclosure, the AR device 100 may obtain the 3D position coordinate value of the controller 300b in real time and perform or control a function UI included in the virtual object 1700 based on the obtained 3D position coordinate value of the controller 300b.

Figure 18:
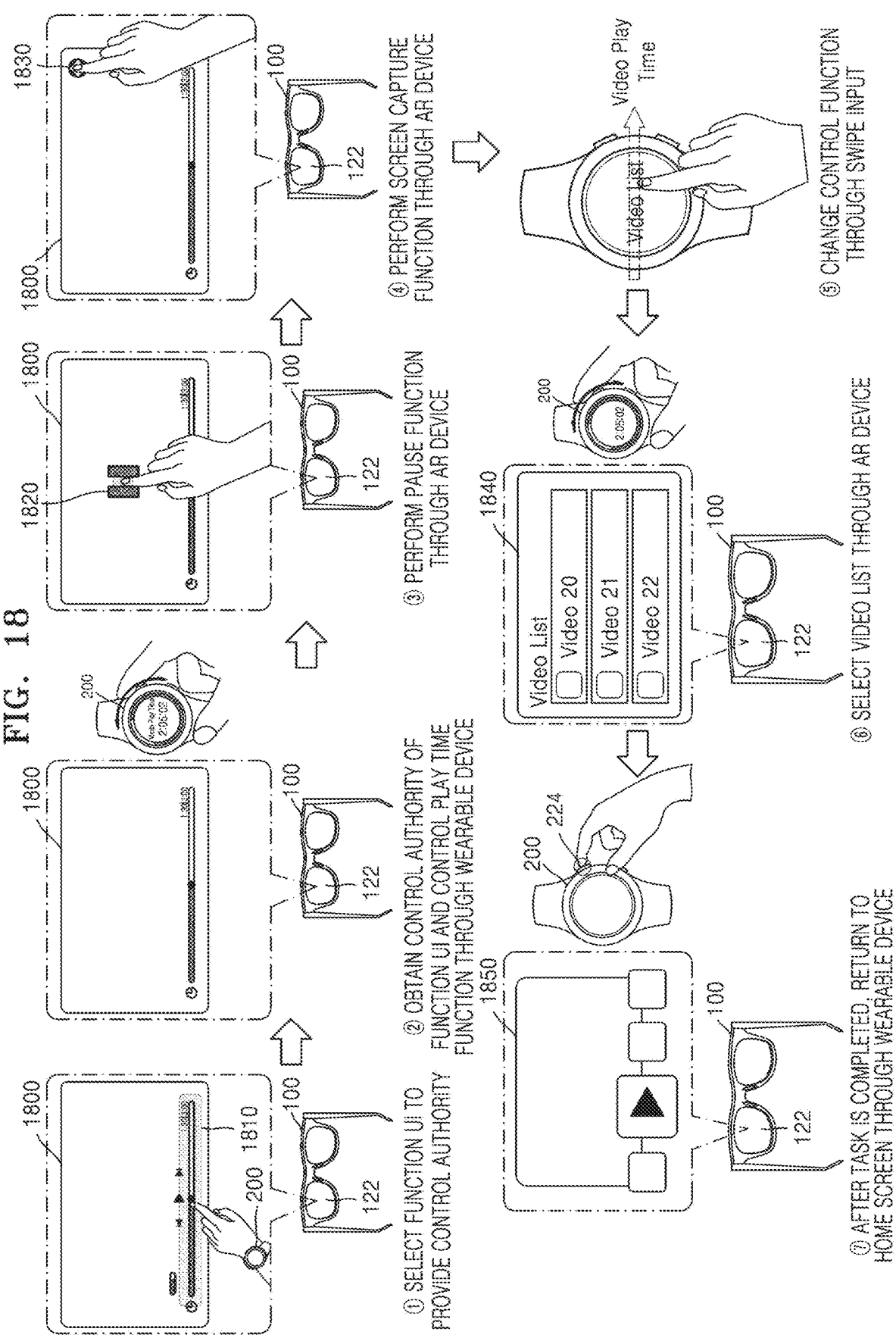
FIG. 18 is a diagram illustrating an operation in which a user performs or controls functions by using an AR device and a wearable device, according to an embodiment of the disclosure.

FIG. 18 is a diagram illustrating an operation in which a user performs or controls functions by using an AR device and a wearable device according to an embodiment of the disclosure.

Referring to FIG. 18, a user selects a function UI 1810 displayed through an AR device 100 as a function UI to provide control authority to a wearable device 200 (operation ①). The AR device 100 may project a virtual object 1800 onto the waveguide 122 through a running application. In the embodiment shown in FIG. 18, the virtual object 1800 is a video application that plays or streams a video, and may include the function UI 1810 in a slider type that controls a video play time. The AR device 100 may recognize the wearable device 200 overlaid on the virtual object 1800. The AR device 100 may recognize the user's hand wearing wearable device 200. In an embodiment of the disclosure, the AR device 100 may identify the function UI 1810 overlaid by the recognized user's hand. The AR device 100 may determine to provide the wearable device 200 with control authority of a function (e.g., a video play time control function) performed or controlled by the identified function UI 1810.

The wearable device 200 obtains the control authority of the function UI 1810 from the AR device 100 and controls a play time function (operation ②). In an embodiment of the disclosure, the wearable device 200 may obtain not only the control authority of the function related to the function UI 1810 from the AR device 100, but also a type of the function UI 1810, the characteristics of the play time control function, and a data value (e.g., the video play time) related to the play time control function, and determine a manipulation method based on the obtained type of the function UI 1810, characteristics of the function, and the data value. In the embodiment shown in FIG. 18, the wearable device 200 may determine the rotary bezel ring 222 (see FIG. 13) in the manipulation method. The wearable device 200 may receive a user input of rotating the rotary bezel ring 222 in a clockwise or counterclockwise direction, and may change the video play time based on the received user input.

The user performs a pause function through the AR device 100 (operation ③). In an embodiment of the disclosure, the AR device 100 may display a pause function UI 1820 for pausing a video play and receive a user input of selecting the pause function UI 1820. The AR device 100 may pause the video play based on the received user input.

The user performs a screen capture function through the AR device 100 (operation ④). In an embodiment of the disclosure, the AR device 100 may display a screen capture function UI 1830 for capturing a screen of a currently executed application and receive a user input of selecting the screen capture function UI 1830. The AR device 100 may capture the screen being executed based on the received user input and store the captured screen as an image.

The user changes the control function through a swipe input with respect to the wearable device 200 (operation ⑤). The wearable device 200 may receive a user swipe input of swiping the touch screen left and right, and may switch the control function based on the received swipe input. In an embodiment shown in FIG. 18, the wearable device 200 may switch the video play time control function to a video list function in response to the swipe input being received.

The user selects a video list by using the wearable device 200 (operation ⑥). The wearable device 200 may determine a manipulation method mapped to the video list function as the rotary bezel ring 222 (see FIG. 13), and receive a user input of rotating the rotary bezel ring 222 in the clockwise or counterclockwise direction. The wearable device 200 may select the video list based on the user input. In the embodiment shown in FIG. 18, the AR device 100 may display a video list function UI 1840 including a list of a plurality of videos 20, 21, 22, . . . , and may select a specific video list based on the user input of rotating the rotary bezel ring 222 of the wearable device 200.

After a task is completed, the user returns to a home screen 1850 through the wearable device 200 (operation ⑦). The wearable device 200 may receive a user input pressing the home button 224. In response to the user input of pressing the home button 224 being received, the AR device 100 may display the video list function UI 1840 and then switch to the home screen 1850 to display the home screen 1850.

In general, it is difficult for the user to accurately select the function UI 1810 on the virtual object 1800 to precisely manipulate the video play time. In the embodiment shown in FIG. 18, the AR device 100 may improve user convenience by providing the wearable device 200 with the control authority over the video play time function and controlling the play time of the video through the wearable device 200. In addition, in an embodiment of the disclosure, user's convenience may be improved by performing a pause function or screen capture function which is relatively easy to control through the pause function UI 1820 or the screen capture function UI 1830, which is a virtual object displayed through a waveguide of the AR device 100.

Figure 19:
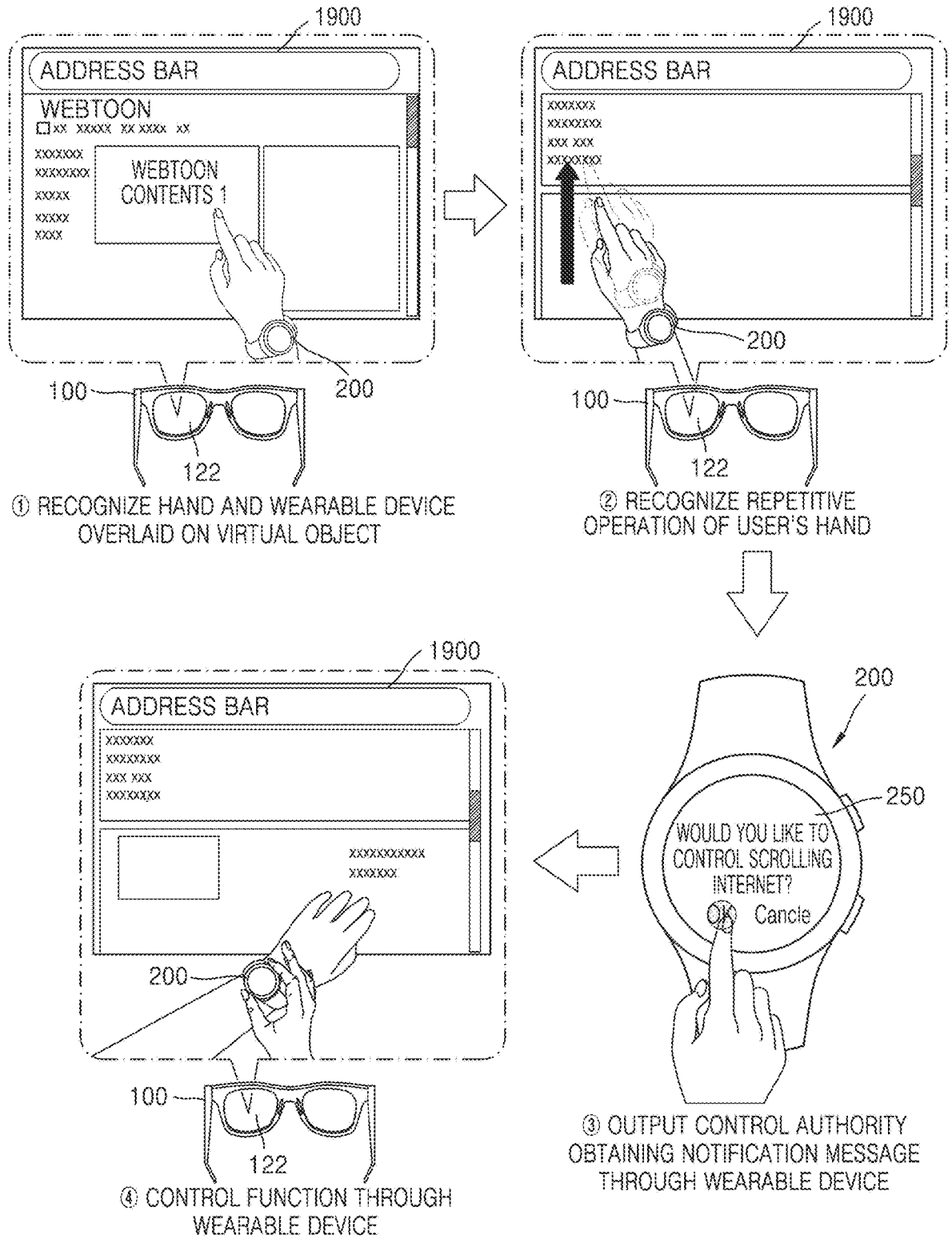
FIG. 19 is a diagram illustrating an operation in which an AR device provides control authority to a wearable device and is controlled by the wearable device based on the provided control authority, according to an embodiment of the disclosure.

FIG. 19 is a diagram illustrating an operation in which an AR device provides control authority to a wearable device and is controlled by the wearable device based on the provided control authority according to an embodiment of the disclosure.

Referring to FIG. 19, an AR device 100 recognizes a wearable device 200 overlaid on a virtual object 1900 and provides the control authority (operation ①). The AR device 100 may display the virtual object 1900 through the waveguide 122. The AR device 100 may recognize the wearable device 200 overlaid on the virtual object 1900. In an embodiment of the disclosure, the AR device 100 may provide the recognized wearable device 200 with the control authority over a function. In an embodiment shown in FIG. 19, the virtual object 1900 may be an execution screen of a web browser application executed by the AR device 100. For example, a web browser may access a webtoon site and display a webtoon. The AR device 100 may provide wearable device 200 with the control authority over the function of the web browser application.

The AR device 100 recognizes a repetitive operation of the user's hand (operation ②). The AR device 100 may recognize the user's hand wearing or gripping the wearable device 200. In an embodiment of the disclosure, the AR device 100 may recognize the repetitive operation that is repeated more than a preset number of times by the user's hand. For example, the AR device 100 may recognize that a scroll operation or a swipe operation by the user's hand in real space is repeated more than the preset number of times. The preset number of times may be, for example, 5 times, but is not limited thereto. The AR device 100 may determine to provide the control authority of the function to the wearable device 200 based on the recognized repetitive operation.

The wearable device 200 outputs a control authority obtaining notification message (operation ③). The wearable device 200 may obtain the control authority of the function from the AR device 100 and display the notification message notifying a user of obtaining of the control authority on the display 250. The notification message may include a name of an application being executed by the AR device 100 and a name of the function related to the control authority obtained from the AR device 100. In an embodiment shown in FIG. 19, the wearable device 200 may output the notification message including an application name (e.g., 'Internet') and a function name (e.g., 'Scroll') such as "Would you like to control the scrolling of the Internet?"

In FIG. 19, the wearable device 200 is shown and described to display the notification message through the display 250, but the disclosure is not limited thereto. In an embodiment of the disclosure, when the control authority of the function is obtained, the wearable device 200 may provide a vibration notification through a vibration motor.

The AR device 100 controls the function based on a user input received through the wearable device 200 (operation ④). In an embodiment of the disclosure, the wearable device 200 may receive a user input of rotating the rotary bezel ring 222 (see FIG. 13) in the clockwise or counterclockwise direction, and change a data value related to the function based on the received user input. For example, the wearable device 200 may change a position of a scroll bar of the web browser based on the user input. The AR device 100 may be controlled based on the data value changed by the wearable device 200. In an embodiment shown in FIG. 19, the AR device 100 may receive information about the changed position of the scroll bar from the wearable device 200 and scroll a display screen of the virtual object 1900, which is the execution screen of the web browser, up and down based on the received information.

Figure 20:
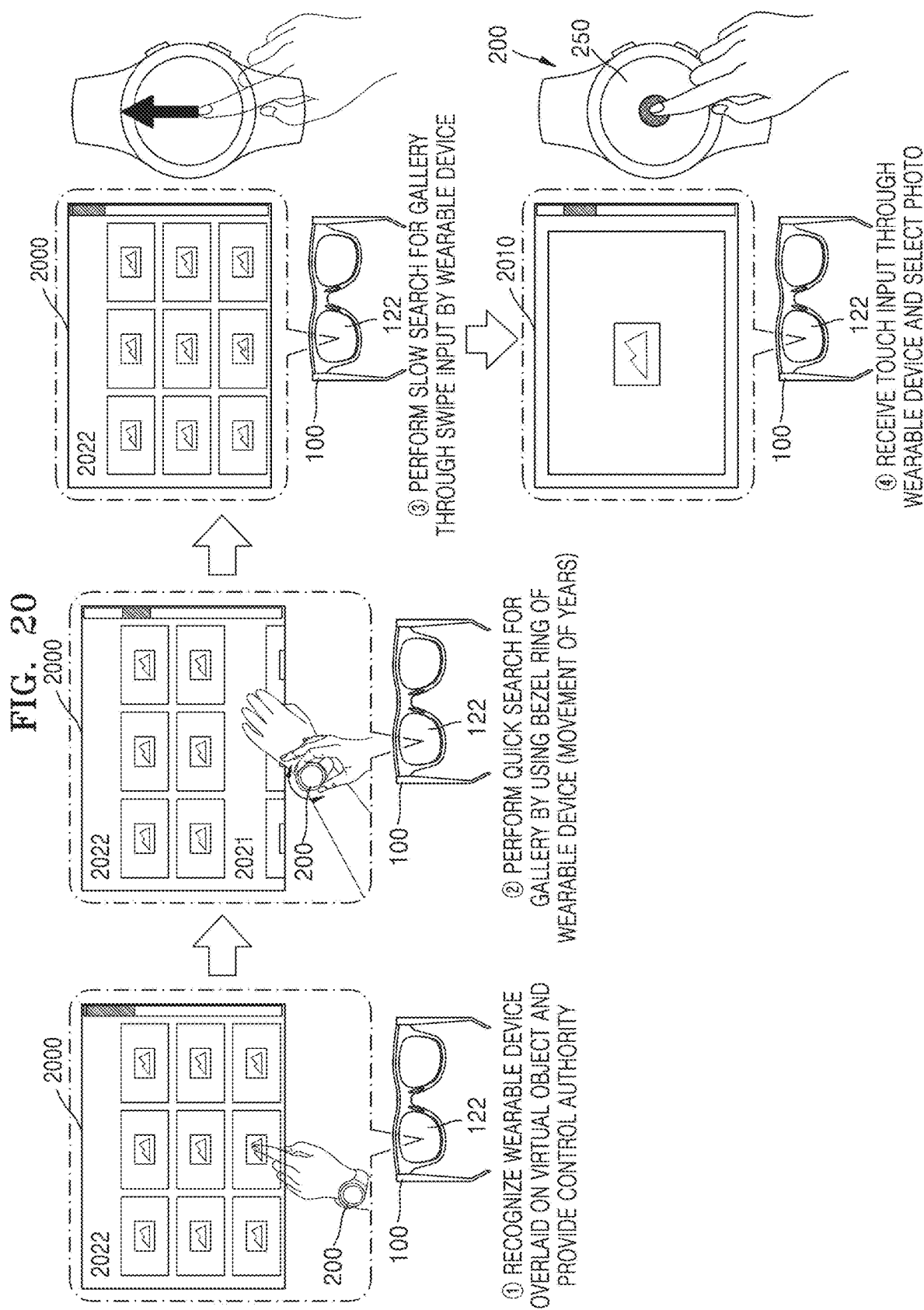
FIG. 20 is a diagram illustrating an operation in which an AR device provides control authority to a wearable device and is controlled by the wearable device based on the provided control authority, according to an embodiment of the disclosure.

FIG. 20 is a diagram illustrating an operation in which an AR device provides control authority to a wearable device and is controlled by the wearable device based on the provided control authority according to an embodiment of the disclosure.

Referring to FIG. 20, an AR device 100 recognizes a wearable device 200 overlaid on a virtual object 2000 and provides the control authority (operation ①). The AR device 100 may display the virtual object 2000 through the waveguide 122 and recognize the wearable device 200 overlaid on the virtual object 2000. In an embodiment shown in FIG. 20, the virtual object 2000 may be an execution screen of a photo gallery application executed by the AR device 100. For example, the photo gallery application may display thumbnail images of a plurality of photos (e.g., in a corresponding year (e.g., Year 2022 or Year 2021)). The AR device 100 may provide the recognized wearable device 200 with the control authority over the function of the photo gallery application.

The wearable device 200 performs a quick search for a photo gallery by using the rotary bezel ring 222 (see FIG. 13) (operation ②). The wearable device 200 may receive a user input of rotating the rotary bezel ring 222 in a clockwise or counterclockwise direction, and may change a data value related to the function based on the received user input. In an embodiment shown in FIG. 20, the wearable device 200 may perform the quick search for the photo gallery application based on the user input received through the rotary bezel ring 222. The 'quick search' refers to a function of scrolling the thumbnail images of the plurality of photos displayed by the photo gallery application according to years that the photos were taken. For example, when the user input of rotating the rotary bezel ring 222 in the clockwise direction is received, the wearable device 200 may perform the quick search for years that the photos were taken toward a recent time, and in response to the user input of rotating the rotary bezel ring 222 in the counterclockwise direction being received, the wearable device 200 may perform the quick search for years that the photos were taken toward a previous past time.

The wearable device 200 performs a slow search for the photo gallery application through a swipe input (operation ③). The wearable device 200 may receive the user swipe input through the display 250 configured as a touch screen. The wearable device 200 may perform a slow search function of the photo gallery application based on a direction of the received swipe input. The 'slow search' function refers to a function of scrolling the thumbnail images of the plurality of photos displayed by the photo gallery application according to the dates, time, persons, or places where the photos were taken. The slow search function scrolls through thumbnail images of a relatively small number of photos compared to a quick search function. For example, when a swipe input from bottom to top is received through the touch screen, the wearable device 200 may perform the slow search from a recent time to a past time with respect to the years that the photos were taken.

The wearable device 200 receives a touch input from a user and selects a photo (operation ④). In an embodiment of the disclosure, the wearable device 200 may display a button UI on the display 250 configured as the touch screen and receive a user touch input of touching the button UI. When the touch input is received by the wearable device 200, the AR device 100 may display a photo 2010 selected by the user input through the waveguide 122.

Figure 21:
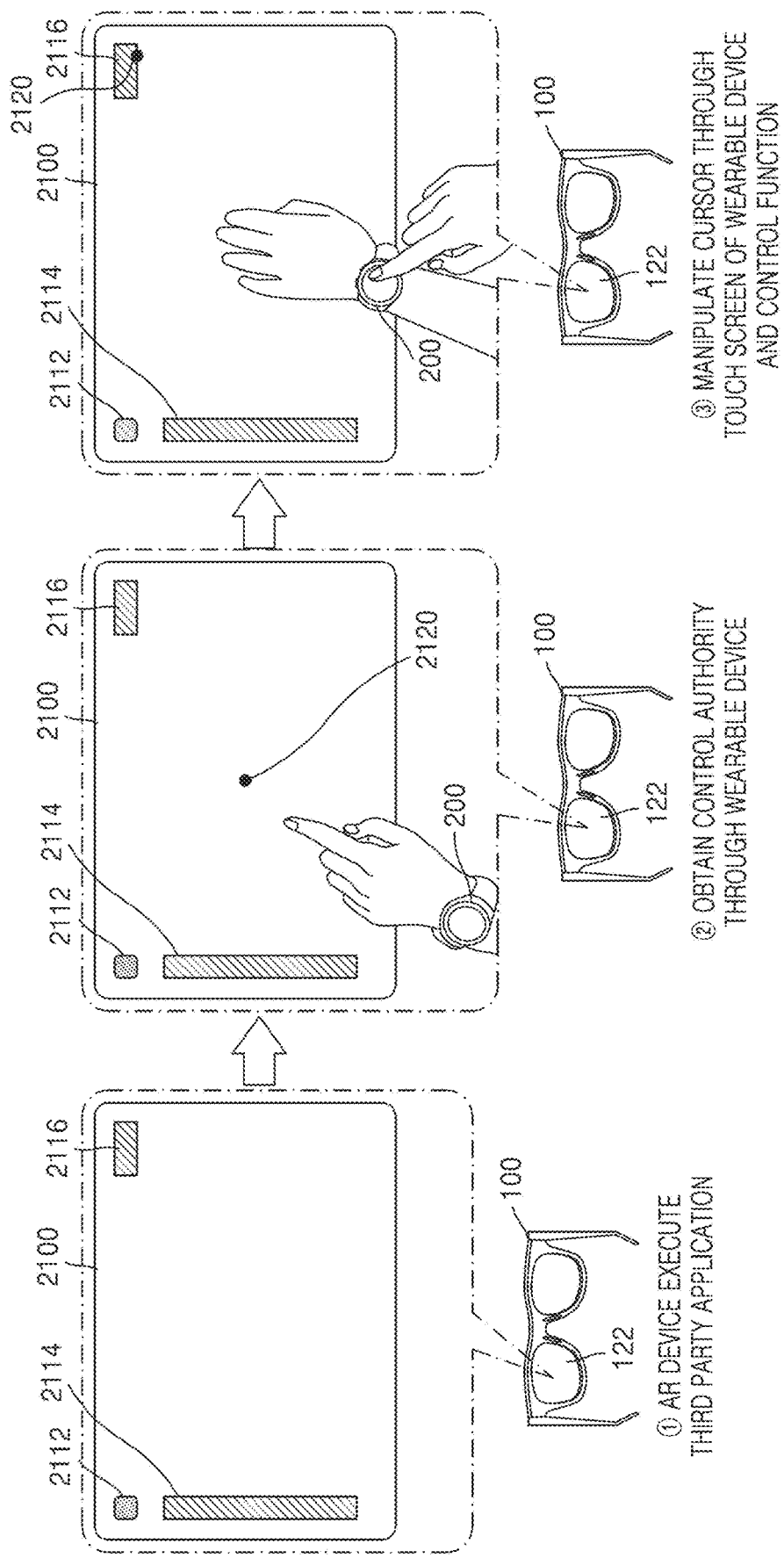
FIG. 21 is a diagram illustrating an operation in which an AR device provides control authority to a wearable device and is controlled by the wearable device based on the provided control authority, according to an embodiment of the disclosure.

FIG. 21 is a diagram illustrating an operation in which an AR device provides control authority to a wearable device and is controlled by the wearable device based on the provided control authority according to an embodiment of the disclosure.

Referring to FIG. 21, an AR device 100 executes a third party application (operation ①). The AR device 100 may project a virtual object 2100 onto a waveguide 122 through an optical engine 124 (see FIG. 2) by executing the third party application. A user may see the virtual object 2100 projected onto the waveguide 122. The virtual object 2100 may include a plurality of function UIs 2112, 2114, and 2116.

A wearable device 200 obtains control authority of a function from the AR device 100 (operation ②). The AR device 100 may recognize the wearable device 200 overlaid on the virtual object 2100 and provide the recognized wearable device 200 with the control authority over the function. The third party application may not provide an API, and in this case, the AR device 100 may not provide the wearable device 200 with control authority over each of the plurality of function UIs 2112, 2114, and 2116. When the API is not provided from the AR device 100, the wearable device 200 may control a touch screen to operate as a touch pad to control the function of the third party application. When the wearable device 200 operates as the touch pad, the AR device 100 may map a touch input received through the touch pad to a position of a cursor on the virtual object 2100 and display a cursor function UI 2120.

The wearable device 200 manipulates the cursor through the touch screen and controls the function (operation ③). The wearable device 200 may change the position of the cursor on the virtual object 2100 based on the touch input received through the touch screen. According to the manipulation through the wearable device 200, a position of the cursor function UI 2120 on the virtual object 2100 may be changed. The wearable device 200 may select a function UI through the cursor based on not only a position movement of the cursor but also the touch input. In an embodiment shown in FIG. 21, the wearable device 200 may select a function UI from among the plurality of function UIs 2112, 2114, and 2116 included in the virtual object 2100 based on the touch input received through the touch screen. When the function UI is selected by the control of the wearable device 200, the AR device 100 may perform the function mapped to the selected function UI.

When a preset time has elapsed since the touch input was received from the wearable device 200, the AR device 100 may retrieve the control authority provided to the wearable device 200 without displaying the cursor function UI 2120 on the virtual object 2100.

The disclosure provides the AR device 100 controlled by an external device. The AR device 100 according to an embodiment of the disclosure may include the camera 110 (see FIG. 2), the waveguide 122 (see FIG. 2), the optical engine 124 (see FIG. 2) configured to project a virtual object onto the waveguide 122, the communication interface 150 (see FIG. 2) configured to establish pairing with the wearable device 200 (see FIG. 11) and transceive data to and from the wearable device 200, the memory 140 (see FIG. 2) storing one or more computer programs, and one or more processors (e.g., processor 130) communicatively coupled to the waveguide, the optical engine, the communication interface, and the memory, wherein the one or more computer programs include computer-executable instructions that, when executed by the one or more processors individually or collectively, cause the AR device to recognize the wearable device 200 overlaid on the virtual object, determine to provide the wearable device 200 with control authority for performing or controlling a function related to the virtual object, control the communication interface 150 to transmit, to the wearable device, the control authority and at least one of characteristic information of the virtual object or a data value related to the function to the wearable device 200, receive, from the wearable device, a changed data value changed by the wearable device 200 based on the transmitted control authority, and update the data value of the function related to the virtual object based on the changed data value.

In an embodiment of the disclosure, the one or more computer programs further include computer-executable instructions that, when executed by the one or more processors individually or collectively, cause the AR device to recognize the user's hand wearing or gripping the wearable device 200, and determine to provide the control authority to the wearable device 200 based on whether a time for which the virtual object is overlaid by the recognized user's hand exceeds a preset time.

In an embodiment of the disclosure, the one or more computer programs further include computer-executable instructions that, when executed by the one or more processors individually or collectively, cause the AR device to recognize a gesture of a user's hand wearing or gripping the wearable device 200, and determine to provide the control authority to the wearable device 200 based on the recognized gesture.

In an embodiment of the disclosure, the one or more computer programs further include computer-executable instructions that, when executed by the one or more processors individually or collectively, cause the AR device to recognize a repetitive operation that is repeated more than a preset number of times by a user's hand wearing or gripping the wearable device 200, and determine to provide the control authority to the wearable device 200 based on the recognized repetitive operation.

In an embodiment of the disclosure, the virtual object includes a plurality of function UIs for performing a plurality of functions, respectively, provided by an application, and the one or more computer programs further include computer-executable instructions that, when executed by the one or more processors individually or collectively, cause the AR device to select, from among the plurality of function UIs, a function UI related to at least one function to provide the control authority to the wearable device 200.

In an embodiment of the disclosure, the one or more computer programs further include computer-executable instructions that, when executed by the one or more processors individually or collectively, cause the AR device to identify, from among the plurality of function UIs, a function UI overlaid by a user's hand wearing or gripping the wearable device 200, and determine to provide the wearable device 200 with control authority over a function performed or controlled by the identified function UI.

In an embodiment of the disclosure, the one or more computer programs further include computer-executable instructions that, when executed by the one or more processors individually or collectively, cause the AR device to select at least one function UI based on whether the application is able to provide an API with respect to each of the plurality of functions.

In an embodiment of the disclosure, the one or more computer programs further include computer-executable instructions that, when executed by the one or more processors individually or collectively, cause the AR device to control the optical engine 124 to display a control area of the selected at least one function UI in a color distinguished from other areas within the virtual object.

In an embodiment of the disclosure, the AR device 100 may further include an eye tracking sensor configured to obtain gaze direction information of a left eye and a right eye of a user by tracking gaze directions of the left eye and right eye. The one or more computer programs further include computer-executable instructions that, when executed by the one or more processors individually or collectively, cause the AR device to execute a plurality of applications to display a plurality of virtual objects provided by the plurality of applications through the waveguide 122, recognize a gaze point at which the gaze direction of the left eye and the gaze direction of the right eye converge through the eye tracking sensor, select an application from among the plurality of applications being executed based on a position of the gaze point, and determine to provide the wearable device 200 with control authority of a function related to at least one virtual object displayed by the selected application.

The disclosure provides a method performed by an augmented reality (AR) device 100 for being controlled by an external device. In an embodiment of the disclosure, the method may include operation S310 of recognizing, by the AR device, a wearable device 200 overlaid on a virtual object, operation S320 of determining, by the AR device, to provide the wearable device 200 with control authority for performing or controlling a function related to the virtual object, operation S330 of transmitting, by the AR device to the wearable device, the control authority and at least one of characteristic information of the virtual object or a data value related to the function to the wearable device 200, operation S340 of receiving, by the AR device from the wearable device, a changed data value changed by the wearable device 200 based on the transmitted control authority, and operation S350 of updating, by the AR device, the data value of the function related to the virtual object based on the changed data value.

In an embodiment of the disclosure, operation S310 of recognizing the wearable device 200 may include recognizing, by the AR device, a user's hand wearing or gripping the wearable device 200. Operation S320 of determining to provide the recognized wearable device 200 with the control authority may include determining, by the AR device, to provide the control authority to the wearable device 200 based on whether a time for which the virtual object is overlaid by the recognized user's hand exceeds a preset time.

In an embodiment of the disclosure, operation S310 of recognizing the wearable device 200 may include recognizing, by the AR device, a gesture of the user's hand wearing or gripping the wearable device 200. Operation S320 of determining to provide the recognized wearable device 200 with the control authority may include determining, by the AR device, to provide the control authority to the wearable device 200 based on the recognized gesture.

In an embodiment of the disclosure, operation S310 of recognizing the wearable device 200 may further include recognizing, by the AR device, a repetitive operation that is repeated more than a preset number of times by a user's hand wearing or gripping the wearable device 200. Operation S320 of determining to provide the recognized wearable device 200 with the control authority may include determining, by the AR device, to provide the control authority to the wearable device 200 based on the recognized repetitive operation.

In an embodiment of the disclosure, the virtual object includes a plurality of function UIs for performing a plurality of functions, respectively, provided by an application, and operation S320 of determining to provide the recognized wearable device 200 with the control authority may include selecting, by the AR device from among the plurality of function UIs, a function UI related to at least one function to provide control authority to the wearable device 200.

In an embodiment of the disclosure, the selecting of the function UI related to the at least one function to provide the control authority to the wearable device 200 may include operation S710 of identifying, by the AR device from among the plurality of function UIs, a function UI overlaid by a user's hand wearing or gripping the wearable device 200. The selecting of the function UI related to the at least one function to provide the control authority to the wearable device 200 may include operation S720 of determining, by the AR device, to provide the wearable device 200 with control authority over a function performed or controlled by the identified function UI.

In an embodiment of the disclosure, the selecting of the function UI related to the at least one function to provide the control authority to the wearable device 200 may include selecting, by the AR device, at least one function UI based on whether the application is able to provide an API with respect to each of the plurality of functions.

In an embodiment of the disclosure, the method may further include operation S730 of displaying, by the AR device, a control area of the selected at least one function UI in a color distinguished from other areas within the virtual object.

In an embodiment of the disclosure, the method may further include operation S910 of displaying, by the AR device, a plurality of virtual objects provided by a plurality of applications by executing the plurality of applications. Operation S320 of determining to provide the wearable device 200 with the control authority may include operation S920 of recognizing, by the AR device, a gaze point at which a gaze direction of the left eye and a gaze direction of the right eye of the user converge, and operation S930 of selecting, by the AR device, an application from among the plurality of applications being executed based on a position of the gaze point. Operation S320 of determining to provide the recognized wearable device 200 with the control authority may include operation S940 of determining, by the AR device, to provide the wearable device 200 with control authority of a function related to at least one virtual object displayed by the selected application.

The disclosure provides the wearable device 200 that interacts with the AR device 100. The wearable device 200 according to an embodiment of the disclosure may include the communication interface 210 connected to the AR device 100 through a short-range communication method and performing data communication with the AR device 100, the user input interface 220 to receive a user input, the memory 240 storing one or more instructions, and the at least one processor 230 configured to execute the one or more instructions. The at least one processor 230 may obtain control authority for performing or controlling a function related to a virtual object displayed through an application executed by the AR device 100 from the AR device 100. The at least one processor 230 may determine a manipulation method of controlling the function based on the obtained control authority based on at least one of a type of a virtual object, the characteristics of the function, or a data value related to the function. The at least one processor 230 may change the data value related to the function based on a user input received through the user input interface 220 according to the determined manipulation method. The at least one processor 230 may transmit the changed data value to the AR device 100 by controlling the communication interface 150.

In an embodiment of the disclosure, the wearable device 200 may further include the display 250. When the control authority is obtained from the AR device 100, the at least one processor 230 may display, on the display 250, a notification message notifying whether the control authority is obtained and information about the function related to the control authority.

The program executed by the AR device 100 described above herein may be implemented as a hardware component, a software component, and/or a combination of hardware components and software components. The program may be executed by any system capable of executing computer readable instructions.

The software may include a computer program, a code, instructions, or a combination of one or more of the foregoing, and may constitute a processing device so that the processing device may operate as desired, or may independently or collectively instruction the processing device.

The software may be implemented as a computer program including instructions stored in computer-readable storage media. Examples of the computer-readable recording media include magnetic storage media (e.g., ROM, floppy disks, hard disks, etc.), and optical recording media (e.g., CD-ROMs, or digital versatile discs (DVDs)). The computer-readable recording media may be distributed over network coupled computer systems so that the computer-readable code is stored and executed in a distributive manner. These media may be read by the computer, stored in memory, and executed by a processor.

The computer-readable storage medium may be provided as a non-transitory storage medium. Here, 'non-transitory' denotes that the storage medium does not include a signal and is tangible, but does not distinguish a case where data is stored semi-permanently or temporarily in the storage medium. For example, the non-transitory storage media may include a buffer in which data is temporarily stored.

Programs according to various embodiments disclosed herein may be provided by being included in computer program products. The computer program product, which is a commodity, may be traded between sellers and buyers.

Computer program products may include a software program and a computer-readable storage medium having the software program stored thereon. For example, computer program products may include a product in the form of a software program (e.g., a downloadable application) that is electronically distributed through manufacturers of the AR device 100 or electronic markets (e.g., Samsung Galaxy Store). For electronic distribution, at least a portion of the software program may be stored on a storage medium or may be created temporarily. In this case, the storage medium may be a server of a manufacturer of the AR device 100, a server of an electronic market, or a storage medium of a relay server for temporarily storing a software (SW) program.

The computer program product may include a storage medium of the server or a storage medium of the AR device 100, in a system composed of the AR device 100 and/or the server. Alternatively, when there is a third device (e.g., a wearable device) in communication with the AR device 100, the computer program product may include a storage medium of the third device. Alternatively, the computer program product may include the software program itself transmitted from the AR device 100 to the third device, or transmitted from the third device to the AR device 100.

In this case, one of the AR device 100 and the third device may execute the computer program product to perform the method according to the disclosed embodiment. Alternatively, at least one of the AR device 100 or the third device may execute the computer program product to distribute and perform the methods according to the disclosed embodiments.

For example, the AR device 100 may control another electronic device (e.g., a wearable device) in communication with the AR device 100 to perform the methods according to the disclosed embodiments, by executing the computer program product stored in the memory 140 of FIG. 2.

As another example, a third device may execute a computer program product to control an electronic device in communication with the third device to perform the methods according to the disclosed embodiments.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

When the third device executes the computer program product, the third device may download the computer program product from the AR device 100 and execute the downloaded computer program product. Alternatively, the third device may execute a computer program product provided in a preloaded state to perform methods according to the disclosed embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality (AR) device controlled by an external device, the AR device comprising:
 a waveguide;
 an optical engine configured to project a virtual object onto the waveguide;
 a communication interface configured to communicate with a wearable device;
 memory storing one or more computer programs; and
 one or more processors communicatively coupled to the optical engine, the communication interface, and the memory,
 wherein the one or more computer programs include computer-executable instructions that, when executed by the one or more processors individually or collectively, cause the AR device to:
  recognize the wearable device overlaid on the virtual object through the waveguide,
  based on the recognition of the wearable device being overlaid on the virtual object, determine to provide the wearable device with control authority for performing or controlling a function related to the virtual object,
  based on determining to provide the wearable device with the control authority, transmit, via the communication interface to the wearable device, the control authority and a first data value related to the function,
  receive, via the communication interface from the wearable device, a second data value which is a data value changed by the wearable device based on the transmitted control authority, and
  update, based on the received second data value, the first data value of the function related to the virtual object.

2. The AR device of claim 1, wherein the one or more computer programs further include computer-executable instructions that, when executed by the one or more processors individually or collectively, cause the AR device to:
 recognize a user's hand wearing or gripping the wearable device, and
 determine to provide the control authority to the wearable device based on whether a time for which the virtual object is overlaid by the recognized user's hand exceeds a preset time.

3. The AR device of claim 1, wherein the one or more computer programs further include computer-executable instructions that, when executed by the one or more processors individually or collectively, cause the AR device to:
 recognize a gesture of a user's hand wearing or gripping the wearable device, and
 determine to provide the control authority to the wearable device based on the recognized gesture.

4. The AR device of claim 1, wherein the one or more computer programs further include computer-executable instructions that, when executed by the one or more processors individually or collectively, cause the AR device to:
 recognize a repetitive operation that is repeated more than a preset number of times by a user's hand wearing or gripping the wearable device, and
 determine to provide the control authority to the wearable device based on the recognized repetitive operation.

5. The AR device of claim 1,
 wherein the virtual object includes a plurality of function user interfaces (UIs) for performing a plurality of functions, respectively, provided by an application, and
 wherein the one or more computer programs further include computer-executable instructions that, when executed by the one or more processors individually or collectively, cause the AR device to:
  select, from among the plurality of function UIs, a function UI related to at least one function to provide the control authority to the wearable device.

6. The AR device of claim 5, wherein the one or more computer programs further include computer-executable instructions that, when executed by the one or more processors individually or collectively, cause the AR device to:
 identify, from among the plurality of function UIs, a function UI overlaid by a user's hand wearing or gripping the wearable device, and determine to provide the wearable device with control authority over a function performed or controlled by the identified function UI.

7. The AR device of claim 5, wherein the one or more computer programs further include computer-executable instructions that, when executed by the one or more processors individually or collectively, cause the AR device to:
display, through the waveguide, a control area of the selected function UI in a color distinguished from other areas within the virtual object.

8. The AR device of claim 1, further comprising:
an eye tracking sensor configured to obtain gaze direction information of a left eye and a right eye of a user by tracking gaze directions of the left eye and right eye,
wherein the one or more computer programs further include computer-executable instructions that, when executed by the one or more processors individually or collectively, cause the AR device to:
execute a plurality of applications to display a plurality of virtual objects provided by the plurality of applications through the waveguide,
recognize a gaze point at which the gaze direction of the left eye and the gaze direction of the right eye converge through the eye tracking sensor,
select an application from among the plurality of applications being executed based on a position of the gaze point, and
determine to provide the wearable device with control authority of a function related to at least one virtual object displayed by the selected application.

9. A method performed by an augmented reality (AR) device for being controlled by an external device, the method comprising:
recognizing, by the AR device, a wearable device overlaid on a virtual object through a waveguide of the AR device;
based on the recognition of the wearable device being overlaid on the virtual object, determining, by the AR device, to provide the wearable device with control authority for performing or controlling a function related to the virtual object;
based on determining to provide the wearable device with the control authority, transmitting, by the AR device to the wearable device, the control authority and a first data value related to the function;
receiving, by the AR device from the wearable device, a second data value which is a data value changed by the wearable device based on the transmitted control authority; and
updating, based on the received second data value, by the AR device, the first data value of the function related to the virtual object.

10. The method of claim 9,
wherein the recognizing of the wearable device includes recognizing, by the AR device, a user's hand wearing or gripping the wearable device, and
wherein the determining to provide the wearable device with the control authority includes determining, by the AR device, to provide the control authority to the wearable device based on whether a time for which the virtual object is overlaid by the recognized user's hand exceeds a preset time.

11. The method of claim 9,
wherein the recognizing of the wearable device includes recognizing, by the AR device, a gesture of a user's hand wearing or gripping the wearable device, and
wherein the determining to provide the wearable device with the control authority includes determining, by the AR device, to provide the control authority to the wearable device based on the recognized gesture.

12. The method of claim 9,
wherein the virtual object includes a plurality of function user interfaces (UIs) for performing a plurality of functions, respectively, provided by an application, and
wherein the determining to provide the wearable device with the control authority includes selecting, by the AR device from among the plurality of function UIs, a function UI related to at least one function to provide the control authority to the wearable device.

13. The method of claim 12, wherein the selecting of the function UI related to the at least one function to provide the control authority to the wearable device comprises:
identifying, by the AR device from among the plurality of function UIs, a function UI overlaid by a user's hand wearing or gripping the wearable device; and
determining, by the AR device, to provide the wearable device with control authority over a function performed or controlled by the identified function UI.

14. The method of claim 12, further comprising:
displaying, by the AR device, a control area of the selected function UI in a color distinguished from other areas within the virtual object.

15. The method of claim 9, further comprising:
displaying, by the AR device, a plurality of virtual objects provided by a plurality of applications by executing the plurality of applications,
wherein the determining to provide the wearable device with the control authority comprises:
recognizing, by the AR device, a gaze point at which a gaze direction of a left eye of a user and a gaze direction of a right eye of the user converge;
selecting, by the AR device, an application from among the plurality of applications being executed based on a position of the gaze point; and
determining, by the AR device, to provide the wearable device with control authority of a function related to at least one virtual object displayed by the selected application.

16. The method of claim 9,
wherein the recognizing of the wearable device includes recognizing, by the AR device, a repetitive operation that is repeated more than a preset number of times by a user's hand wearing or gripping the wearable device, and
wherein the determining to provide the wearable device with the control authority includes determining, by the AR device, to provide the control authority to the wearable device based on the recognized repetitive operation.

17. One or more non-transitory computer-readable storage media storing one or more computer programs including computer-executable instructions that, when executed by one or more processors of an augmented reality (AR) device individually or collectively, cause the AR device to perform operations, the operations comprising:
recognizing, by the AR device, a wearable device overlaid on a virtual object through a waveguide of the AR device;
based on the recognition of the wearable device being overlaid on the virtual object, determining, by the AR device, to provide the wearable device with control authority for performing or controlling a function related to the virtual object;

based on determining to provide the wearable device with the control authority, transmitting, by the AR device to the wearable device, the control authority and a first data value related to the function;

receiving, by the AR device from the wearable device, a second data value which is a data value changed by the wearable device based on the transmitted control authority; and updating, based on the received second data value, by the AR device, the first data value of the function related to the virtual object.

18. The one or more non-transitory computer-readable storage media of claim 17, wherein the recognizing of the wearable device includes recognizing, by the AR device, a user's hand wearing or gripping the wearable device, and wherein the determining to provide the wearable device with the control authority includes determining, by the AR device, to provide the control authority to the wearable device based on whether a time for which the virtual object is overlaid by the recognized user's hand exceeds a preset time.

\* \* \* \* \*